United States Patent

Yaguchi et al.

Patent Number: 6,094,510
Date of Patent: *Jul. 25, 2000

[54] IMAGE PROCESSING APPARATUS AND METHOD FOR PREDICTING A COMPRESSION RATE OF IMAGE DATA PROCESSED TO MODIFY AN IMAGE

[75] Inventors: Hiroyuki Yaguchi, Inagi; Ryosuke Miyamoto, Urayasu; Hideaki Shimizu, Yokohama; Hiroyoshi Yoshida, Fujisawa; Masao Watanabe, Kawasaki; Masatoshi Yaginuma, Tokyo; Kiyoshi Okamoto, Kawasaki; Yasuhiro Takiyama, Kawasaki; Katsunari Suzuki, Kawasaki; Daisuke Ishizuka, Kawasaki; Tadashi Takahashi, Yokohama; Tsuyoshi Moriyama, Hachiohji, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/843,271

[22] Filed: Apr. 14, 1997

[30] Foreign Application Priority Data

| Apr. 15, 1996 | [JP] | Japan | 8-092471 |
| Apr. 15, 1996 | [JP] | Japan | 8-115279 |
| Apr. 15, 1996 | [JP] | Japan | 8-115282 |

[51] Int. Cl.⁷ ................................................. H04N 1/42
[52] U.S. Cl. ............................................. 382/232; 382/166
[58] Field of Search ........................... 382/166, 232–233, 382/238–239; 358/426, 261.1–261.4

[56] References Cited

U.S. PATENT DOCUMENTS

| 5,216,516 | 6/1993 | Tanaka et al. | 358/426 |
| 5,465,172 | 11/1995 | Fukushima et al. | 358/498 |
| 5,757,968 | 5/1998 | Ando | 385/236 |

FOREIGN PATENT DOCUMENTS 937018  2/1997  Japan .

Primary Examiner—Thomas D. Lee
Assistant Examiner—Stephen Brinich
Attorney, Agent, or Firm—Fitzpatrick, Cella, Harper & Scinto

[57] ABSTRACT

An image processing apparatus includes a processing unit for processing an image signal into which an original document, after being exposed to light, is photoelectrically converted, a compression module for compressing image information processed through the processing unit, a memory for storing image data compressed by the compression module, a control unit for setting a diversity of image processing modes, and a predicting module for predicting an image compression rate used by the compression module. The predicting module predicts the image compression rate of an image after being processed according to the image processing mode set by the control unit.

40 Claims, 42 Drawing Sheets

FIG. 7A
FIG. 7B
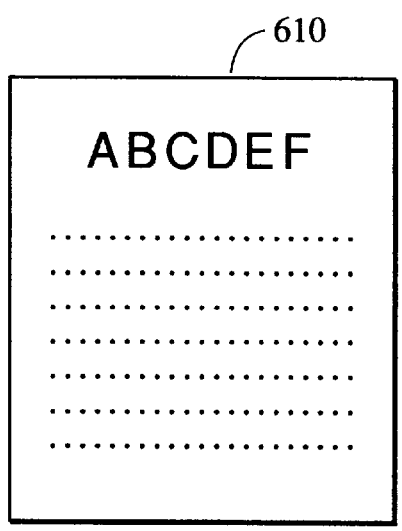
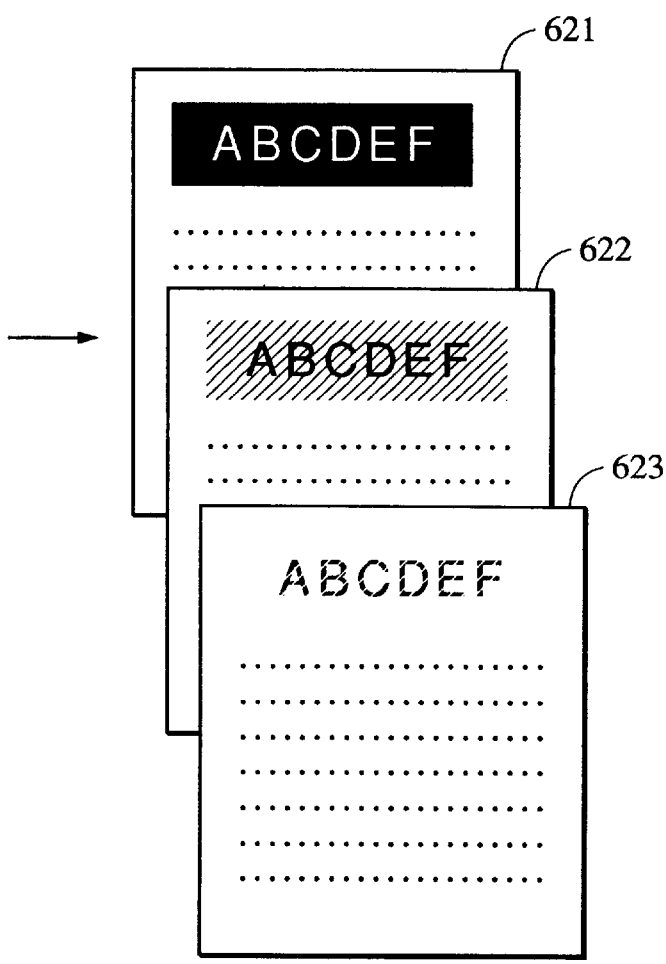

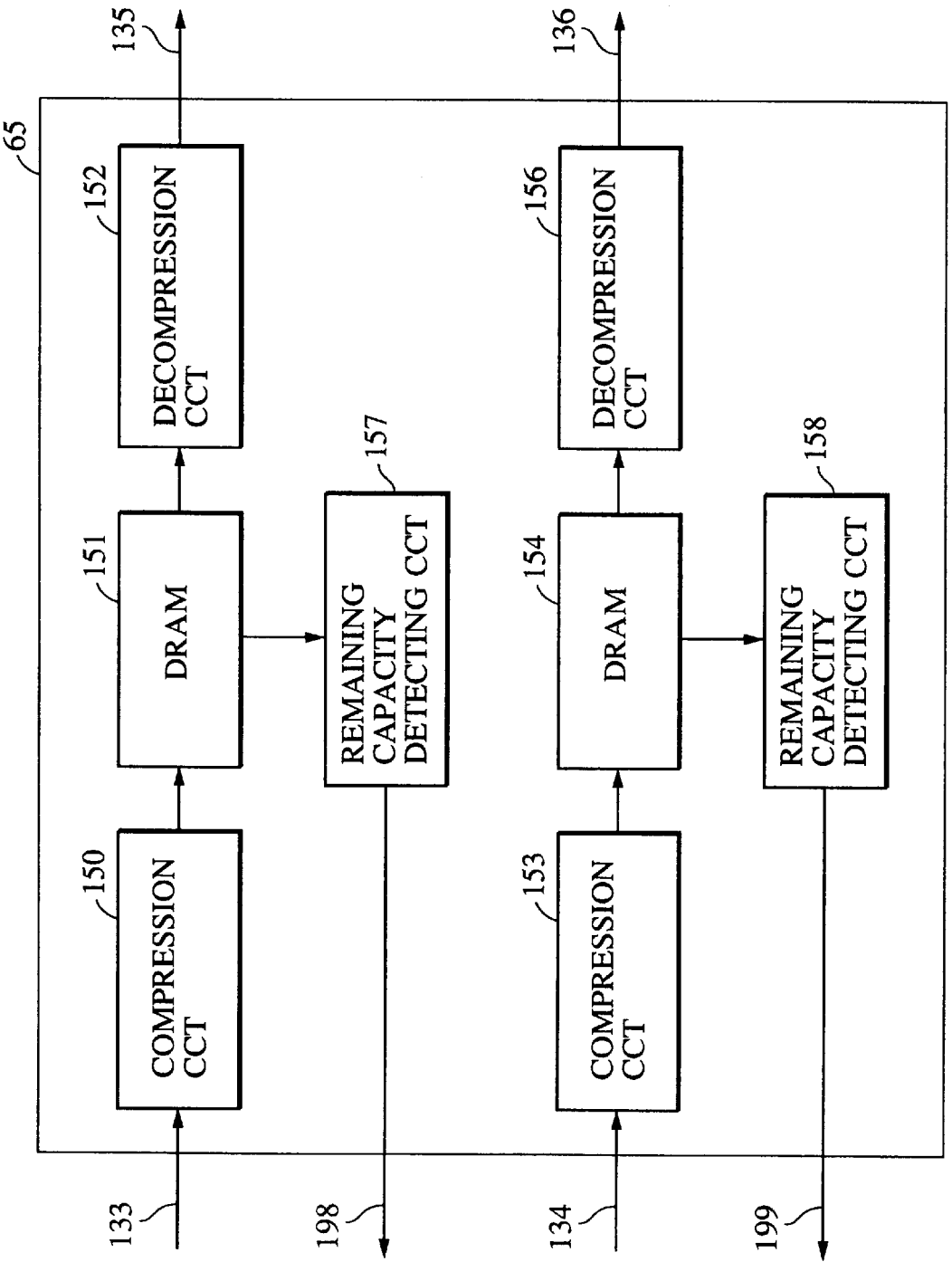

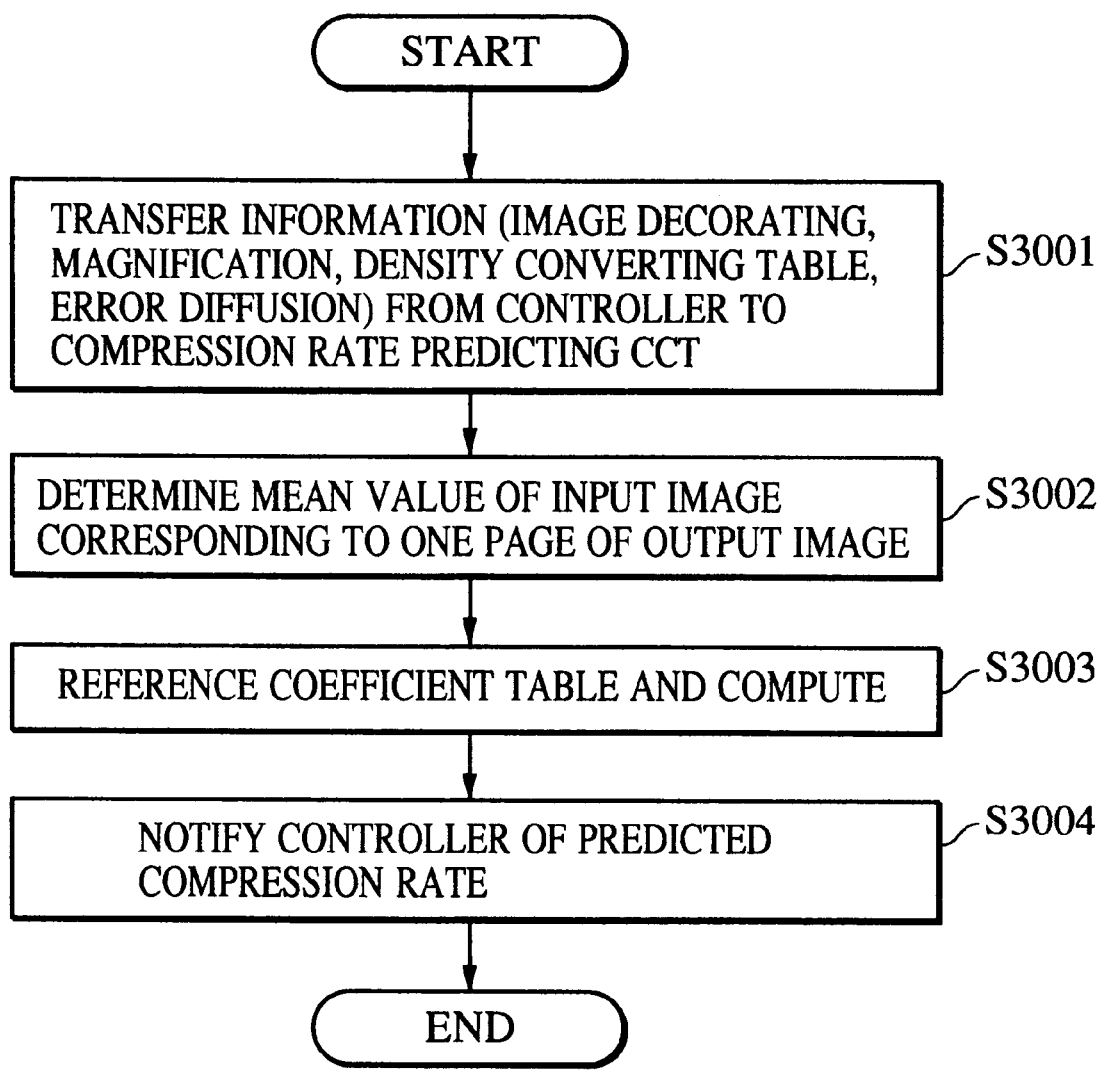

| COEFFICIENT | PROCESS | ASSESSMENT |
|---|---|---|
| a0 | ALL | 0.1 |
| a1 | MESHING | MESHED AREA OF OUTPUT IMAGE (%) × 0.001 |
| a2 | OUTLINE EXTRACTION | 0 |
| a3 | STAMPING | STAMPED AREA (%) × 0.001 |
| a4 | MIRROR | 0 |
| a5 | NEGATIVE-POSITIVE REVERSION | 0 |
| a6 | TRANSLATION AND ROTATION | 0 |

| COEFFICIENT | PROCESS | ASSESSMENT |
|---|---|---|
| b0 | ALL | 0.1 |
| b1 | MESHING | 0 |
| b2 | OUTLINE EXTRACTION | 0.05 |
| b3 | STAMPING | 0 |
| b4 | MIRROR | 0.05 |
| b5 | NEGATIVE-POSITIVE REVERSION | 0 |
| b6 | TRANSLATION AND ROTATION | 0 |

$b = b0 + b1 + b2 + b3 + b4 + b5 + b6$

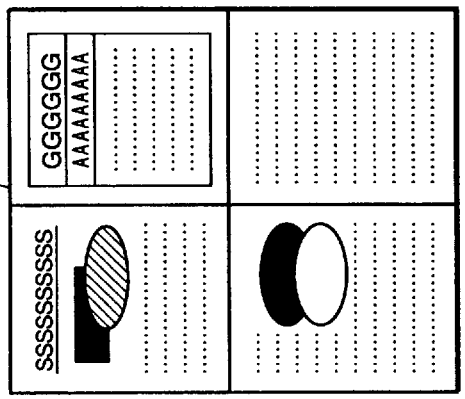
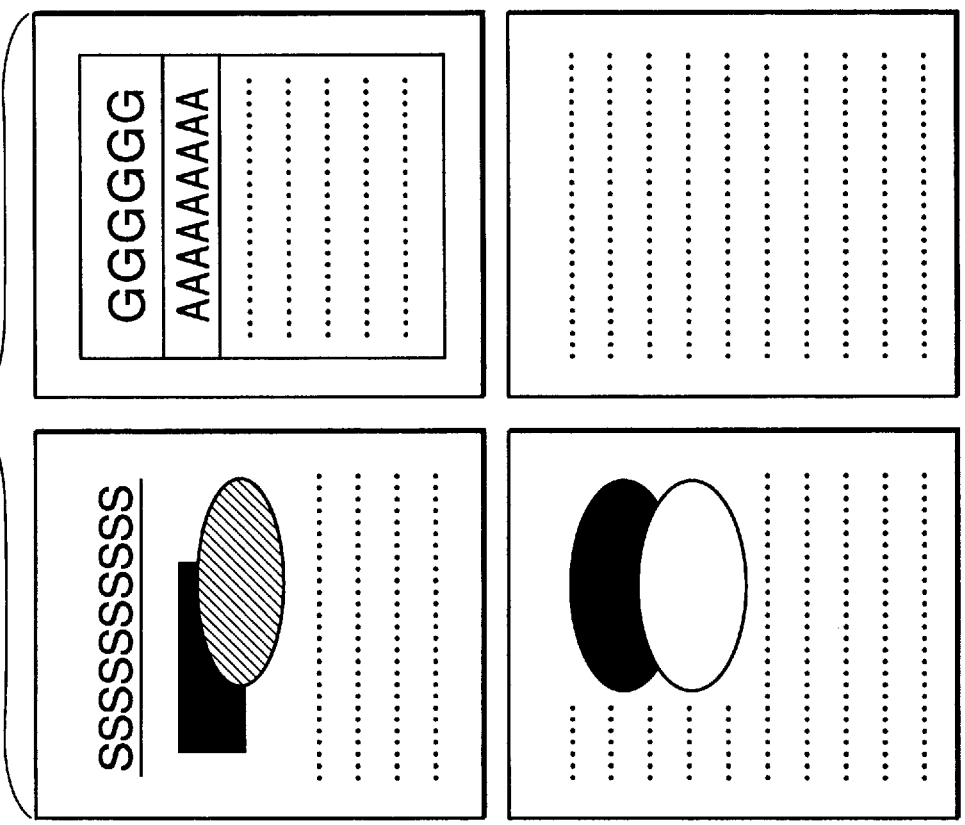
FIG. 33B
FIG. 33A

EXPANSION/REDUCTION RATE

FIG. 44

| ITEMS WITH PREDICTION | ITEMS WITHOUT PREDICTION |
|---|---|
| MULTI-COPYING | OVERLAY |
| OUTLINE ERASE | CONTRACTION LAYOUT |
| TRANSLATION | CONTINUOUS COPY |
| ROTATION/MIRROR | TRIMMING/MASKING |
| BINDING MARGIN | COLOR PATTERN CONVERSION |
| | SHARPNESS |
| | MESHING/FOREGROUND MESHING/BACKGROUND MESHING |
| | TILT |
| | OUTLINE/SHADOWING |
| | NEGATIVE-POSITIVE REVERSION |
| | SYMMETRY |
| | IMAGE REPEAT |
| | MAGNIFICATION SETTING MODIFICATION |
| | DENSITY SETTING MODIFICATION |

IMAGE PROCESSING APPARATUS AND METHOD FOR PREDICTING A COMPRESSION RATE OF IMAGE DATA PROCESSED TO MODIFY AN IMAGE

BACKGROUND OF THE INVENTION

1. Field of the Invention

The present invention relates to an image processing apparatus and method equipped with a memory which compresses and stores image data coming in from an image reading device such as a copying machine, a facsimile device, and a scanner.

2. Description of the Related Art

In copying machines, the sorting and grouping of output sheets is conventionally performed by means of a device that mechanically sorts them or by circulating an original document repeatedly. Thus, reading of the original document takes time and the original document itself is subject to damage.

An electronic sorter that electronically reads and sorts an original document sheet is proposed. The electronic sorter employs a memory capable of storing a plurality of pages of image information. Since the memory is a low-speed, large-capacity hard disk or a high-speed, small-capacity memory, the limitations of a storage speed and memory size make image data subject to a long process wait state or put the sorter into a disabled state. Although a variety of job scheduling methods have been proposed to give a priority to a first user coming to a digital electronic copying machine with a document sheet, immediate-action characteristic and high-speed processing speed today are required to handle bulk copying and a large amount of data output from personal computers.

Although a large-capacity semiconductor memory is used in an attempt to achieve improvements in immediate-action characteristic and processing speed, the storage capacity of the semiconductor memory is still subject to a limitation, and control of the apparatuses within the storage capacity limitation is of a prime concern.

Specifically, the amount of data of an image to be stored is varied if the image, before being stored, is subjected to a diversity of image processings including image magnification (expansion and contraction), image decoration, image editing, and density conversion. Thus, it is difficult to guarantee that the image data is reliably stored.

In view of this, before it is stored in an image memory, the image data is typically compressed to reduce the capacity requirement of the image memory that is ever-increasing. Typically used as an image compression method are MH coding and recently Q-Coder that utilizes arithmetic coding, because they are free from image quality degradation and present a good compression rate.

The amount of the image data compressed through the above compression methods is not known until a compression process is fully completed. When an image reader sequentially reads original document sheets, it goes to a next document after determining that an image memory can store the data of a first original document sheet after it is compressed. When the image reader determines that the image memory is unable to store or accommodate the data of the first document sheet, it needs to read the first document sheet again. These steps lower substantially the processing speed of the image processing apparatus.

A compression rate or compression factor is not always constant to all images, and thus not always stable among all image data. Specifically, the compression rate is varied, for example, high in textual documents and low in photographic documents. For this reason, in the vicinity of the limitation of the storage capacity of the image memory, the amount of compressed data of a photographic document is larger than the remaining capacity still available the image memory while the amount of compressed data of a textual document is smaller than the remaining capacity still available in the image memory. Thus, the image memory cannot be efficiently used in the vicinity of the storage capacity limitation of the image memory.

SUMMARY OF THE INVENTION

Accordingly, it is an object of the present invention to provide an image processing apparatus and method, which permit smooth and easy control even when an image is subjected to a diversity of image processings including image magnification, image decoration, image editing, and density conversion.

It is another object of the present invention to provide an image processing apparatus and method which permit efficient use of an image memory and feature improved processing speed, in which an image memory is efficiently used regardless of types of original documents when the remaining capacity available in the image memory nears its storage capacity limit.

To achieve the above objects, the present invention comprises processing means for processing an image signal into which an original document, after being exposed to light, is photoelectrically converted, compression means for compressing image information processed through the processing means, memory means for storing image data compressed by the compression means, setting means for setting a plurality of image processing modes, and predicting means for predicting an image compression rate used by the compression means, wherein the predicting means predicts the image compression rate of the image after being processed according to an image processing mode set by the setting means.

The present invention comprises input means for inputting image data that is obtained by reading an original document fed, compression means for compressing the image data input by the inputting means, memory means for storing the data compressed by the compression means, setting means for entering copying parameter settings, predicting means for predicting a compression rate used by the compression means, remaining capacity detection means for detecting the remaining capacity available in the memory means, and control means for controlling the feeding of the original document based on the detection result given by the remaining capacity detection means and the prediction result given by the predicting means, wherein coefficients and a computation method used by the predicting means in the prediction of the compression rate are modified based on the copying parameter settings entered by the setting means.

The present invention comprises processing means for processing an image signal into which an original document, after being exposed to light, is photoelectrically converted, compression means for compressing image information processed through the processing means, memory means for storing image data compressed by the compression means, setting means for setting a plurality of image processing modes, predicting means for predicting an image compression rate used by the compression means, and switching means for switching the predicting means between an enabled status and a disabled status, wherein the switching means switches the predicting means to the disabled status based on the setting by the setting means.

These and other objects and advantages of the present invention will become more apparent from the following description of the present invention.

BRIEF DESCRIPTION OF THE DRAWINGS

FIG. 8 shows a block diagram of a configuration of a print buffer memory (PBM) in the image processing apparatus shown in FIG. 1, FIGS. 9A and 9B show movement of a job in the print buffer memory, FIG. 1, FIG. 20 shows a conceptual view of the page memory when the outputting of the image 1 is started from the page memory in the image processing apparatus shown in FIG. 1, FIG. 30 is a flow chart showing the control sequence of the compression rate prediction operation by the image processing apparatus shown in FIG. 1, FIGS. 31A and 31B show a computation table of coefficients a and b respectively in the image processing apparatus shown in FIG. 1, FIGS. 32A to 32C provide an explanatory view showing an expansion continuous copying mode in the image processing apparatus shown in FIG. 1, FIGS. 33A and 33b provide an explanatory view showing a reduction layout mode in the image processing apparatus shown in FIG. 1, FIG. 44 shows a parameter table which lists parameters with and without prediction.

DESCRIPTION OF THE PREFERRED EMBODIMENTS

Figure 1:
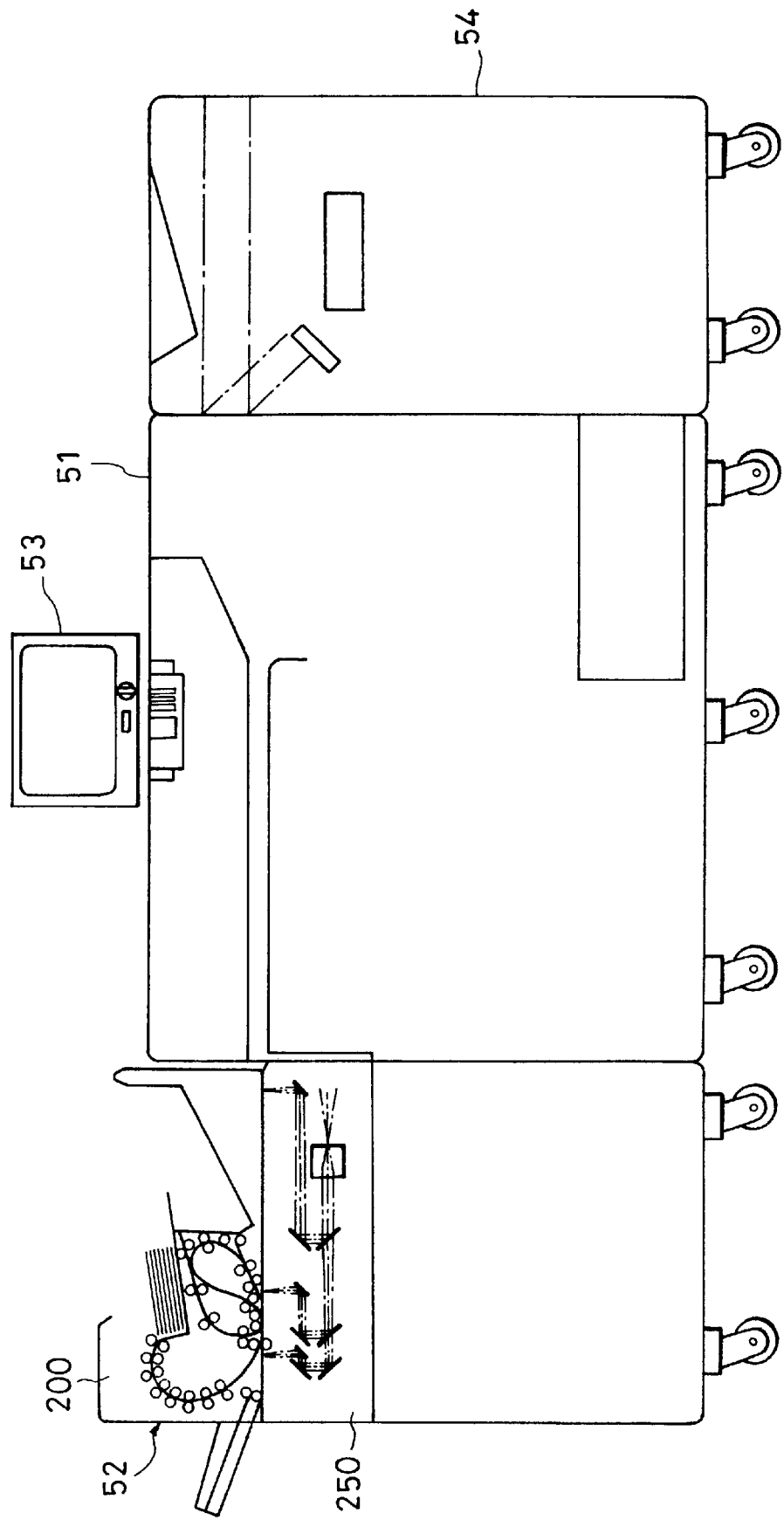
FIG. 1 shows a side view of a construction of an image processing apparatus having an image memory unit in accordance with an embodiment of the present invention.

The embodiment of the present invention is now explained with reference to the drawings. FIG. 1 shows a side view of a construction of an image processing apparatus (copying machine) of the present embodiment. In FIG. 1, numeral 51 denotes an image recording unit (hereinafter referred to as a printer unit), numeral 52 denotes an image read unit (hereinafter referred to as a reader unit), numeral 53 denotes a control unit (hereinafter referred to as an operator control unit (OCU)) and numeral 54 denotes a finishing unit.

The reader unit 52 comprises an automatic document sheet feeder unit (hereinafter referred to as an ADF) 200 for automatically feeding the document sheet to a read position and a scanner unit 250 for optically reading the document sheet image. A specific operation of the reader unit 52 will be explained with reference to FIG. 2. The printer unit 51 visualizes the image read by the reader unit 52 or the image sent from a computer terminal or an external equipment (not shown) such as a facsimile machine to print on a record sheet such as a transfer sheet. The printer unit 51 is provided with a large capacity print buffer memory (hereinafter referred to as a PBM) 65 as shown in FIG. 8 to store the image input from the ADF 200 or the external equipment and conduct the sorting process such as the rearrangement of pages after the storing. A specific operation of the printer unit 51 will also be described later.

The OCU 53 comprises a display and a keyboard (or a touch panel type display) to enter various settings by a user such as number of sheets setting, number of sets setting, edition of image and processing of image and display information representing the selected mode and status of the apparatus. The finishing unit 54 post-processes the output sheet obtained by having recorded on the record medium in the printer unit 51 and conducts the sorting, stapling or bookbinding.

A basic operation in the image processing apparatus of the configuration shown in FIG. 1 is now explained. When the user sets a plurality of document sheets on the ADF 200 of the reader unit 52, sets the mode of the OCU 53 and designates the start of copying, the ADF 200 feeds the document sheets one by one and the images thereof are read by the scanner unit 250. The scanner unit 250 photo-electrically converts the reflected light 110 from the exposed document sheet by a CCD line sensor 111 (see FIG. 9) to read it as an electrical signal. The read image signal is processed in various manners by an image processing unit 61 to be described later and it is compressed and transferred to the PBM 65 of the printer unit 51. The printer unit 51 sequentially reads the images from the PBM 65 in accordance with the user setting from the OCU 53 and the read image is converted to an optical signal for the exposure of the photo-conductor.

Then, the conventional electro-photographic processes, that is, charging, exposing, latent image forming, developing, transferring, separation and fixing are conducted and the image is recorded on the record medium.

The basic operation in the image processing apparatus of FIG. 1 has thus been described.

Figure 2:
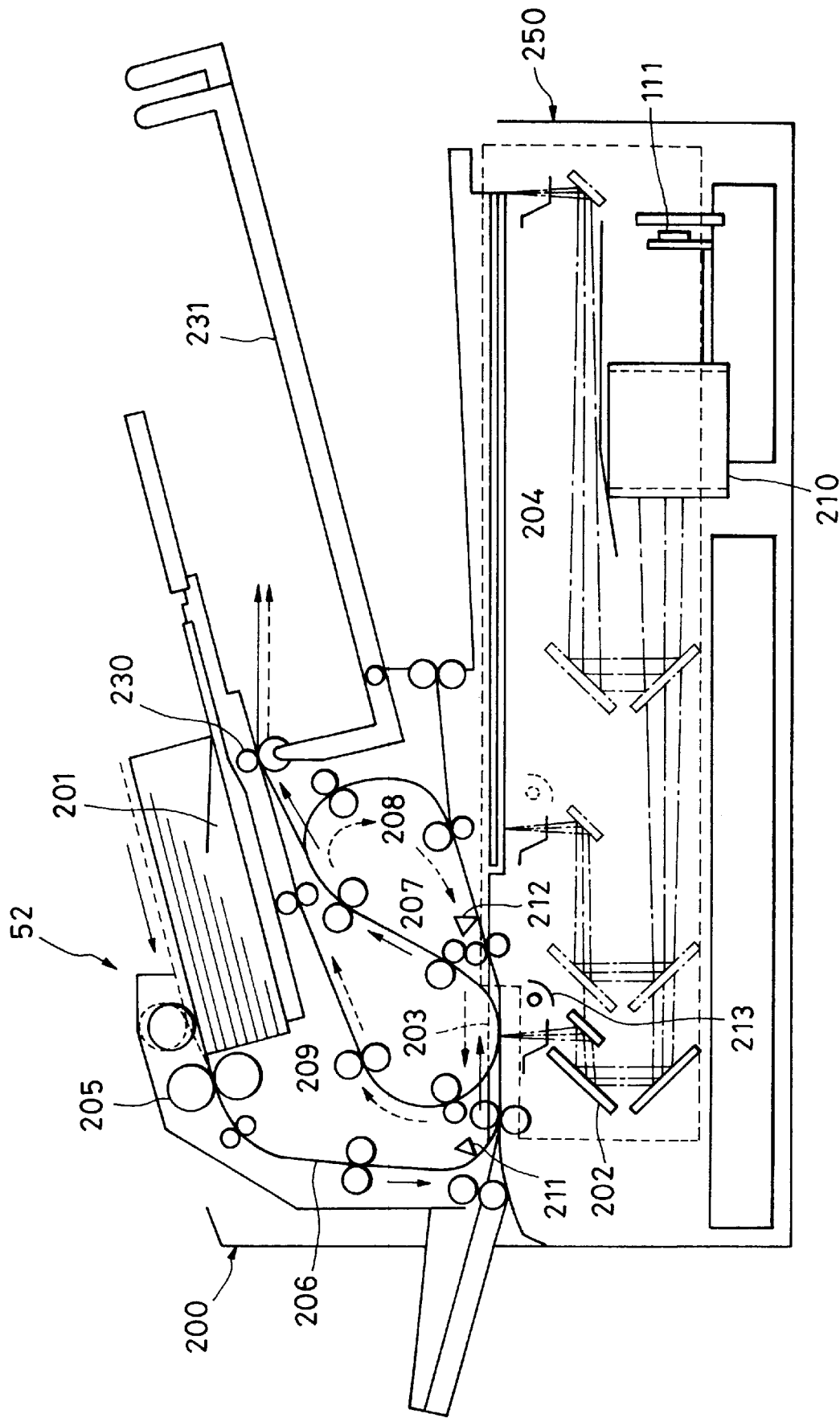
FIG. 2 shows a longitudinal side view of a construction of an automatic document sheet feed unit in the above image processing apparatus.
Figure 3A:
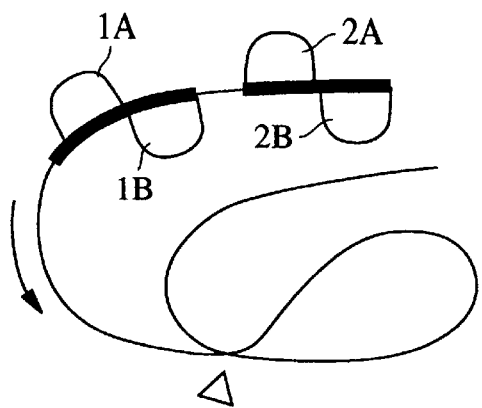
FIGS. 3A to 3F illustrate a document sheet feed operation of the automatic document sheet feed unit, FIG. 4 which is composed of FIGS. 4A and 4B shows a block diagram of an internal configuration of the image processing apparatus shown in FIG. 1, FIGS. 5A, 5B, 6A, 6B, 7A and 7B show examples of image processing in the image processing apparatus shown in FIG. 1.
Figure 3B:
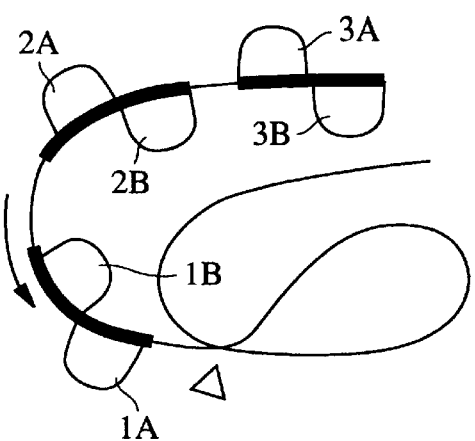
Figure 3C:
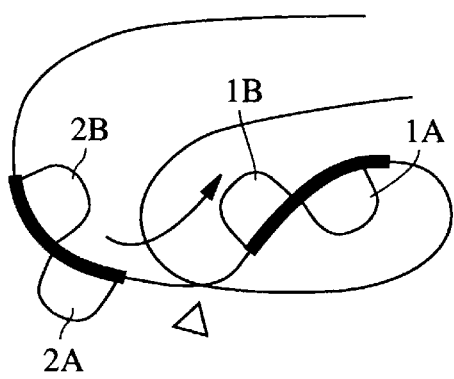
Figure 3D:
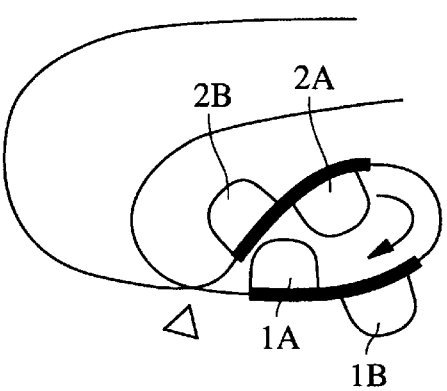
Figure 3E:
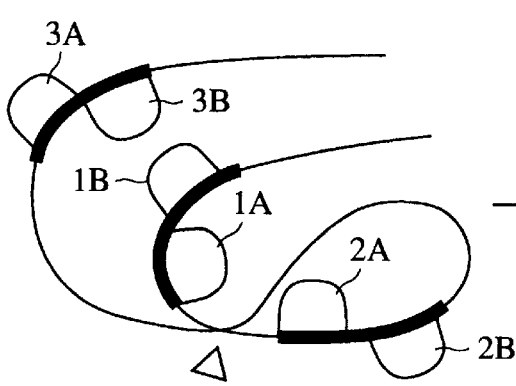
Figure 3F:
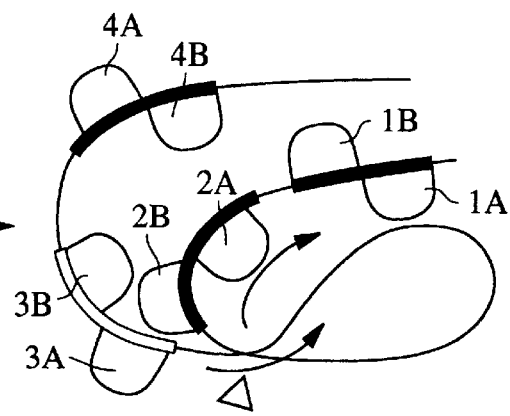

Referring now to FIG. 2, a basic operation of the ADF 200 is explained. FIG. 2 shows a longitudinal sectional view of a construction of the ADF 200 and the scanner unit 250 described above. In FIG. 2, numeral 201 denotes a document sheet tray for stacking document sheets, numeral 202 denotes a first mirror for directing a reflected light from the document sheet to the CCD 111, numeral 203 denotes a moving read document sheet read position, numeral 204 denotes a book mode scan read position, numeral 205 denotes a sheet feed unit, numeral 206 denotes a feed path to the moving read document sheet read position 203, numeral 207 denotes a feed path to eject a one-side document sheet read at the moving read document sheet read position 203, numeral 208 denotes a feed path to feed a rear side of the document sheet read in the moving read document sheet read position 203 to the moving read document sheet read position 203 and numeral 209 denotes a feed path to eject the document sheet after the rear side thereof is read in the moving read document sheet read position 203.

The moving read document sheet reading is the system in which the document sheet fed from the document sheet tray 201 is moved past the moving read document sheet read position 203 while the mirror 202 is fixed at the moving read document sheet read position 203 to scan the image. The document sheet is fed along the arrow marked on the feed path. When the rear side of the document sheet is read, it is read as a mirror image to the image read from the front side of the document sheet. A process to correct the mirror image to a real image will be described in connection with an image processing unit 61. In the drawing, the solid line arrow indicates the feed direction of the moving read of the one-side document sheet and the broken line arrow indicates the feed direction of the moving read of the dual-side document sheet.

Contrary to the moving read document sheet read system, the book mode scan is the system in which the scan is made while the optical system such as the mirror 202 and a lamp 213 is moved without moving the document sheet mounted on the book mode scan read position 204.

In any system, the read unit is moved relative to the document sheet to scan the document sheet.

The reflected light by the exposure to the document sheet passes through a lens 210 and is projected to the CCD line sensor (hereinafter referred to as a CCD) 111 and it is photo-electrically converted. In the construction shown in FIG. 2, for the longitudinal feed (portrait feed), the feed path 206 has a length to accommodate two A4-size document sheets. For the longitudinal feed (portrait feed) along a short side of the document sheet, the feed path 208 has a length to accommodate two A4-size document sheets. For the lateral feed (landscape feed) to feed the document sheet along a long side, the feed paths 206 and 208 have a length to accommodate one A3-size document sheet.

The document sheets mounted on the feed tray 201 are in a face-up leading-page process in which the document sheet front side faces up and the leading page is stacked at the top. In the one-side moving read, the document sheets are sequentially read along the solid line arrow, and in the dual-side moving read, the half-size document sheets (A4 longitudinal, B5 longitudinal, A5 longitudinal) assume a different sheet feed sequence. The half-size documents are fed two sheets at a time and the rear side reading is conducted through the feed path 208 for the two document sheets read at the moving read document sheet read position 203. Simultaneously with the completion of the reading of the two document sheets of the rear-side reading, the reading of the front sides of the next two document sheets is started. Namely, the reading is conducted in the sequence of the front side of the first document sheet, the front side of the second document sheet, the rear side of the first document sheet, the rear side of the second document sheet, the front side of the third document sheet, the front side of the fourth document sheet, the rear side of the third document sheet, The dual-side document sheet read operation is shown in FIGS. 3A through 3F. In FIGS. 3A through 3F, numerals 1A and 2A denote the document sheet images of the front side of the first and the front side of the second, respectively, numerals 1B and 2B denote document sheet images of the rear side of the first and the rear side of the second, respectively, numerals 3A and 4A denote document sheet images of the front side of the third and the front side of the fourth, respectively, and numerals 3B and 4B denote document sheet images of the rear side of third and the rear side of the fourth, respectively.

In the ADF 200 shown in FIG. 2, a non-circulation type document sheet feed unit is used in which the document sheet mounted on the document sheet tray 201 is not returned to the document sheet tray 201 but returned to a return tray 231. The sheet feed unit 205 and the feed paths 206, 207, 208 and 209 shown in FIG. 2 assume an independently driven construction so that they may be individually driven, stopped and speed-controlled. The document sheet feed in the ADF 200 is controlled by the controller 123 (see FIG. 4A) based on the designation from the OCU 53 and the status of the PBM (print buffer memory) 65.

In FIG. 2, numeral 211 denotes a waiting position in the feed path 206 and numeral 212 denotes a waiting position in the feed path 208. They are positions at which the document sheets are stopped in the feed paths in accordance with the status of the PBM 65 to be described later and the position control is conducted based on the sheet detection sensor pass time and the feed speed. In FIG. 2, numeral 230 denotes a feed path along which the document sheet is returned to the return tray 231.

Figures 4, 4A:
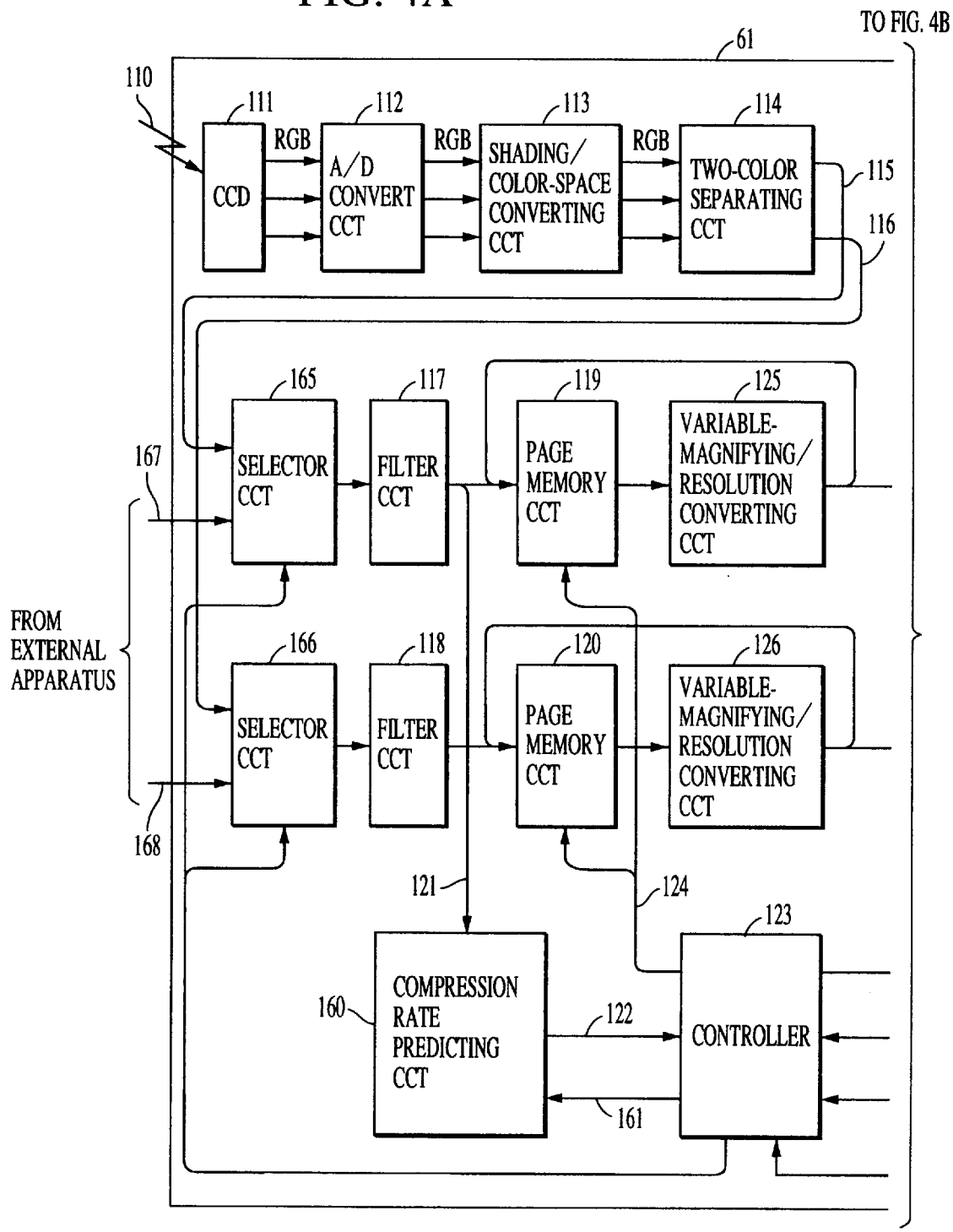
Figure 4B:
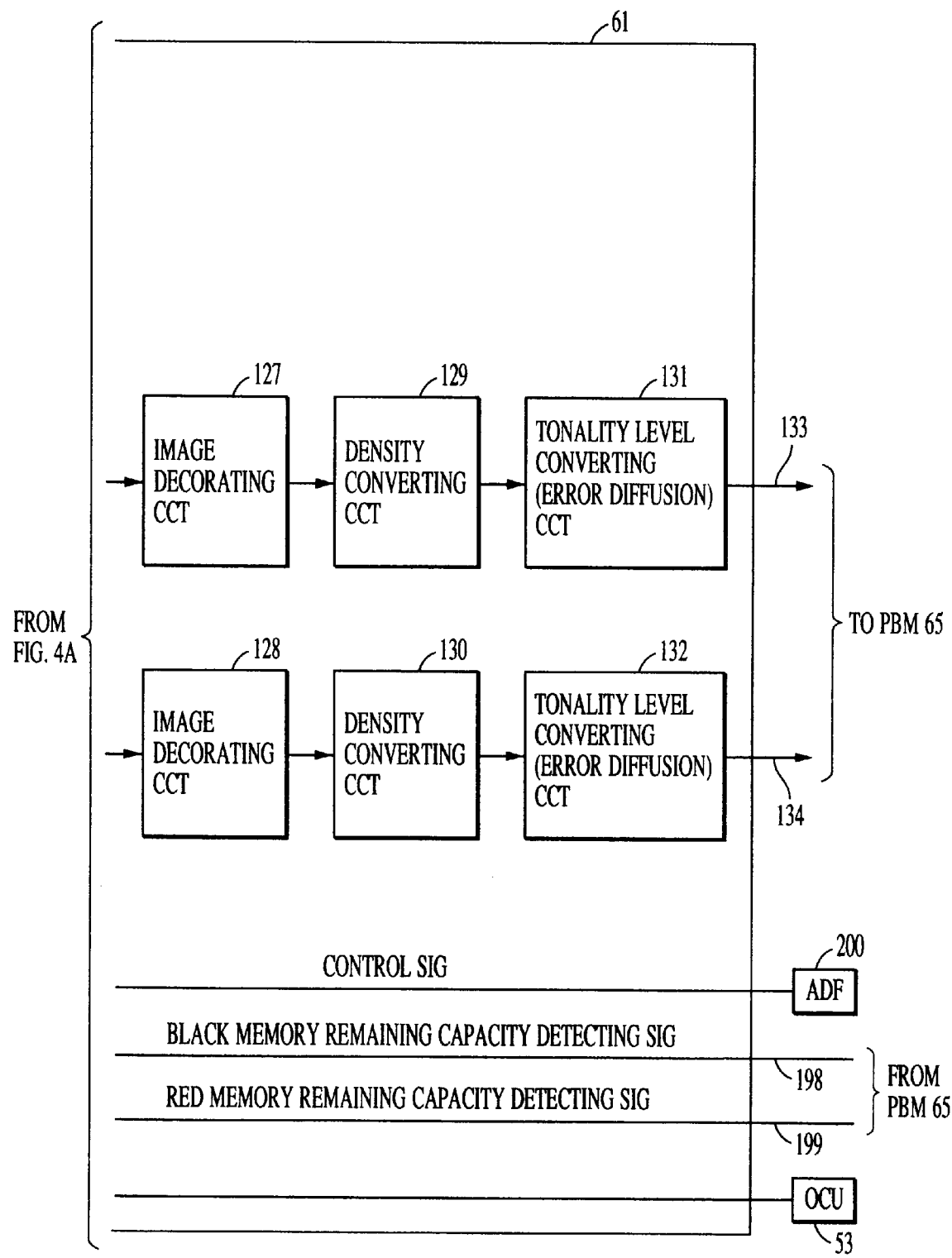

Referring to FIGS. 4A and 4B, the image processing unit 61 which conducts the image processing to the read image data is explained in detail. FIGS. 4A and 4B show a block diagram of a configuration of the image processing unit 61. In FIGS. 4A and 4B, the reflected light 110 of the document sheet reached to the document sheet read position is sensed by the CCD 111 and it is photo-electrically converted to generate RGB (red, green and blue) electrical signals. The generated image signals are amplified and then converted by an A/D (analog-to-digital) converter 112 to digital image signals. The digital RGB signals are black-corrected/white-corrected (shading-corrected) and color-corrected (masked) by a shading/color space conversion circuit 113 for normalization and standardization. The standardized RGB signals are brilliance/density converted and black/red two-color separated by a two-color separation circuit 114 to generate a black image data signal 115 and a red image data signal 116.

The subsequent process is conducted by independent circuit configurations for the black image data signal and the red image data signal in parallel. Selector circuits 165 and 166 select the image data 115 and 116 input from the CCD 111 or the black image data signal 167 and the red image data signal 168 externally input from the PC. The selection is based on the setting of the OCU 53.

Figure 5A:
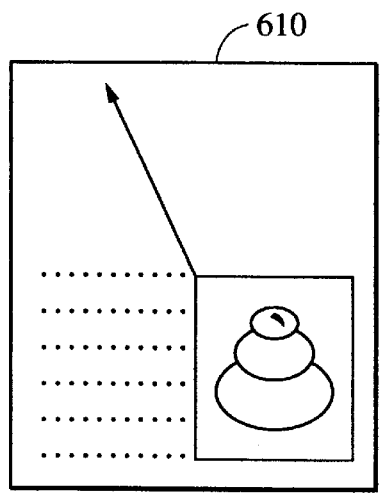
Figure 5B:
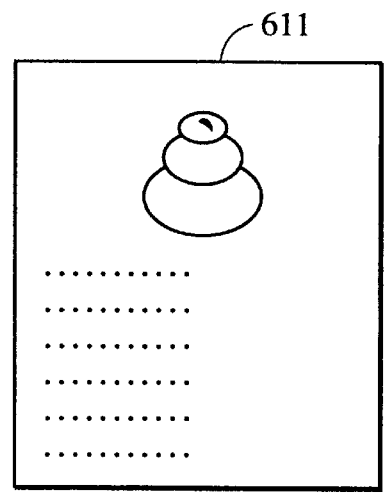
Figure 6A:
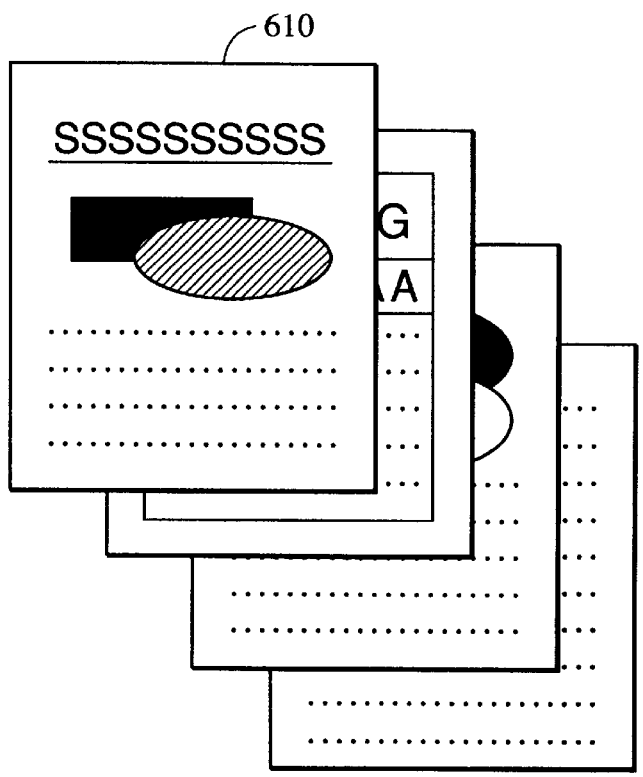
Figure 6B:
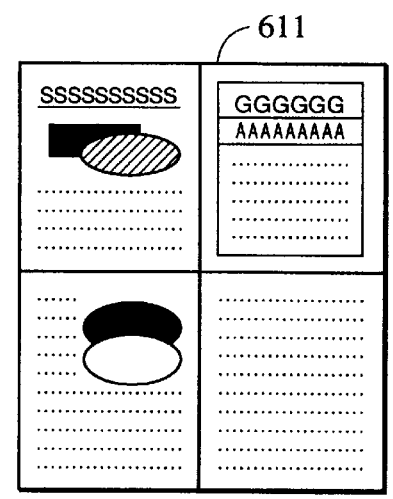

In filter circuits 117 and 118, the filtering is conducted in order to recover the reduction of MTF during the reading of the image and weaken a moare pattern generated in reading a mesh document sheet. Each of page memories 119 and 120 has a capacity to store one page of up to A3 size image. In the image read by the bidirectional document sheet feeder, the image read in the opposite direction to the forward direction is in a mirror image. The image read in the mirror image is further mirror-image processed to convert it to a real image by using the page memories 119 and 120. A process to attain a cut and paste function to move a specified area of a document sheet image 610 as shown in FIG. 5A to another area to create an image 611 as shown in FIG. 5B and a reduction layout function to reduce input document sheet images of a plurality of sheets by a factor of 50% by succeeding stage variable magnification/resolution conversion circuits 125 and 126 to form four-sheet document image 610 as shown in FIG. 6A into an image 611 on one sheet as shown in FIG. 6B are also conducted on the page memories 119 and 120 by the memory control signal 124 from the controller 123. The variable magnification/resolution conversion circuits 125 and 126 conduct the reduction layout function as well as the conventional image size conversion. Image modification circuits 127 and 128 attain the functions to form an image 621 as shown in FIG. 7B negative-positive reversed by designating an area on the document sheet image as shown in FIG. 7A, a meshed image 622 and a meshed image 623 by designating an area to the document sheet image 620.

Density conversion circuits 129 and 130 conduct gamma conversion and OCU 53 for correcting the linearity characteristic of the printer unit 51 and the process to reflect the density adjustment level input by the user to the image data. The image data heretofore are 8-bit 256-tone signals but tone conversion (error dispersion) circuits 131 and 132 convert them to printable 4-bit 16-tone image signals that is, black image data signal 133 and red image data signal 134. In order to cancel the irregularity in the density caused by the conversion of the number of tones when viewed for a certain area, the error due to the tone conversion is dispersed (or diffused).

The image signal processing operation conducted by the image processing unit 61 has thus been described.

The PBM (print buffer memory) 65 for storing a large number of pages of image for printing is now explained. FIG. 8 shows the block diagram of a configuration of the PBM 65. In FIG. 8, the image data signal 133 and the red image data signal 134 input from the image processing unit 61 to the PBM 65 are coded by a compression process of a variable length reversible compression system of compression circuits 150 and 153. The variable length reversible system has a property that the data amount after the compression differs from input image to input image but the image which is same as the input image can be restored after the decompression process and it is compared with a fixed length non-reversible compression system such as the JPEG. The variable length reversible compression system includes MH, Q-CODER and Lempel Ziv, and any one of them may be used. DRAMs 151 and 154 form a memory unit in the PBM 65 and comprise a semiconductor memory or a hard disk and a control unit for addressing it. When page rearrangement such as a pamphlet mode (page 1 and page N are recorded on front pages and page 2 and page N–1 are recorded on rear pages thereof, and other pages are arranged in the same manner) is conducted, it is attained by controlling the addressing in the DRAMs 151 and 154. The image to be printed out is read from the DRAMs 151 and 154 and it is restored to the original image data by decompression circuits 152 and 153. The read timing for the black image data signal 135 is that required to form the black image and the read timing for the red image data signal 136 is that required to form the red image and they are read independently. The DRAMs 151 and 154 store the image data relating to all jobs. Remaining capacity detection circuits 157 and 158 detect capacities of storable area of the DRAMs 151 and 154, respectively, and output the detection results as a black memory remaining capacity detection signal 198 and a red memory remaining capacity detection signal 199. The black image data signal 135 and the red image data signal 136 are output to a D/A converter and a laser driver.

Figure 9A:
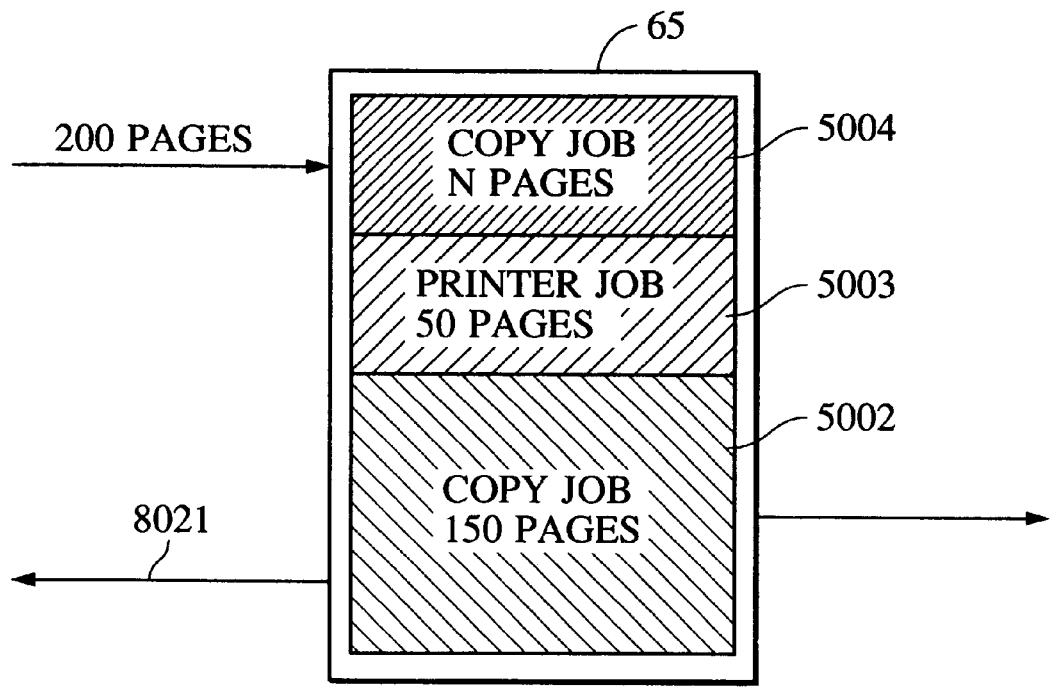
Figure 9B:
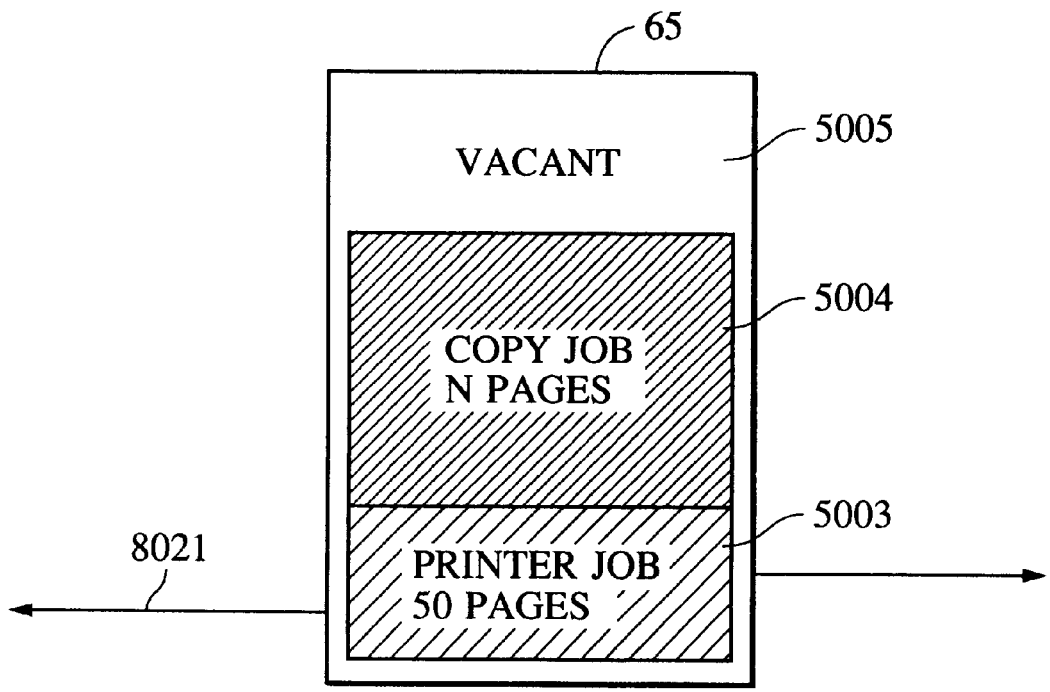

Referring to FIGS. 9A and 9B, an operation thereof is explained. FIGS. 9A and 9B show a conceptual view of the PBM 65. In FIG. 9A, numeral 5002 denotes a copy job (to record in accordance with the image read by the CCD 111) which is being printed and copies 100 sets of 150 pages of document sheets. The pages 1 to 150 are sequentially read, but each set, for print out and then finishing process is conducted. Numeral 5003 denotes a job which is withheld as the job to be executed next and it finishes 60 sets of 50 pages by a print job (to record in accordance with the image data input from the PC) requested from the external equipment such as the PC. Numeral 5004 denotes a copy job of 50 sets of 200 pages. It is in the course of reading the image for 200 pages. In this case, the PBM 65 becomes full before the completion of the storing of 200 pages of image data and the read operation is temporarily interrupted. The job 5002 prints out pages 1 to 150 of the last 100th set which has been continuously read and the image for the printed-out pages no longer need be stored and it is replaced with the image of the withheld job 5004. When the job 5002 is completed, the printing of the withheld job 5003 is started. Numeral 8021 denotes status information of the PBM.

In FIG. 9B, numeral 5005 denotes a vacant area in the PBM 15 to which other jobs may be input (stored) so long as the memory capacity permits.

Referring to FIG. 4, compression rate prediction is described. The image data stored in the DRAMs 151 and 154 of the PBM 65 have been compressed by the compression circuits 150 and 153 and the compression rates thereof differ depending on the image data amount, the content thereof and the process to the image data. Thus, a compression predicting circuit 160 predicts the compression rate of the image stored in the page memories 119 and 120 which is to be stored in the PBM 65 based on the modification information (meshing in FIG. 7B, partial movement in FIG. 5) of the image obtained from the controller 123 through a bus 161, the magnification information (reduction layout of FIG. 6) and the operations of the selected density conversion circuits 129 and 130 and the tone conversion circuits 131 and 132. Namely, the compression rate predicting circuit 160 applies a simple arithmetic operation to the statistics of the image information (a density means value of the image or an entropy which has a high correlation with the compression rate) to determine the prediction value. The arithmetic operation or the coefficient used therefor is changed in accordance with the processing information which indicates the processes applied to the image data. For example, the density mean value of the image is used for the prediction and the following formula (1) is used to convert it to the prediction value.

$$\text{Compression rate prediction value} = \text{mean image density value} \times a + b \quad (1)$$

where a and b are determined in accordance with the contents of the processes of the image. By referring to a RAM table, not shown, a and b are redetermined and they are transmitted to the compression rate predicting circuit 160 through the bus 161. As an example, assuming that the means density value of the image area is 40, the coefficient a for the process is 0.01 and b is 0.1, the prediction value is determined by the following formula (2).

$$\text{Compression rate prediction value} = 40 \times 0.01 + 0.1 = \quad (2)$$

This represents that the data amount after the compression is ½ of the data amount before the compression.

In this manner, the compression rate predicting circuit 160 predicts the compression rate of the image data stored in the page memories 119 and 120.

Figure 10:
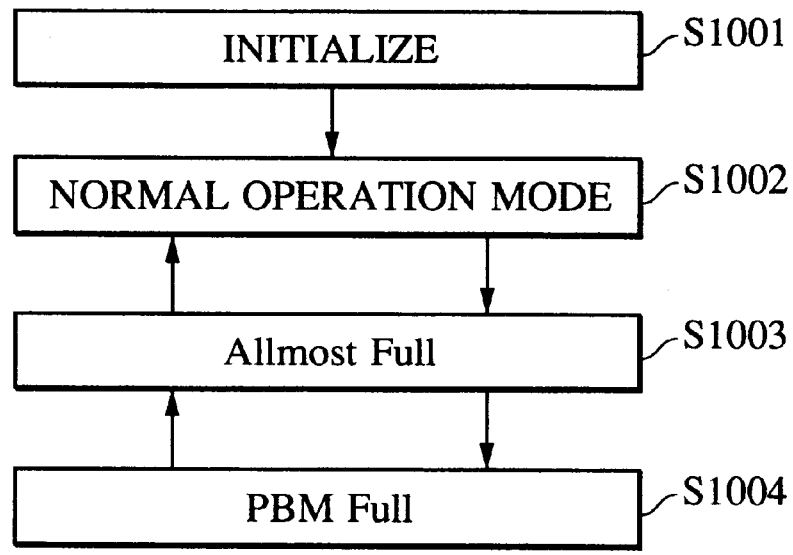
FIG. 10 shows a status transition diagram (STD) of the image processing apparatus shown in FIG. 1.

Referring to FIG. 10, an operation of the ADF 200 in the image processing apparatus of the present invention is now explained. FIG. 10 shows a STD (status transition diagram) illustrating the status of the ADF 200 in the image processing apparatus of the present embodiment. In FIG. 10, in a step S1001, a power is turned on to initialize the apparatus and the apparatus assumes the normal operation mode in a step S1002. In the normal operation mode, if it is determined that some vacant area is available but it is not sufficient to store the image data for which the compression rate has been predicted, on the basis of the remaining capacity detection signals 198 and 199 (see FIG. 8), the prediction value by the compression rate predicting circuit 160 and the image data amount, an almost full status to be described later is elk assumed in a step S1003. In the almost full status, if it is determined that the vacant area in the PBM 65 is exhausted based on the remaining capacity detection signals 198 and 199, a PBM full status to be described later is assumed in a step S1004. In the PBM full status, if it is determined that a vacant area is available in the PBM 65 based on the remaining capacity detection signals 198 and 199, the almost full status is assumed in the step S1003. In the almost full status, if it is determined that a room to store the image data for which the compression rate has been predicted is available based on the remaining capacity detection signals 198 and 199, the normal operation mode of the step S1002 is assumed.

Operations in the respective status are explained below.
[Normal Operation Mode]

Figure 11:
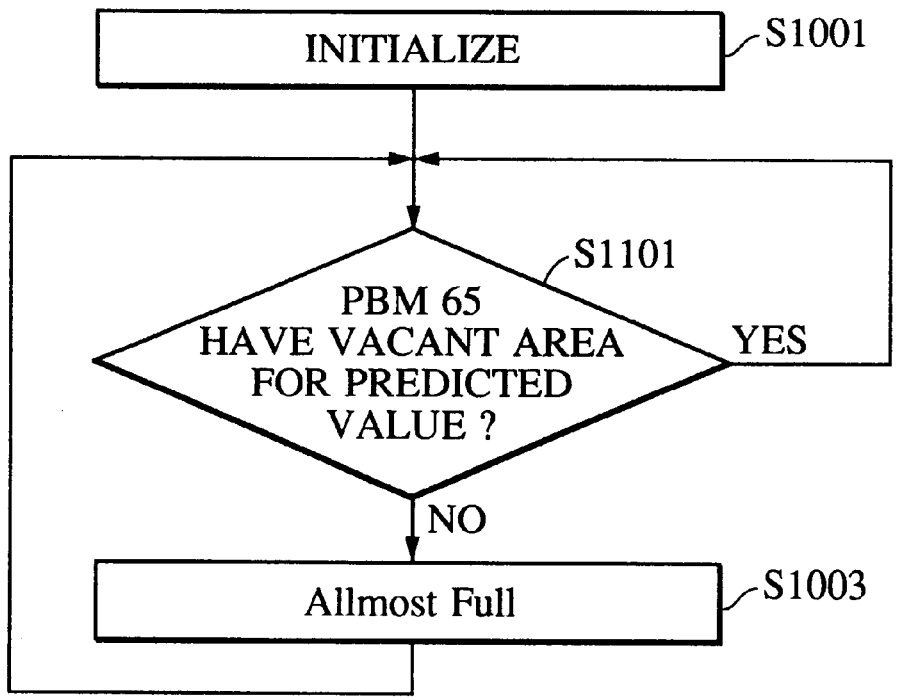
FIG. 11 shows a flow chart of an operation control process in a normal operation mode of the image processing apparatus shown in FIG. 1.

The normal operation mode is first explained with reference to a flow chart of FIG. 11. In the normal operation mode in the step S1002 in FIG. 10, whether a room to store the image data for which the compression rate has been predicted is present in the PBM 65 or not is determined in a step S1101 of FIG. 11 based on the remaining capacity detection signals 198 and 199. If there is no room, the process proceeds to the almost full mode (step S1003 of FIG. 10). If there is a room in the step S1101, the normal operation mode is maintained and the decision process of the step S1101 is again conducted. In this manner, when there is a room to store the image data for which the compression rate has been predicted in the PBM 65, the present apparatus repeatedly conducts the decision process in the step S1101.

Figure 14:
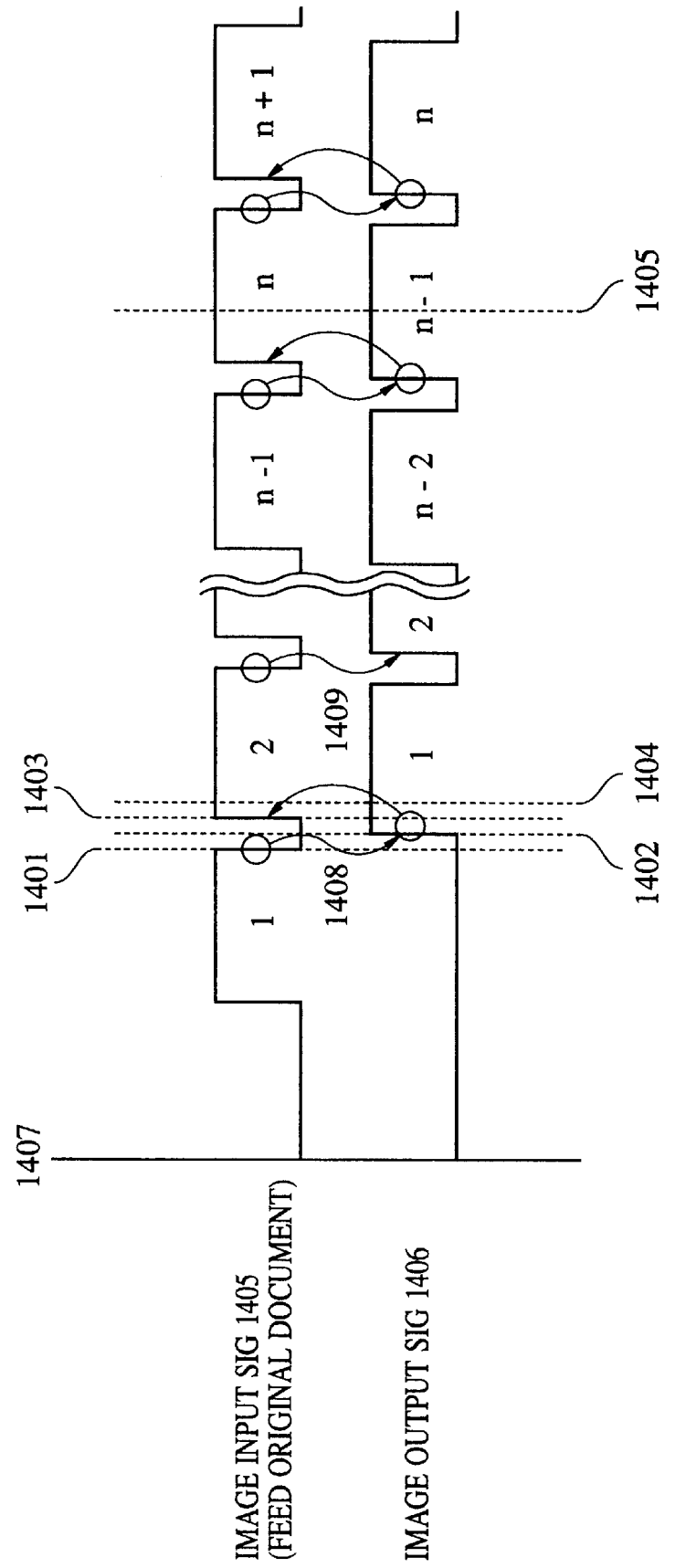
FIG. 14 shows a time chart of input/output timing of an image to a page memory in the normal operation mode of the image processing apparatus of FIG. 1.
Figure 19:
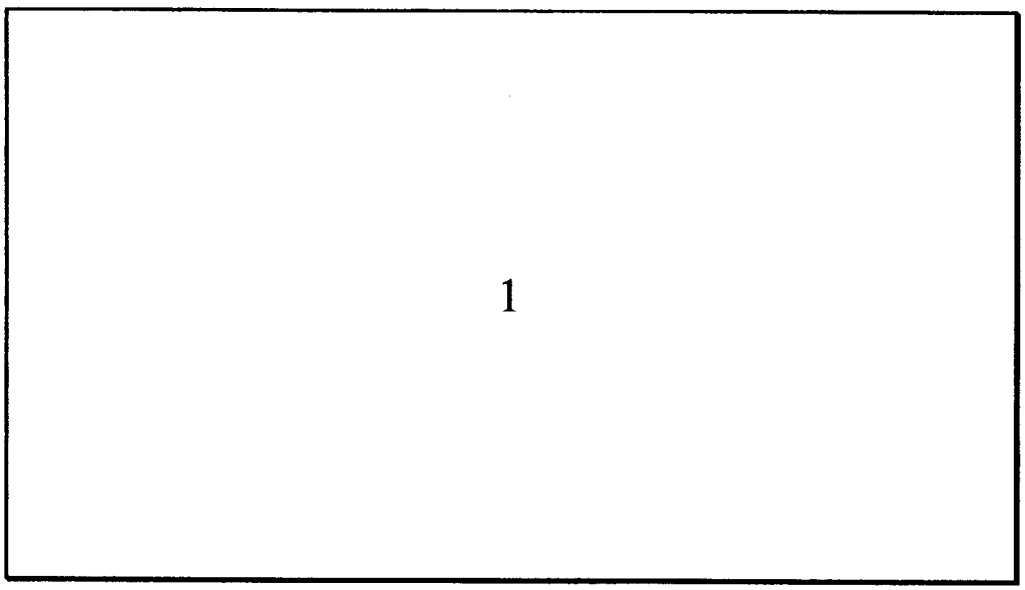
FIG. 19 shows a conceptual view of the page memory when an image occupies the page memory in the image processing apparatus shown in FIG.

An operation timing of an image input signal 1405 input to the page memories 119 and 120 and an image output signal 1406 output from the page memories 119 and 120 is now explained with reference to a timing chart of FIG. 14. The image input signal 1405 is linked to the document sheet feed. In FIG. 14, numerals 1, 2, n−1, n, n+1 denote the sequence of the read document sheet. From the document sheet scan start (1407), the document sheets fed by the ADF 200, one at a time, are sequentially read by the scanner unit 250 and the image signal from the CCD 111 passes through the filters 117 and 118 and stored in the page memory 119 or 120. Thereafter, the storing of one page of image data is completed (1401). The page memory 119 or 120 in this status is shown in FIG. 19. As shown in FIG. 19, when the document sheet is of A3-size, the entire area of the page memory 119 or 120 is occupied by the first page of data.

Figure 20:
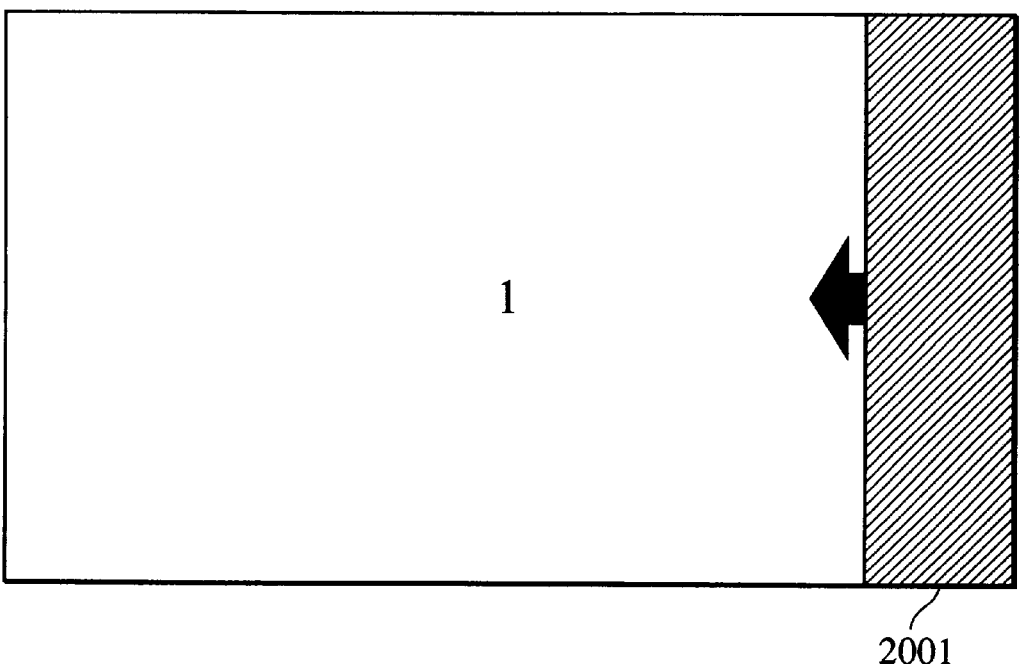

Upon completion of one page of image input (1408), the controller 123 starts to output the image signal from the page memory 119 or 120 to the PBM 65. Upon the start of the image output (1409), the controller 123 commands to the ADF 200 to feed the next document sheet to the moving read position 203. In this manner, the storing of the document sheet data of the second page to the page memory 119 or 120 is started (1403). The page memory 119 or 120 in this status is shown in FIG. 20. As shown in FIG. 20, the areas of the page memory 119 or 120 from which the images have been output are sequentially released as an open area 2001.

Figure 21:
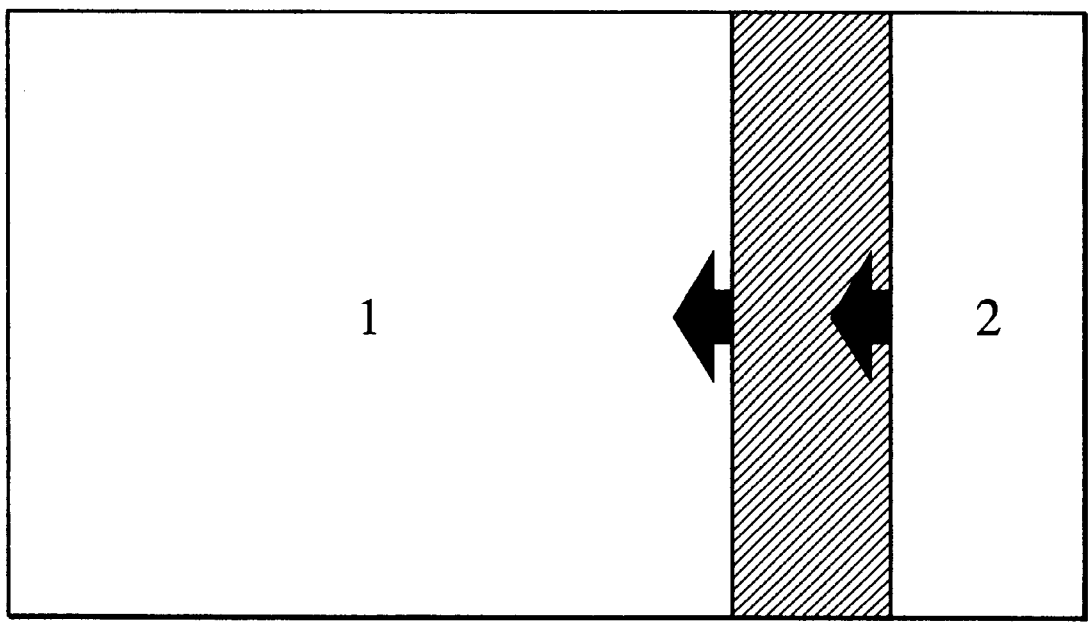
FIG. 21 shows a conceptual view of the page memory when images 1 and 2 coexist in the page memory in the image processing apparatus shown in FIG. 1.
Figure 22:
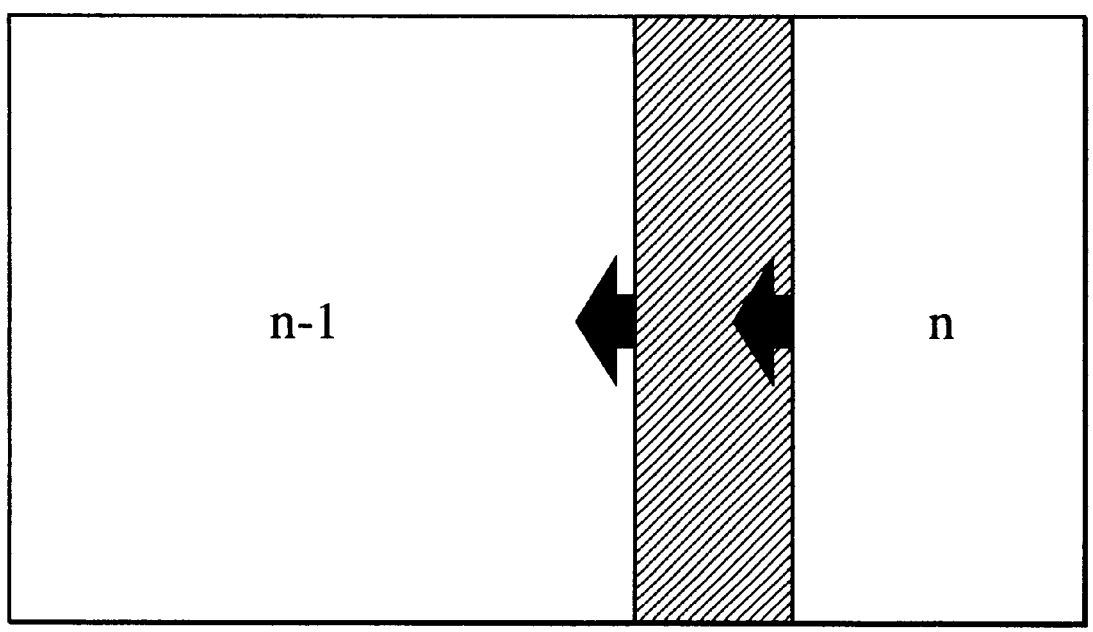
FIG. 22 shows a conceptual view of the image memory when images n–1 and n coexist in the page memory in the image processing apparatus shown in FIG. 1.

The second page of document sheet is written into the open area 2001, and at a time 1404 of FIG. 14, the page memory 119 or 120 assumes a status as shown in FIG. 21. In general, during the period of outputting the page (n−1) and inputting the page n (1405), two pages of image data as shown in FIG. 22 coexist in the page memory 119 or 120.

[Transition from Normal Operation Mode to Almost Full Mode]

As described above, in the step S1101 of FIG. 11, when the controller 123 determines a possibility of the full status of the PBM based on the image data amount for which the compression rate has been predicted and the remaining capacity detection signals 198 and 199, the almost full mode of the step S1003 of FIG. 10 is assumed.

Figure 15:
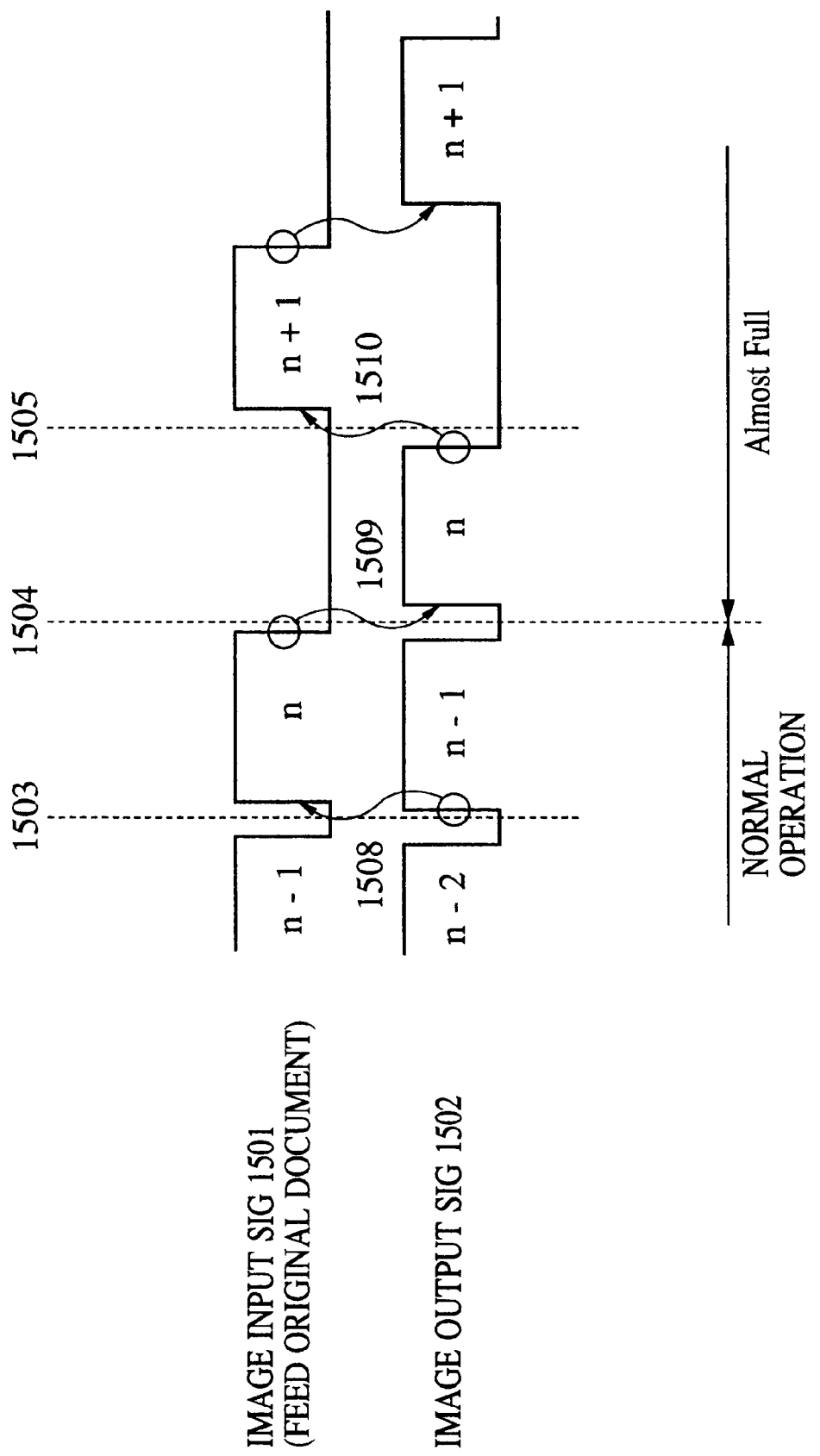
FIG. 15 shows a time chart of input/output timing of an image to the page memory in the transition from the normal operation mode to the almost full mode of the image processing apparatus shown in FIG. 1.

An operation of the transition is explained with reference to the timing chart of FIG. 15. In FIG. 15, n−1, n, n+1, n+2 denote the sequence of the read document sheets. Numerals 1501 and 1502 denote input and output of the document sheet data, respectively, for the page memory 119 or 120. In FIG. 15, the process operates in the normal operation mode of the step S1002 of FIG. 3, until the room to store one page of document sheet disappears in the PBM 65 (1504). After the time 1504 of FIG. 15, the PBM 65 does not have the room to store one page of image data so that whether the image data currently stored in the page memory 119 or 120 can be stored in the PBM 65 or not can be first determined by actually storing the image data in the PBM 65. This status is referred to as the almost full mode. In this status, since an operation to check whether the n-th image data has been actually stored in the PBM 65 or not is needed, the storing of the next page of image data to the page memory 119 or 120 cannot be executed until the check is completed. Accordingly, the ADF 200 shown in FIG. 2 is operated to limit the number of sheets per unit time fed by the fed unit 205. Namely, the document sheet interval is set longer than that in the normal operation mode (skip operation or step operation) so that the feed can be stopped at any time. When the mode is changed to the almost full mode, the controller 123 of FIG. 4 commands the operation of this sequence to the ADF 200 and the skip operation sequence is continued until the almost full mode is released.

The sequence in the almost full mode may be conducted by controlling the number of sheets per unit time to be fed by the feed unit 205 of the ADF 200 of FIG. 2 as shown in the present embodiment, or by controlling the sheet feed speed and the feed speed in the feed path 206.

[Almost Full Mode]

An operation in the almost full mode is explained with reference to a flow chart of FIG. 12. In the almost full mode of the step S1003 of FIG. 10, whether a room to store the image data for which the compression rate has been predicted is present in the PBM 65 or not is always monitored based on the remaining capacity detection signals 198 and 199, and if the room is available, the process is shifted to the normal operation mode. Further, whether a vacant area is present in the PBM 65 or not is monitored, and if no vacant area is available, the process assumes the PBM full mode as described above.

When the mode is changed from the normal operation mode to the almost full mode, whether a room to store the image data for which the compression rate has been predicted is available or not in a step S1202, and if it is available, the process proceeds to the normal operation mode, and if it is not available, the process proceeds to a step S1201. In the step S1201, whether there is a vacant area in the PBM 65 or not is determined, and if there is vacant area, the process proceeds to a step S1202 and if there is no vacant area, the process shifts to the PBM full mode.

Figure 12:
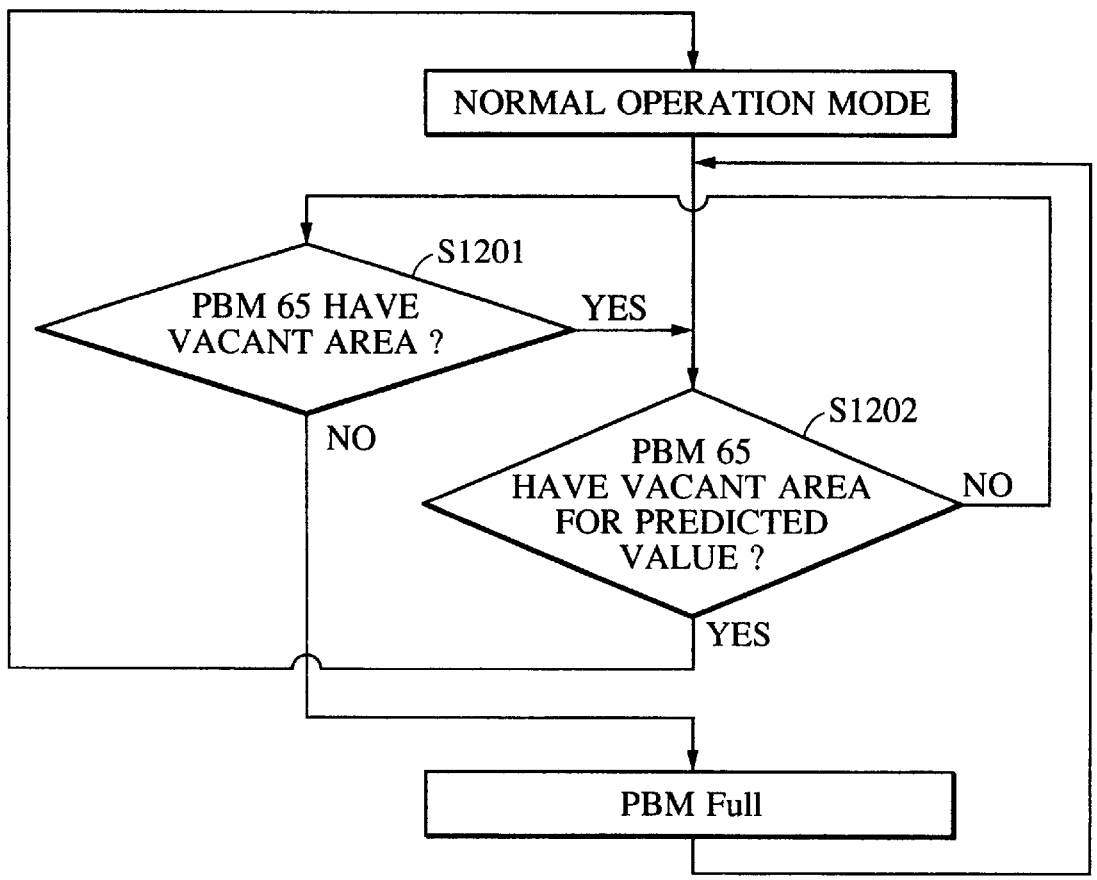
FIG. 12 shows a flow chart of an operation control process in an almost full mode of the image processing apparatus shown in FIG. 1.

In the almost full mode in the step S1003 of FIG. 10, the present apparatus alternately transits between the steps S1201 and S1202 of FIG. 12.

An operation in the almost full mode is explained with reference to the timing chart of FIG. 15. In the normal operation mode in the step S1002 of FIG. 10, in response to the start of outputting of the image data of the previous document sheet n from the page memories 119 and 120 (1408 in FIG. 14), the next document sheet (n+1) is fed to the moving read position 203 as described above in connection with the normal operation mode by FIG. 21. In the almost full mode in the step S1003 of FIG. 10, since the image data of the document sheet n is not stored in the PBM 65, the next document sheet (n+1) cannot be read until the storing of the image data of the document sheet n has been stored in the PBM 65. Accordingly, in the almost full mode, the feed of the document sheet (n+1) is not started even if the outputting of the image data of the document sheet n is started. That is, in response to the completion of the image input of the page n (1509), the controller 123 starts the outputting of the image of the page n from the page memory 119 or 120 to the PBM 65. In response to the completion of the image output (1510), the controller 123 releases the areas of the page memories 119 and 120 and commands to the ADF 200 to feed the next document sheet (n+1) to the moving read position 203. In this manner, the storing of the document sheet data of the page (n+1) to the page memory 119 or 120 is started. Subsequently, the completion of the reading of the document sheet and the waiting of the completion of the outputting of the image data are alternately repeated and in the almost full mode in the step S1003 of FIG. 10, the sheet interval of the document sheets in the ADF 200 is increased and the productivity is reduced to approximately one-half of that in the normal operation mode in the step S1002 of FIG. 10. However, since the areas of the page memories 119 and 120 are released after the completion of the outputting of the image data, the read data is not broken.

[Transition from Almost Full Mode to PBM Full Mode]

Referring to a flow chart of FIG. 12, a transition operation from the almost full mode to the PBM full mode is explained. When the controller 123 determines in the monitoring in the step S1201 of FIG. 12 that the PBM 65 is full based on the remaining capacity detection signals 198 and 199, it commands to the PBM 65 to discard the image data of the page which is being lastly stored in the PBM 65 and the management information thereof from the PBM 65 and then shifts the mode to the PBM full mode of the step S1004 of FIG. 10.

Figure 16:
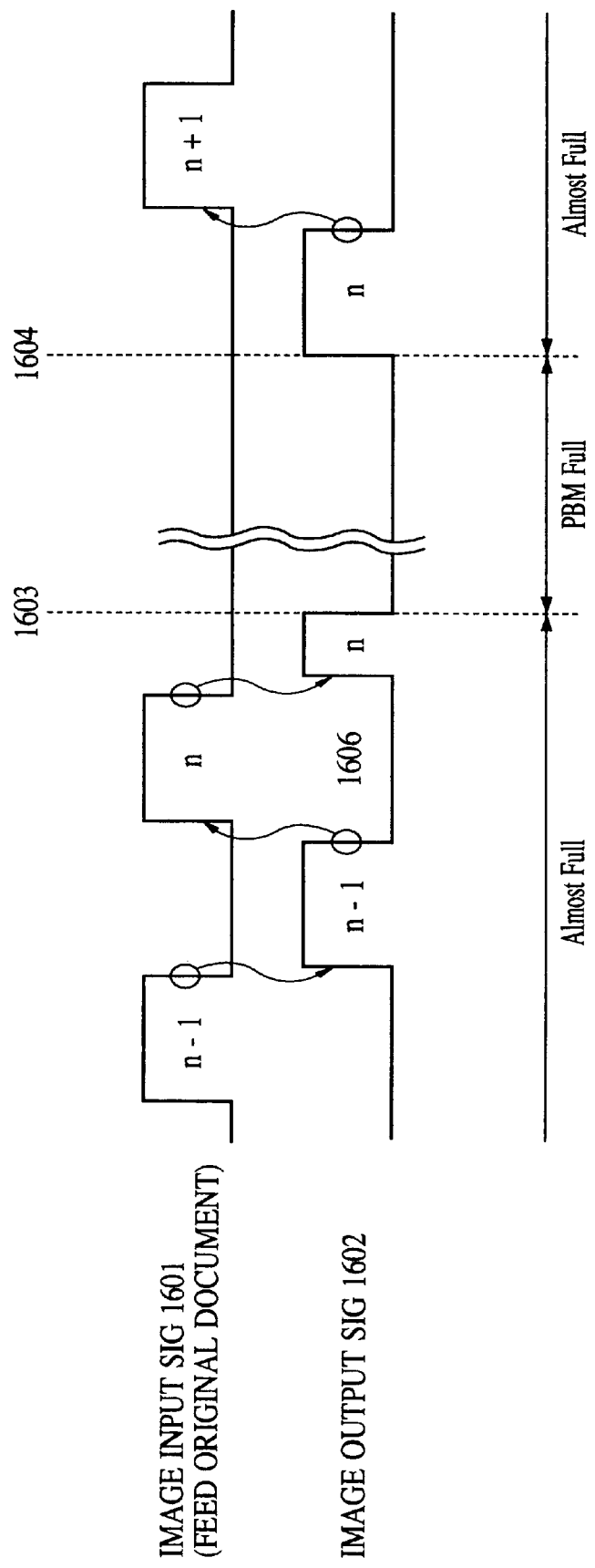
FIG. 16 shows a time chart of input/output timing of an image to the page memory in the transition between the almost full mode and the PBM full mode of the image processing apparatus shown in FIG. 1.

The transition operation is explained with reference to a timing chart of FIG. 16. In FIG. 16, n−1 and n denote the sequence (pages) of the read document sheets. Numerals 1601 and 1602 denotes input and output respectively, of the document sheet data for the page memories 119 and 120. In FIG. 16, numeral 1603 denotes a time at which a vacant area is no longer available in the PBM 65 in the course of outputting the image data of the document sheet n to the PBM 65. The almost full mode operation in the step S1003 of FIG. 10 is conducted until a vacant area in the PBM 65 becomes unavailable (1603). After the time 1603 in FIG. 16 there is no space to store the document sheet data in the PBM 65 and the outputting of the image to the PBM 65 is interrupted. This status is referred to as the PBM full mode. The image of the document sheet n in the page memories 119 and 120 is maintained.

In this status, since the reading of the document sheet is stopped until a vacant area to store the data becomes available in the PBM 65, the ADF 200 shown in FIG. 2 stops the feeding of the sheet by the sheet feed unit 205 and waits for the command to start from the controller 123 of FIG. 4. Namely, at the time of shifting to the PBM full mode, the controller 123 of FIG. 4 commands to the ADF 200 of FIG. 4 to stop the moving read image read sequence operation.

At the time of shifting to the PBM full sequence, the document sheet (n+1) in the feed path is stopped before it reaches the moving read image read position 203.

The document sheet which is in the feed path but the reading therefor has been completed and located at a position which permits the ejection is not stopped but ejected. In FIG. 2, in the one-side read mode, the document sheets are withhold in the feed path 205 and the convey path 206. The document sheet on the convey path 207 is ejected. In the dual-side read mode, the document sheets are withhold in the feed unit 205 and the convey paths 206 and 208 and the document sheet in the convey path 209 is ejected.

As described above, each of the convey paths can be independently driven, stopped and speed-controlled. Accordingly, as shown in FIG. 2, the feed unit 205 or the convey paths 206 and 208 are provided with independent wait positions 211 and 212 to attain the withholding of the document sheet in the PBM full mode.

[PBM Full Mode]

Figure 13:
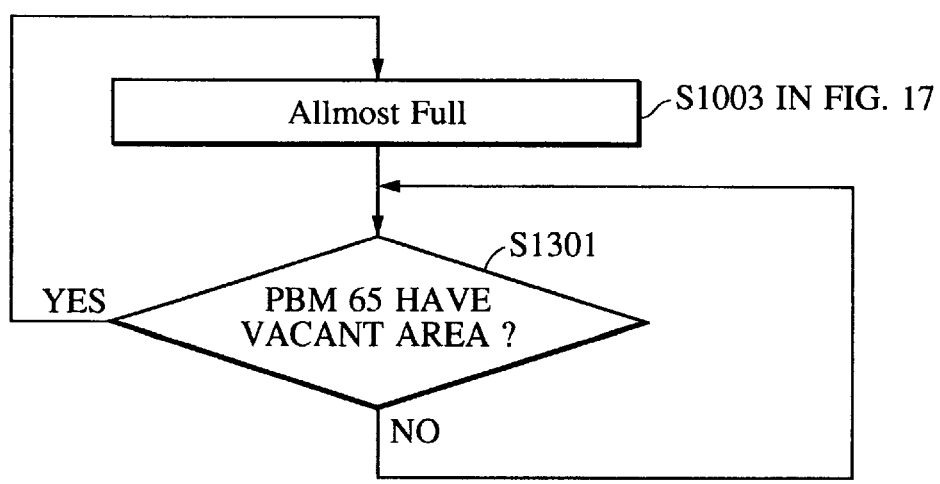
FIG. 13 shows a flow chart of an operation control process in a PBM full mode of the image processing apparatus shown in FIG. 1.

An operation in the PBM full mode is now explained with reference to the flow chart of FIG. 13 and the timing chart of FIG. 16. In the step S1004 of FIG. 10, whether there is a vacant area in the PBM 65 or not is continuously monitored based on the remaining capacity detection signals 198 and 199, and if there is no vacant area, the process returns to the step S1301 of FIG. 13 to monitor whether a vacant area becomes available in the PBM 65 or not. If it is determined that a vacant area is available in the PBM 65, the mode is shifted to the almost full mode of the step S1003 of FIG. 10, and if it is determined that no vacant area is available, the process returns to the step S1301 to conduct the monitoring again. In the PBM full mode of the step S1004 of FIG. 10, the occurrence of a vacant area in the PBM 65 is waited (for a period from 1603 to 1604 in FIG. 16).

The operation of the ADF 200 shown in FIG. 2 is in the stop status and waiting for a resume command from the controller 123.

[Recovery of PBM Full Mode]

The recovery from the PBM full mode is explained with reference to the timing chart of FIG. 16. In the step S1301 of FIG. 13, if it is determined that a vacant area is available in the PBM 65 based on the remaining capacity detection signals 198 and 199, the controller 123 starts to output from the top of the image data stored in the page memories 119 and 120 (the image of the document sheet n output to the PBM 65 in the PBM full mode). As described above, the control mode of the controller 123 is in the almost full mode in the step S1003 of FIG. 10 from the start of the image output. If the vacant area of the PBM 65 available at that time is smaller than the capacity to store one page of document sheet and the vacant area in the PBM 65 is again exhausted, the PBM full mode of the step S1004 of FIG. 10 is again assumed and the expansion of the vacant area in the PBM 65 is waited.

When a vacant area is available in the PBM 65 and the almost full mode is assumed and the storing of the image output from the page memories 119 and 120 to the PBM 65 is completed, the controller 123 of FIG. 4 commands to resume the operation of the ADF 200 shown in FIG. 2. When the ADF 200 receives the command, the ADF 200 resumes the feed of the document sheet (n+1) which is standing by in the stand-by positions 211 and 212 of FIG. 2 and the document sheet on the document sheet tray, and resumes the reading at the moving read image read position 203.

[Recovery from Almost Full Mode]

As described above, when the present apparatus shifted from the normal operation mode in the step S1002 of FIG. 10 or the PBM full mode to the almost full mode in the step S1003 determines in the step S1202 of FIG. 12 that the image data for which the compression rate has been predicted may be stored in the PBM 65 based on the remaining capacity detection signals 198 and 199, it assumes the normal operation mode of the step S1002 of FIG. 10.

A recovery operation from the almost full mode is now explained with reference to timing charts of FIGS. 17 and 18.

Figure 17:
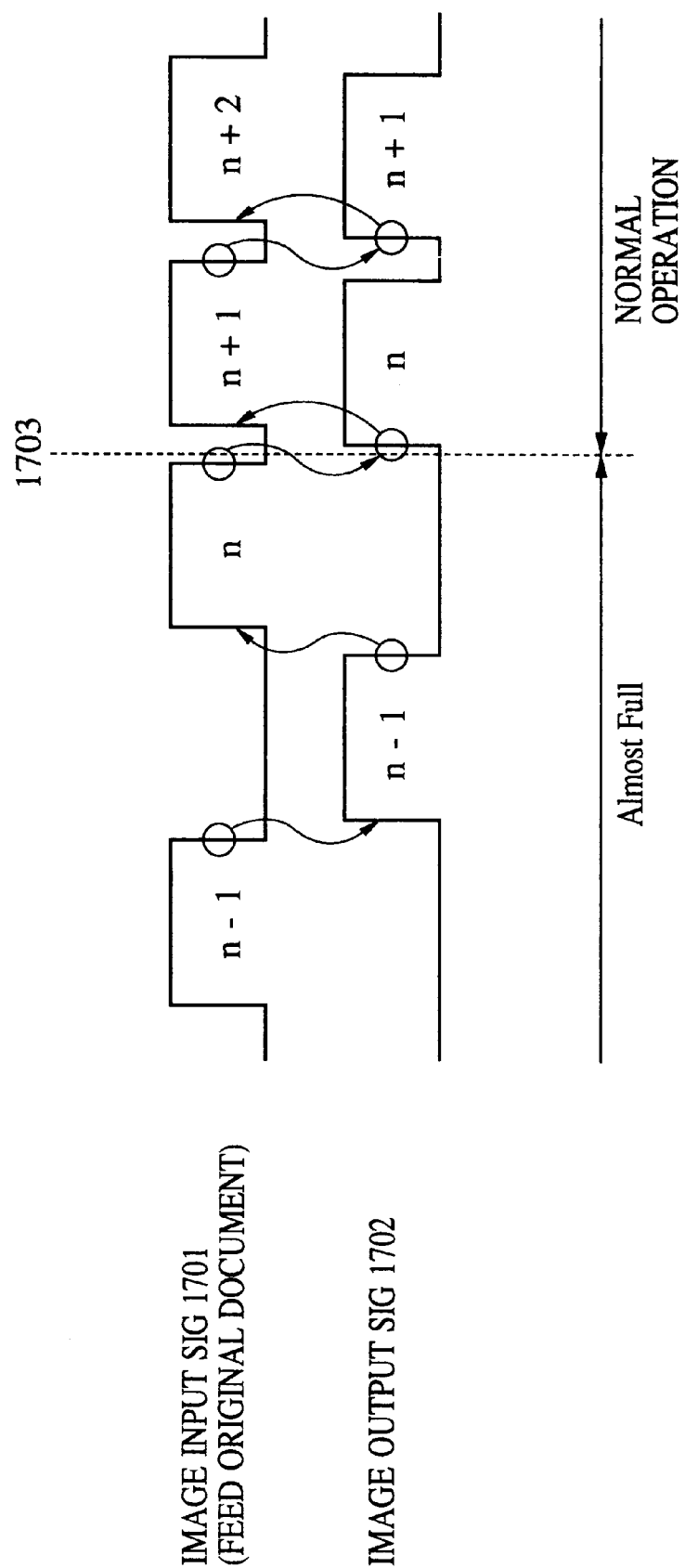
FIG. 17 shows a time chart of input/output timing of an image to the page memory in the recovery from the almost full mode of the image processing apparatus shown in FIG. 1.

FIG. 17 shows a status in which a storage space for the image of the page (n–1) document sheet is created in the PBM 654 by the reading of the image from the PBM 65 during the reading of the page (n–1) document sheet. In FIG. 17, n–1, n, n+1, n+2 denote the sequence of the read document sheets. Numerals 1701 and 1702 denote input and output of the document sheet, respectively, for the page memories 119 and 120. When a vacant area to store the one page of image data for which compression rate has been predicted is not available in the PBM 65, the almost full mode of operation in the step S1003 of FIG. 10 is conducted. After 1703 when the creation of a larger vacant area than predicted in the PBM 65 is detected during the reading of page n document sheet by a reason that the outputting of all of a large image data of other job is completed or other job coexisted in the PBM 65 is discarded, the almost full mode is released and the page (n+l) document sheet may be read without waiting for the completion of the page n image data.

Figure 18:
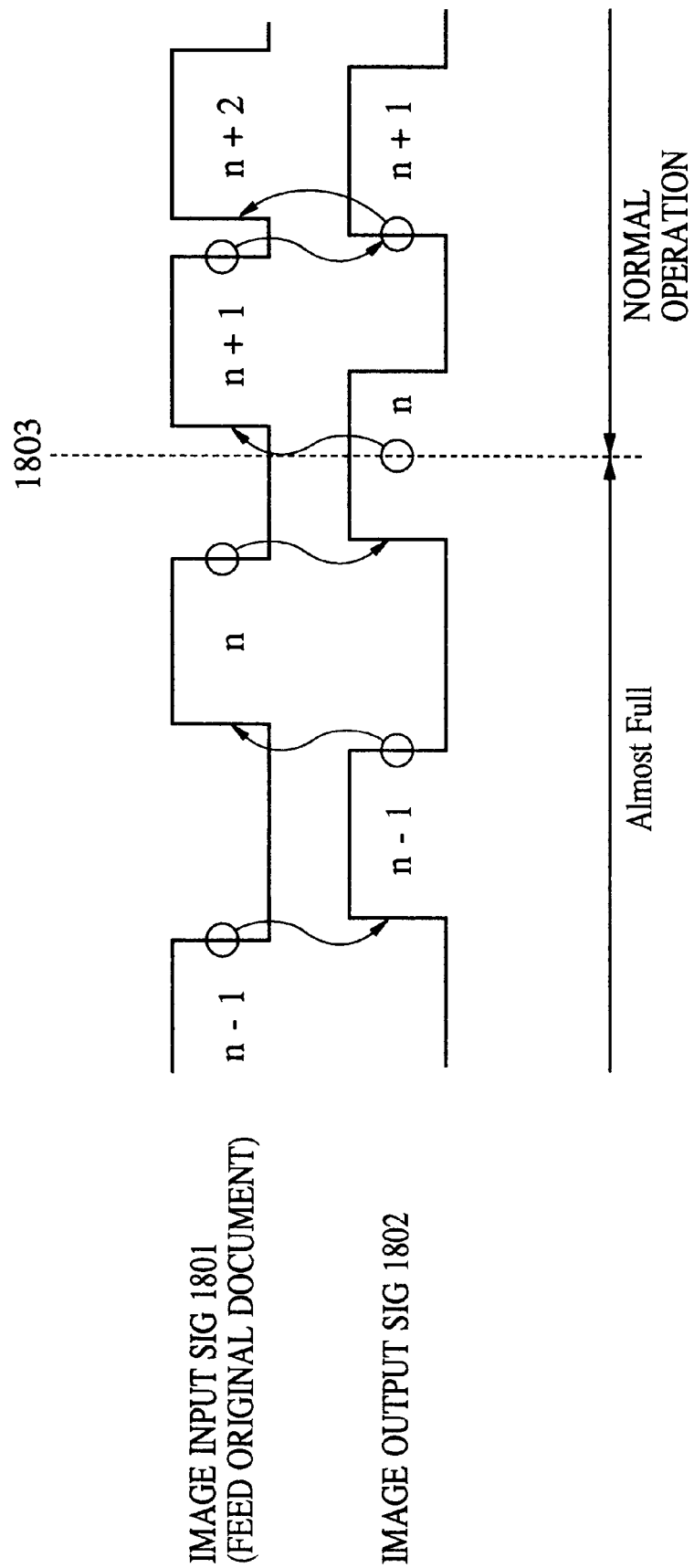
FIG. 18 shows a time chart of input/output timing of an image to the page memory in the recovery from the almost full mode of the image processing apparatus shown in FIG. 1.

FIG. 18 shows a status in which the almost full mode is released during the outputting of the page n image data. In FIG. 18, n–1, n, n+1, n+2 denote the sequence of the read document sheets. Numerals 1801 and 1802 denote input and output of the document sheet, respectively, for the page memories 119 and 120.

Figure 23:
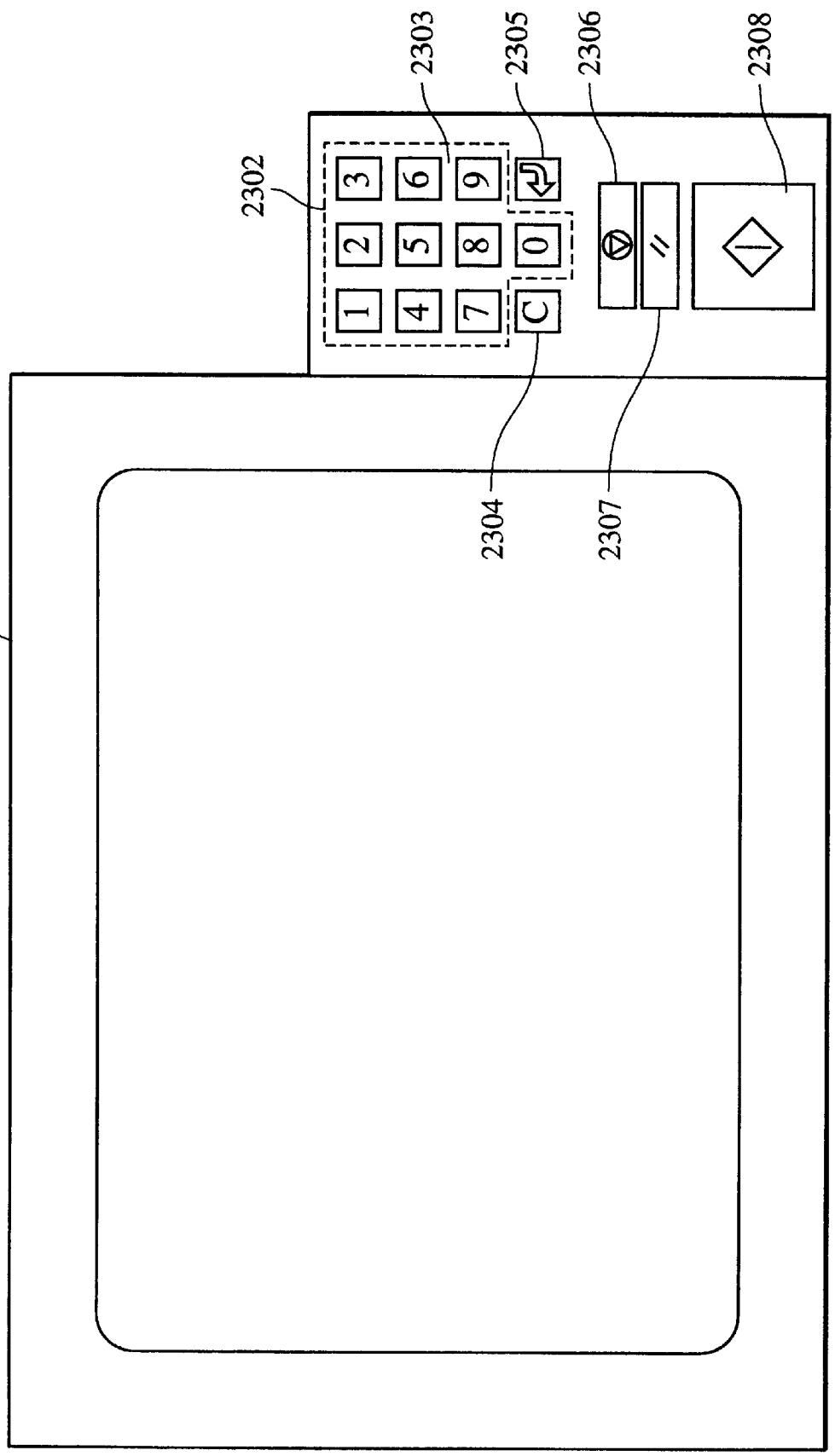
FIG. 23 shows a conceptual view of a console unit in the image processing apparatus shown in FIG. 1, FIGS. 24 to 26 show conceptual views of a console screen of the console unit in the image processing apparatus shown in FIG. 1.

FIG. 23 shows a conceptual view of the OCU 53. In FIG. 23, numeral 2301 denotes a CRT screen and a user selection is input by touch type input. The CRT screen 2301 may be substituted by an LCD or an FLC. Instead of the touch type input, the input by a pointing device such as a mouse or an input pen may be used. Numeral 2302 denotes a key pad, numeral 2303 denotes a numeric ten-key, numeral 2304 denotes a clear key, numeral 2305 denotes an enter key, numeral 2306 denotes a step key, numeral 2307 denotes a reset key and numeral 2308 denotes a start key.

Figure 24:
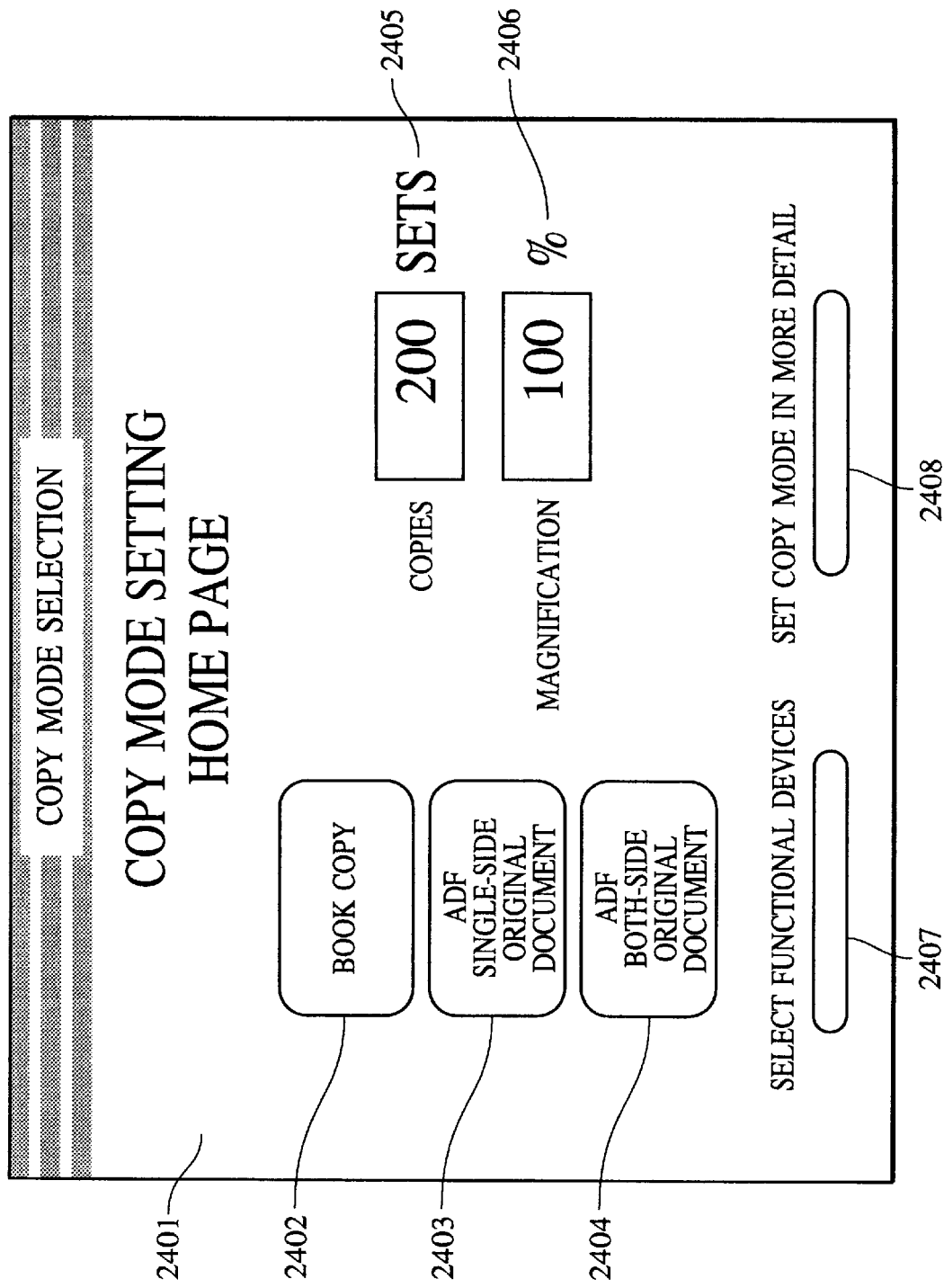

A basic configuration of the OCU 53 has been described above. FIG. 24 shows a display, a selection menu and settings on the display unit. In FIG. 24, numeral 2401 denotes a standard menu screen in the CRT screen 2301 of FIG. 23. Numeral 2402 denotes a selection area for a book mode (in which a document sheet is set on the platen and it is read by scanning the optical system), numeral 2403 denotes a selection area for a one-side copy mode of the moving read image read, numeral 2404 denotes a selection area for a dual-side copy mode of the moving read image read, numeral 2405 denotes a selection area for a number of copies, numeral 2406 denotes a selection area for a copy magnification factor, numeral 2407 denotes a selection area for function devices of the copying machine (sheet feed stacker, stapler, saddle switcher, group binder, mail box sorter, etc.) and numeral 2408 denotes a selection area for detail copy mode when detailed setting is to be conducted in the copy mode.

Figure 25:
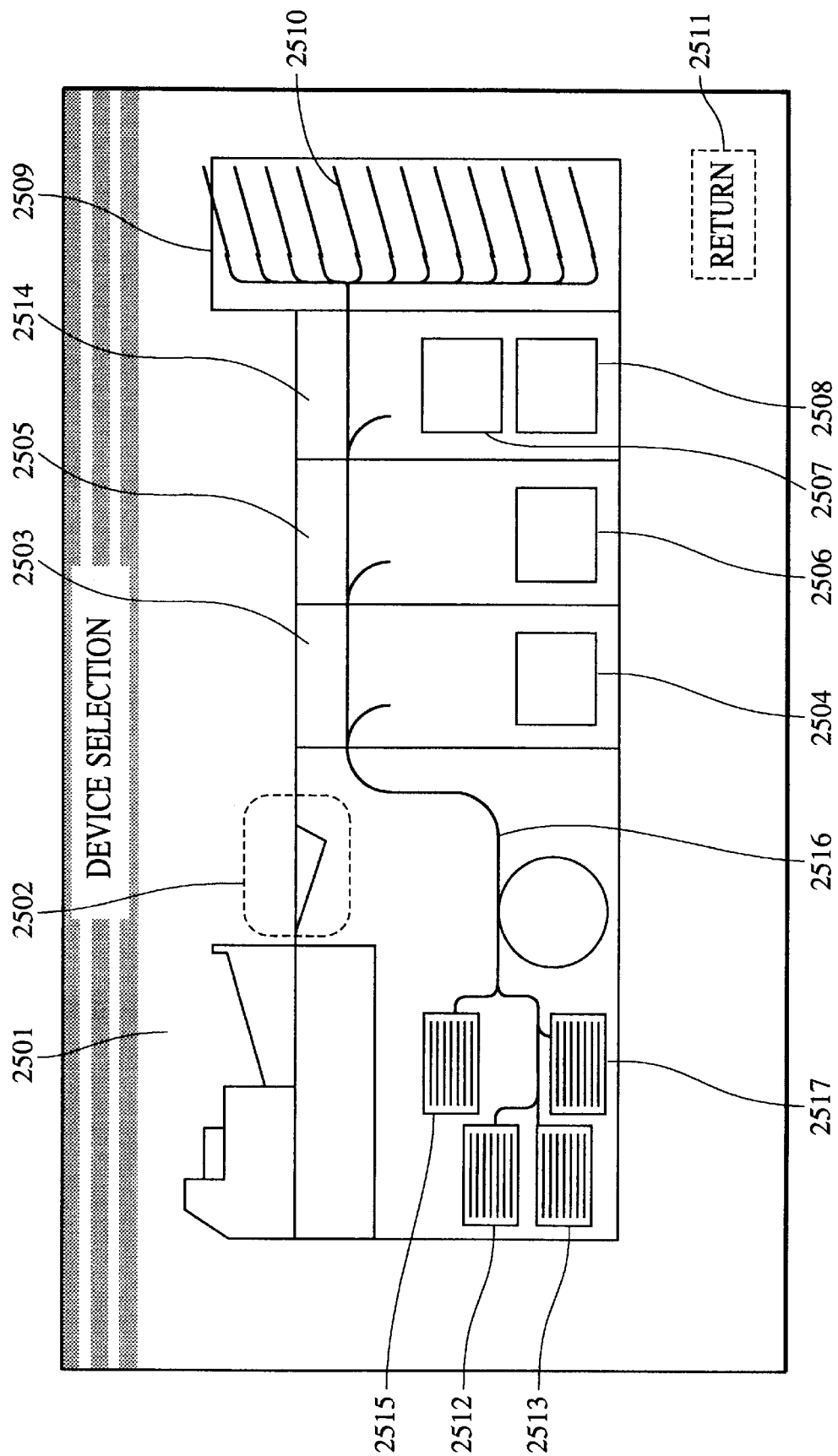

FIG. 25 shows a display status when a device select is selected by the selection area 2407 for selecting the function device of FIG. 24. In FIG. 25, numeral 2501 denotes a screen. The copying machine and all accessories of the copying machine are displayed to permit the selection of any function. In FIG. 25, numeral 2502 denotes a proof tray to which a test printed sheet on which the image after the copying is printed to test the finishing is ejected, numeral 2503 denotes a stapler, numeral 2504 denotes a stacker for accommodating the stapled output sheets, numeral 2505 denotes a saddle stitcher, numeral 2506 denotes a stacker for accommodating the output sheets saddle-stitched by the saddle stitcher 2505, numeral 2514 denotes a group binder, numerals 2507 and 2508 denote a stacker for books processed by the group binder 2514, numeral 2509 denotes a mail box sorter, numeral 2510 denotes an output sort pin for sorting by the mail box sorter 2509 and numeral 2511 denotes a selection area to return to the screen 2501. Numerals 2512, 2513, 2517 and 2515 denotes sheet feed stages 1, 2, 3 and 4, respectively. The user set transfer sheets are accommodated in the sheet feed stages 1, 2, 3 and 4. Numeral 2516 denotes a screen area to display a flow of the feed of the output sheets to the function devices on real time basis.

Figure 26:
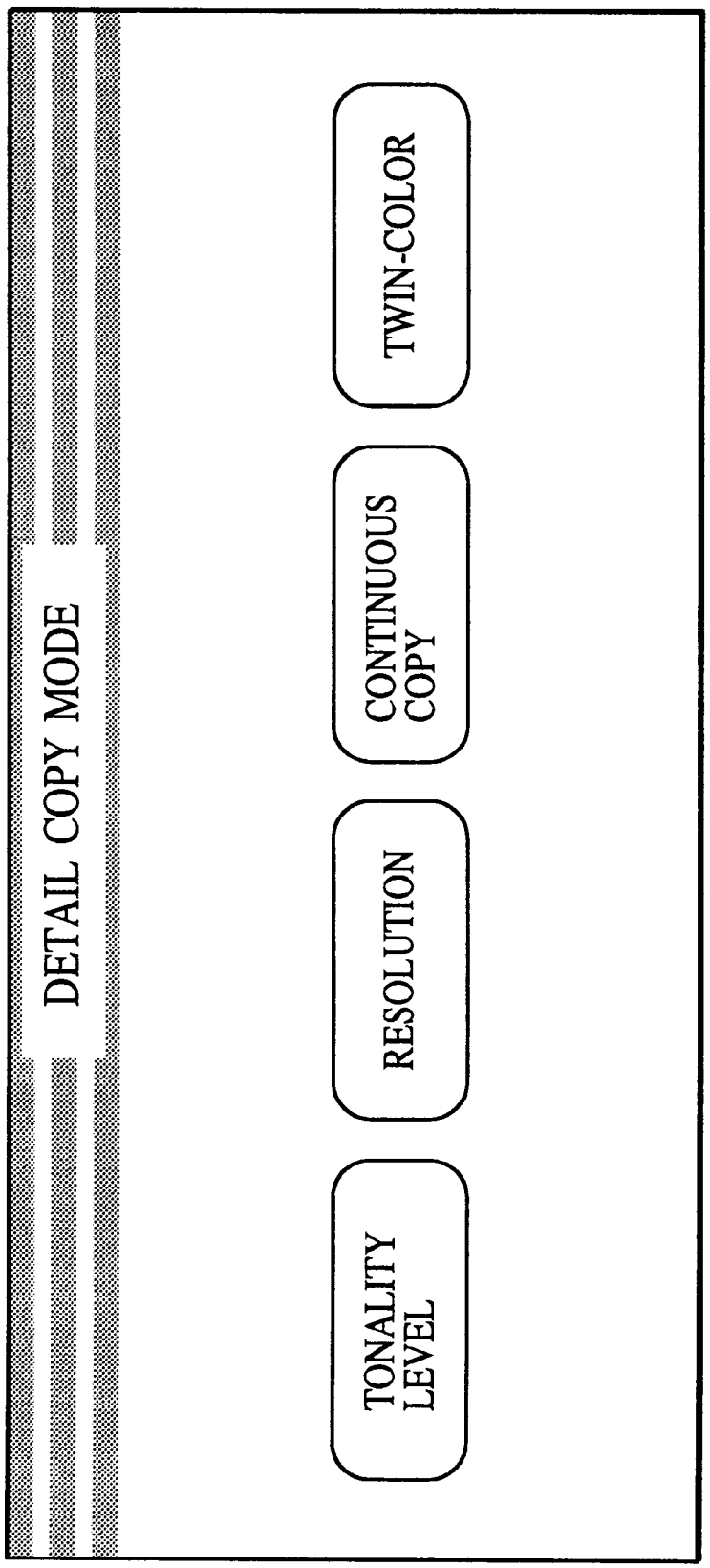

FIG. 26 shows a screen display status when a copy mode detail is selected by the detail copy mode selection area 2408 of FIG. 24. The copy functions in the image processing such as the number of tones, the resolution, the multi-copying or the twin-color are selected.

Figure 27:
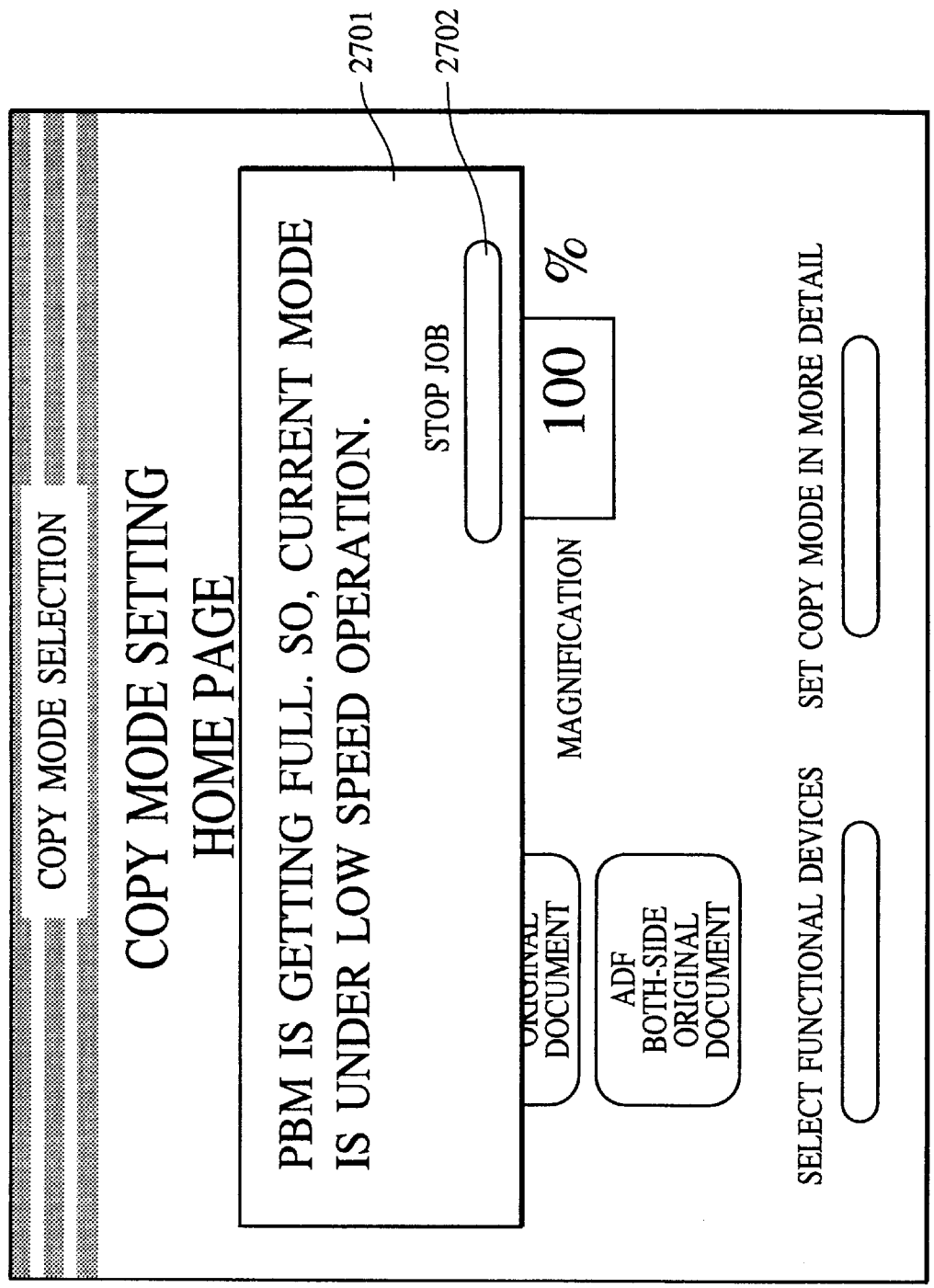
FIG. 27 shows display of the console screen of the console unit in the almost full mode in the image processing apparatus shown in FIG. 1.

FIG. 27 shows a screen display status in the almost full mode. In this mode, since the image data is transferred to the PBM 65 while checking the vacant area of the PBM 65 as described above, the processing speed is low. Numeral 2701 in FIG. 27 denotes display information for informing the status to the user and numeral 2702 denotes a selection area for releasing the job set by the user in that status.

Figure 28:
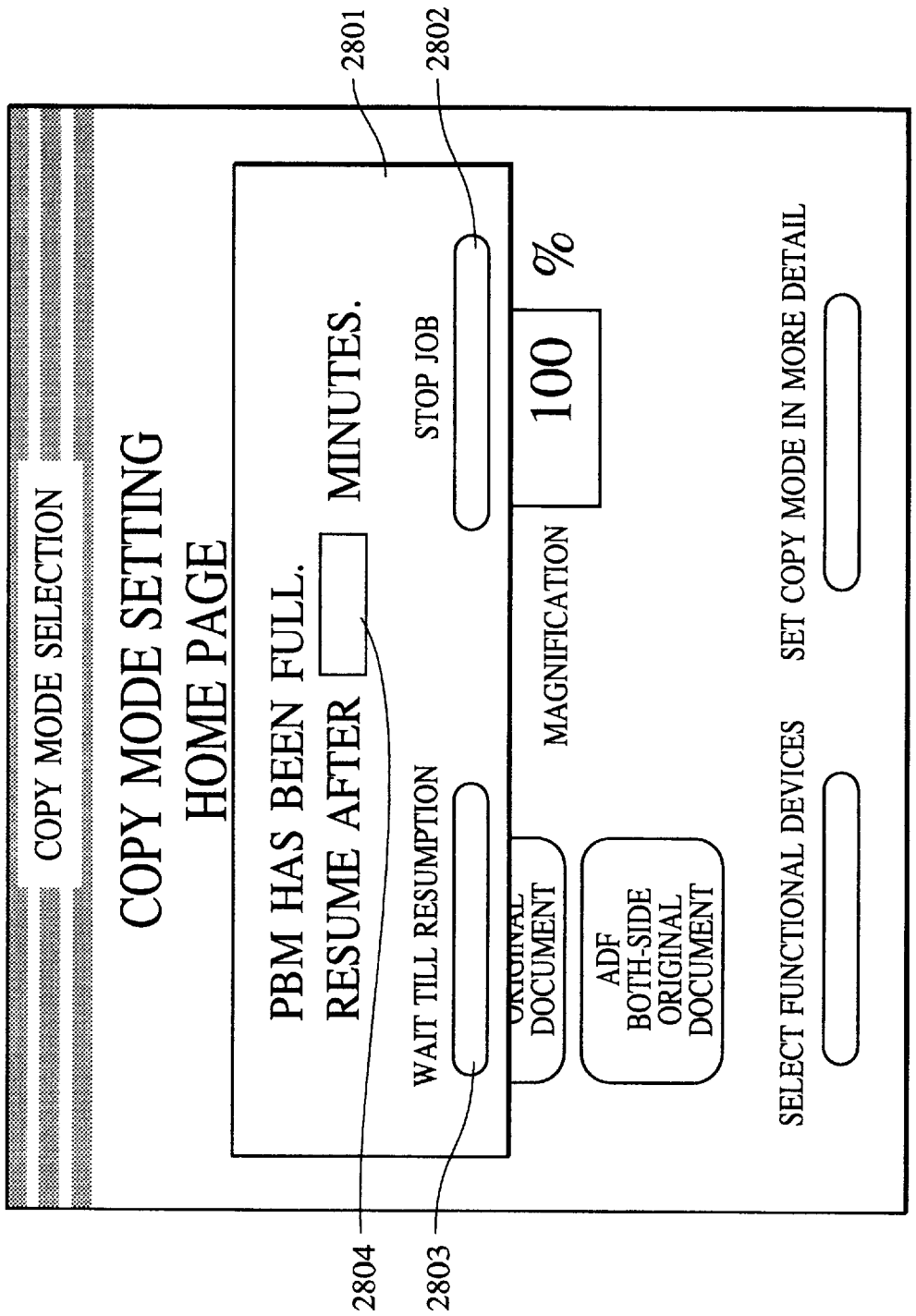
FIG. 28 shows display of the console screen of the console unit in the PBM full mode in the image processing apparatus shown in FIG. 1.

FIG. 28 shows a screen display status in the PBM full mode. In this mode, the image reading is temporarily stopped and the reading is withheld until the PBM full mode disappears. In FIG. 28, numeral 2801 denotes display information to inform that status, numeral 2804 denotes a display of wait time, numeral 2802 denotes a selection area for releasing the job set by the user in that status and numeral 2803 denotes a selection for waiting the start of the reading of the document sheet in the PBM full mode.

Figure 29:
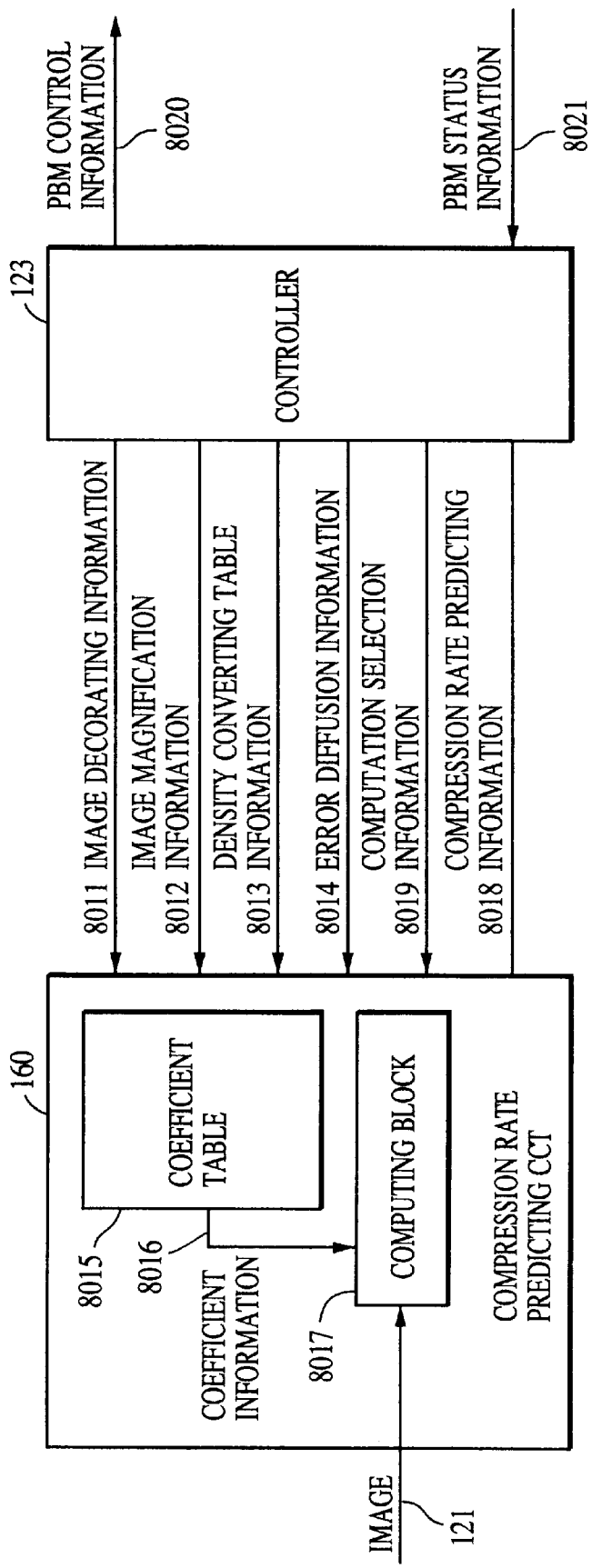
FIG. 29 shows information exchanged between a controller and a compression rate predicting circuit in the image processing apparatus shown in FIG. 1.

Referring to FIGS. 29 through 34, the prediction and control of compression rate during magnification process are now discussed. FIG. 29 shows information exchanged between the controller 123 and the compression predicting circuit 160. As shown, the compression predicting circuit 160 enhances the accuracy in compression rate prediction, making use of image decorating information 8011 of an image 121 (partial movement shown in FIG. 5 and meshing shown in FIG. 7), image magnification information 8012 (reduction layout shown in FIG. 6), density converting table information 8013 from the selected density conversion circuits 129 and 130 shown in FIG. 4, and error diffusion information 8014 from the tone conversion circuits 131 and 132 (error diffusion processing circuit: 1/2/4 bits) shown in FIG. 4. Basically, a prediction value is determined by performing a simple arithmetic operation to the statistics of the image information (a density mean value of the image or an entropy, each having a high correlation with the compression rate and easily determined through a simple calculation). In addition, coefficients are determined referencing a coefficient table 8015 in accordance with image decoration, magnification, density and error diffusion processes, and coefficient information 8016 is sent to a computing block 8017, or the computation method in the computing block 8017 is modified in accordance with the image decorating information 8011. The computed result from the computing block 8017 is sent to the controller 123 as compression rate prediction information 8018.

FIG. 30 is a flow chart showing the control sequence for compression rate prediction. In a step S3001, information (image decoration, magnification, density and error diffusion) is transmitted from the controller 123 to the compression rate predicting circuit 160 shown in FIG. 4. In a step S3002, the mean value of an input image corresponding to one page of output image is determined. In a step S3003, the computing block 8017 performs computation referencing the coefficient table 8015. In a step S3004, the compression rate prediction value is transmitted to the controller 123 as the compression rate predicting information 8018, and the control sequence ends.

The above process is explained more in detail. The following formula (3) is used to convert the density mean value of the image to the prediction value in the same manner as above.

$$\text{Prediction value} = \text{Density mean value of image} \times a + b \quad (3)$$

In the step S3003, a table shown in FIG. 31 is referenced for coefficients a and b in accordance with the decorating information, and based on these, the prediction value is computed. The coefficient table 8015 includes a coefficient column, a processing column, and an assessment column.

In the coefficient table 8015, each processing is assessed in terms of detailed coefficient items. For example, when one output page is meshed at 50% with a mirror processing on, coefficients a and b are determined from the following formulas (4) and (5).

$$a = a0 + a1 + a4 = 0.1 + 50 \times 0.001 + 0 = 0.15 \quad (4)$$

$$b = b0 + b1 + b4 = 0.1 + 0 + 0.05 = 0.15 \quad (5)$$

Discussed next is a case in which the computation method itself is modified. When the original document is negative-positive reversed making its black area larger than white area, the mean value is increased. In many cases, whether or not the original document is negative-positive reversed does not make a significant change in the compression rate in the compression circuits 150, 153 shown in FIG. 8. However, when the density mean value of the image is used as expressed in the formula (3) in the compression rate prediction, the mean value of the negative-positive reversed image is increased, and the prediction value becomes extremely poor. For this reason, when a negative-positive reversed image is read, the computation method is switched to the one described below in accordance with computation selection information 8019 in response to an instruction from the controller 123 shown in FIG. 4 at an operator's option.

Prediction value=(255-density mean value of image)×a+b (6)

By switching the computation method to the one expressed by the formula (6), the accuracy level of the compression rate prediction is heightened. The number 255 in the formula (6), the maximum 8-bit number, means the maximum density of the image.

When one of the modes related to magnification (reduction, reduction layout, expansion, expansion continuous copying) is designated, information about setting of magnification by the operator, reduction layout, and expansion continuous copying, as the image magnification information 8012 of FIG. 29, is transmitted to the compression rate predicting circuit 160 shown in FIG. 4. Based on the image magnification information 8012, the compression rate predicting circuit 160 predicts a compression rate from the area of the image that is accommodated in one page after magnification process.

Figure 32C:
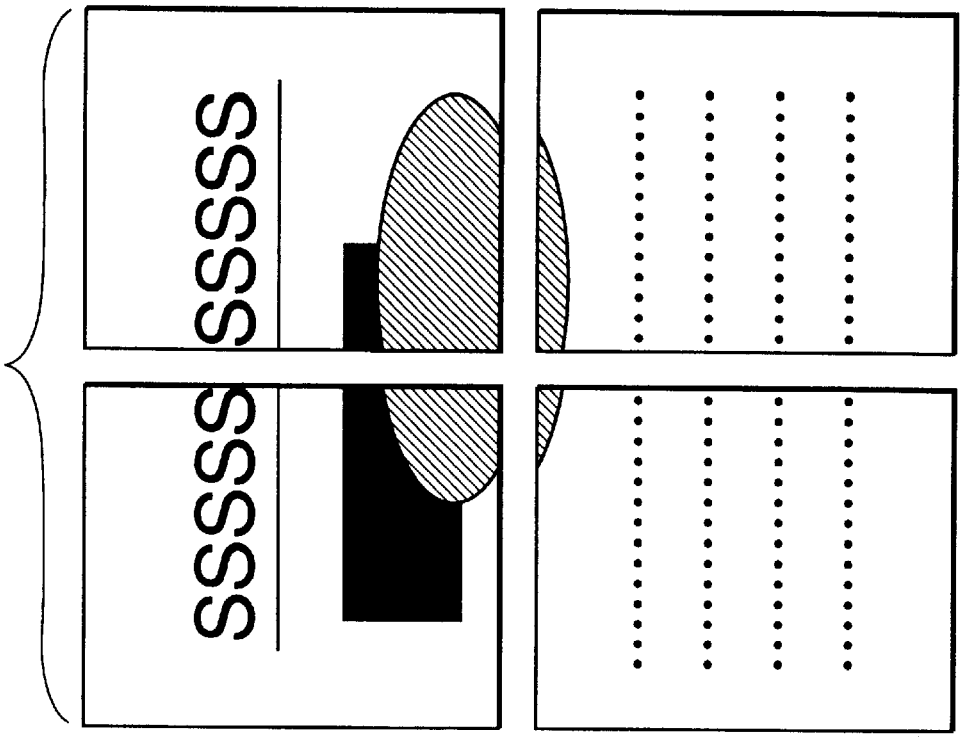
Figure 32B:
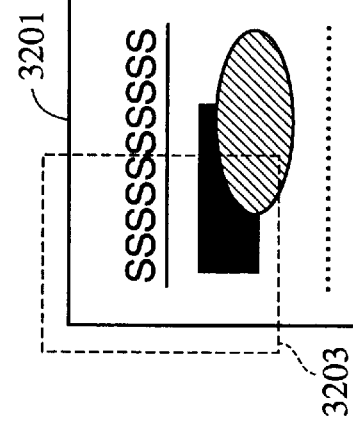

When a mode (hereinafter referred to as expansion continuous copying) is designated to expand an original document 3201 shown in FIG. 32A and split the expanded image into a plurality of sections shown in FIG. 32C to obtain an output image 3202, part of the original document 3201 corresponding to one of split images, namely, an area 3203 (the top-left split image) shown in FIG. 32B, is used to predict the compression rate as shown in FIG. 32C.

When a mode (hereinafter referred to as reduction layout) is designated to get an output image 3302 of a single recording sheet shown in FIG. 33B from an original document image 3301 of a plurality (four in this case) of sheets shown in FIG. 33A, the compression rate is predicted in consideration of the final output of all four sheets of the original document image 3301 shown in FIG. 33A. When a mode related to magnification is designated in this way, the accuracy level of the prediction is heightened by predicting the compression rate based on a pre-magnification image that is accommodated in one page after magnification process. During magnification, coefficients in accordance with a magnification factor may be used.

A specific example of a simple computation is now discussed.

When a magnification-related mode is designated, the density mean value of the image is multiplied by a coefficient c as expressed by the following formula (7).

Prediction value=(density mean value of image×c)×a+b (7)

The coefficient c becomes smaller as an expansion rate or reduction rate increases, wherein the coefficient c is 1 at a magnification of 100%, namely with an image being neither expanded nor reduced.

In the expansion continuous copying shown in FIG. 32, the magnification factor is 200%, and thus c=0.7. Assuming that the density mean value of the area 3203 shown in FIG. 32C, namely part of the image 3201, is 50, and that the coefficients a and b are respectively 0.1 in accordance with the image decoration, the compression rate prediction value is determined by the following formula (8).

Prediction value=(50×0.7)×0.1+0.1 (8)

Figure 32A:
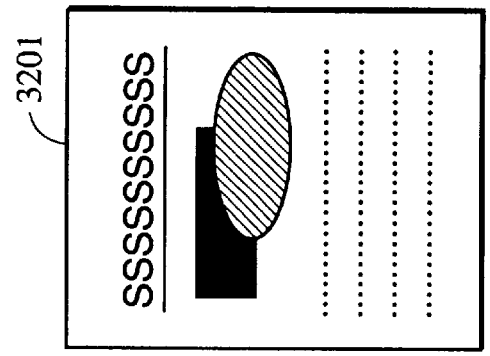
Figure 34:
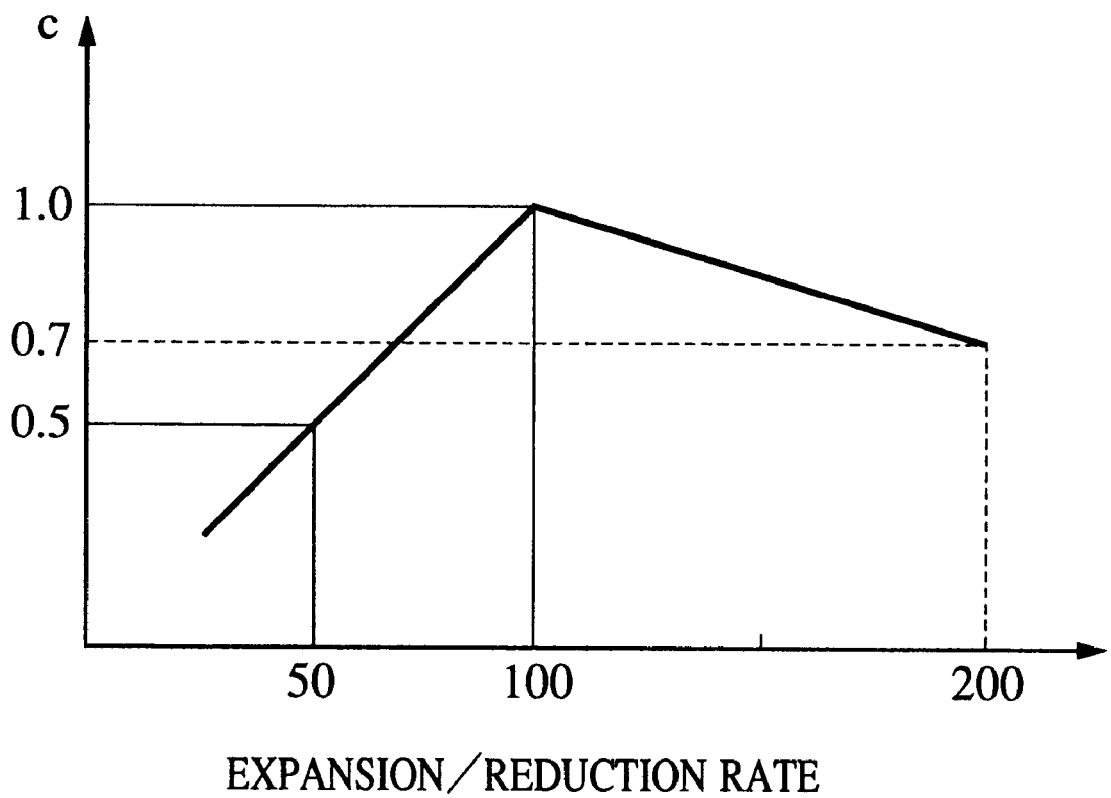
FIG. 34 is an explanatory view showing the coefficient c versus magnification in the image processing apparatus shown in FIG. 1.

As for the remaining areas of the original document image 3201 shown in FIG. 32A, the compression rate prediction values are determined in the same way.

In the reduction layout shown in FIG. 33, c=0.5 because the magnification factor is 50%. Assuming that density mean value of the original document image 3301 of the four sheets shown in FIG. 33A is 60 and that the coefficients a and b are respectively 0.1 in accordance with the image decoration, the compression rate prediction value is determined by the following formula (9).

Prediction value=(60×0.5)×0.1+0.1 (9)

The four sheets in the original document image 3301 shown in FIG. 33A are separately subjected to image decoration, the prediction value is determined for each image, and the mean value of the four prediction values or the maximum value of the four prediction values sometimes is adopted. When several images are edited through image processings such as image overlay to get a single image, the prediction of a compression rate for the reduction layout may be used.

By predicting a compression rate, and then determining a vacant area in the PBM 65 based on the compression rate and PBM status information 8021 PBM shown in FIG. 27 indicating the status of the PBM 65, the above-described control is performed referring a control signal 162 shown in FIG. 4 (namely, PBM control information 8020 shown in FIG. 27).

As described above, since the compression rate of one page of processed image is predicted based on the image processing mode set, the prediction of the compression rate performed prior to the storage of compression image data reflects a diversity of image processings including magnification, image decoration and editing.

The compression rate prediction matching the content and type of an original document image and the control for it are now discussed.

For example, the density mean value of the image is used for the prediction and the already-described formula (1) is used to convert it to the prediction value.

Prediction value=mean image density value×a+b (1)

Figure 35:
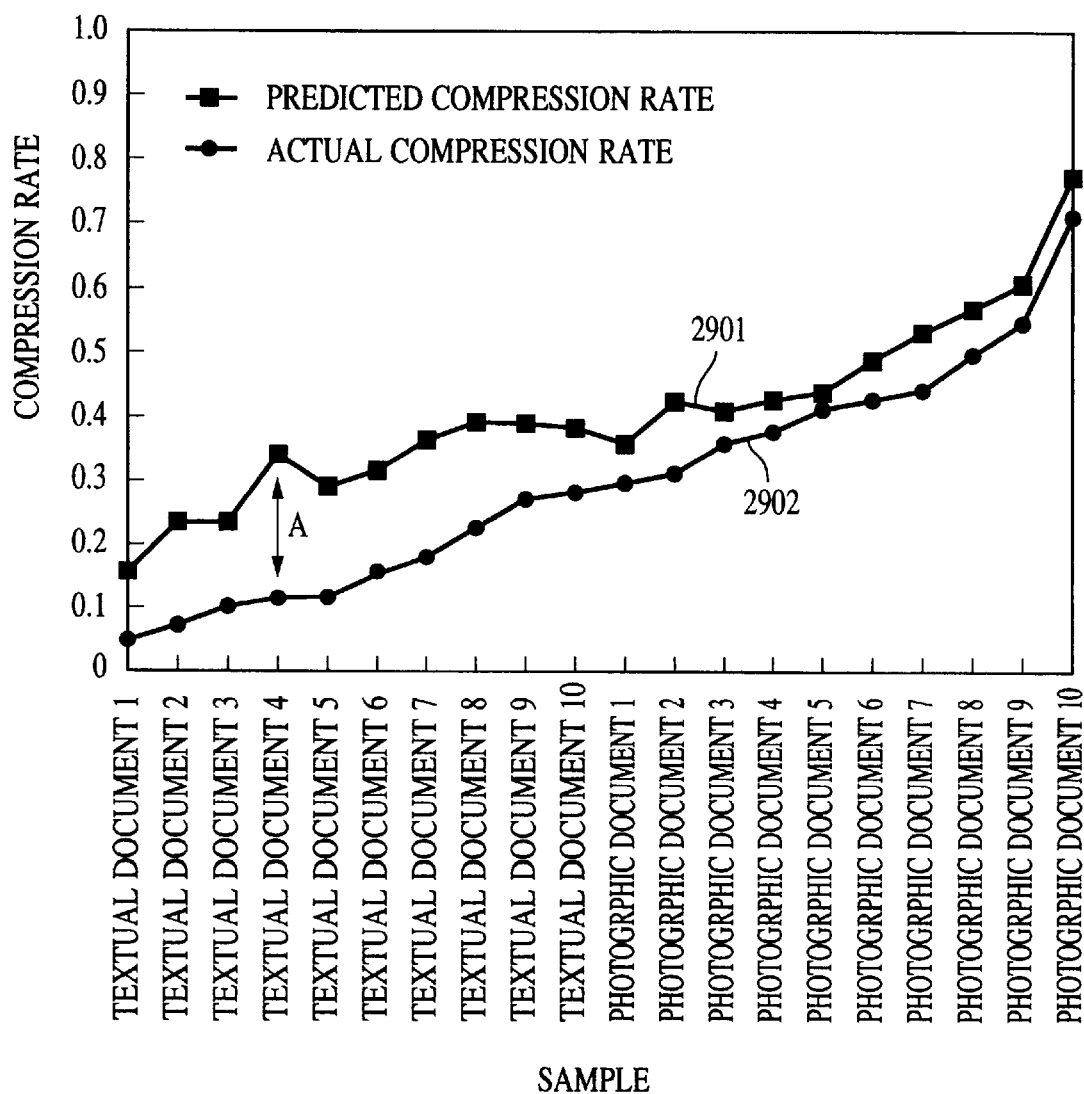
FIG. 35 shows the relationship between the content of original documents and compression rate prediction value in the image processing apparatus shown in FIG. 1, FIGS. 36A through 36C show samples of document sheets in the image processing apparatus shown in FIG. 1.
Figures 36A, 36B, 36C:
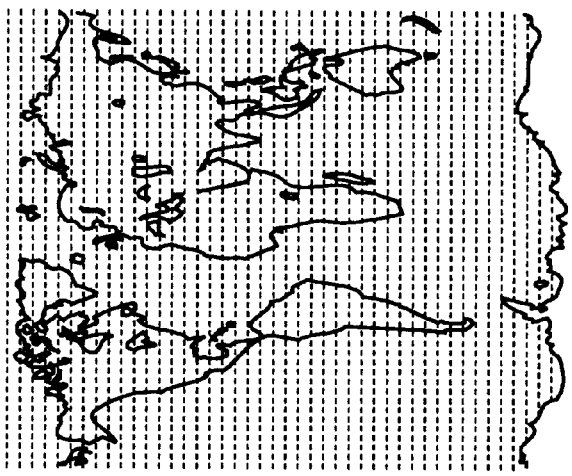

As shown in FIG. 35, the coefficients a and b are set such that the compression rate prediction values 2901 for all image samples are above actual compression rates 2902. The difference A shown in FIG. 35 is the one between a compression rate prediction value and its corresponding actual value, and the greater the difference the worse the prediction accuracy level is. A textual document as shown in FIG. 36A and a photographic document as shown in FIG. 36B are considered, for example. As shown in FIG. 35, the textual documents have a larger difference between the prediction value and the actual compression rate than the photographic documents, and thus suffer a lower accuracy level in the prediction of compression rate. The accuracy level of the compression rate prediction is heightened by selectively using the coefficients depending on the type of the original document image. Assuming that the plot shown in FIG. 35 is observed with a=0.2 and b=0.2 in the formula (1), the coefficients are modified to a=0.2 and b=0.1 in the textual document shown in FIG. 36A, the prediction values 2901 shown in FIG. 35 are shifted to 3101 shown in FIG. 37, the difference to the actual compression rate is narrowed, and the accuracy level in prediction is thus heightened in the textual document images as well.

When an original document has white characters with a black background as in a negative-positive reversed image shown in FIG. 36C, the compression rate in the compression circuits 150 and 153 is almost unchanged after the reversion. However, when the density mean value of the image is used in the prediction as shown in the formula (1), the compression rate prediction value substantially varies to an extremely poor one. For this reason, for a negative-positive reversed document image as shown in FIG. 36C, the computation method is shifted to the following formula.

Prediction value=(255-density mean value of image)×a+b   (10)

In this way, the accuracy level of compression rate prediction is heightened. The number 255 in the formula (10), the maximum 8-bit number, means the maximum density of the image.

Discussed next is a process in which the coefficients a and b in the compression rate prediction are set to be variable from user to user to heighten the accuracy level of compression rate prediction. The copying conditions may differ depending on users. Some users may copy a variety of images, and other users mainly handle textual documents or photographic documents. If a single compression rate prediction coefficient is commonly used to a diversity of types of images, the accuracy level of prediction cannot be heightened. For example, when the original document by a user A contains a great deal of textual data as shown in the correlation between the compression rate prediction and the actual factor referring to FIG. 35, the accuracy level of compression rate prediction will be improved next time by lowering the value of b in the formula (1). The number of document samples and variable setting time may be set to be variable in a user mode such as a service mode. Specifically, the modification of the compression rate prediction coefficients may be updated every 20 copies or set to be valid for all document samples throughout.

The control for improving the image compression rate prediction is now discussed.

Figure 38:
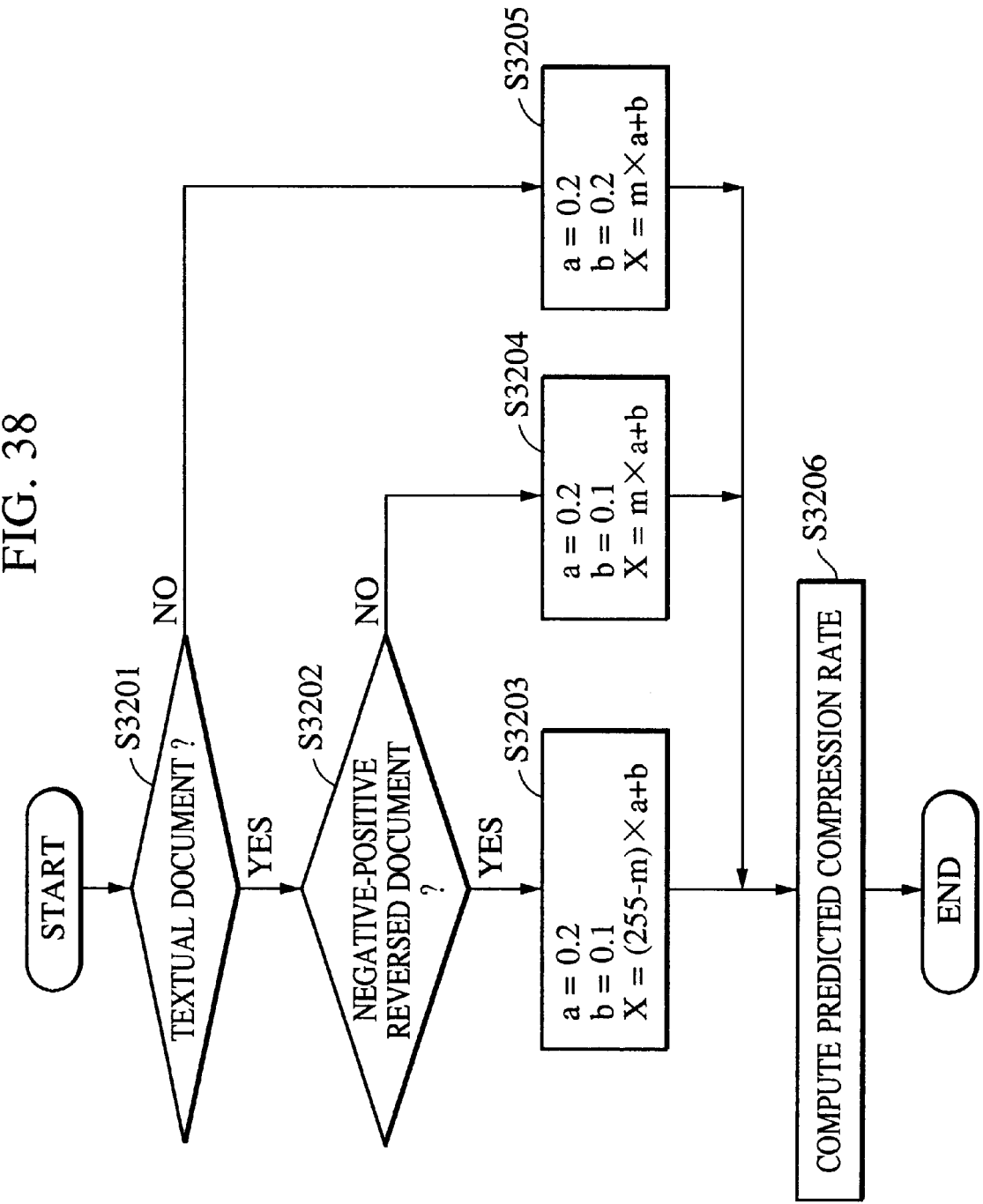
FIG. 38 is a flow chart showing the modification procedure of coefficients and formula for the compression rate prediction value in the image processing apparatus shown in FIG. 1.

FIG. 38 is a flow chart showing the control for improving the image compression rate prediction by modifying and changing the image compression rate prediction coefficients and the formula, respectively, depending on the type of an original document.

In a step S3201, the controller 123 that controls the apparatus determines whether an original document sheet placed on the ADF 200 is a textual document, and in a step S3202, determines whether the original document sheet is a negative-positive reversed document. These determinations are based on which selection button for the textual document or the negative-positive reversed document an operator manipulates in an operator setting mode on the OCU 53 in the apparatus. The determination criterion is not limited to this information, and an image splitting for automatically determining the type of an image may be executed. In response to the determination result, the coefficients and formula prepared for a textual and negative-positive reversed document are used in a step S3203 when the document is a textual and negative-positive reversed one. When the original document is a textual image only, the coefficients prepared for textual image are used in a step S3204. When the original document is not a textual image, the coefficients prepared for the photographic document are used in a step S3205. In a step S3206, compression rate prediction is computed. This series of control is performed by the controller 123. In this way, a proper compression rate prediction matching the type of an original document is performed.

Figure 39:
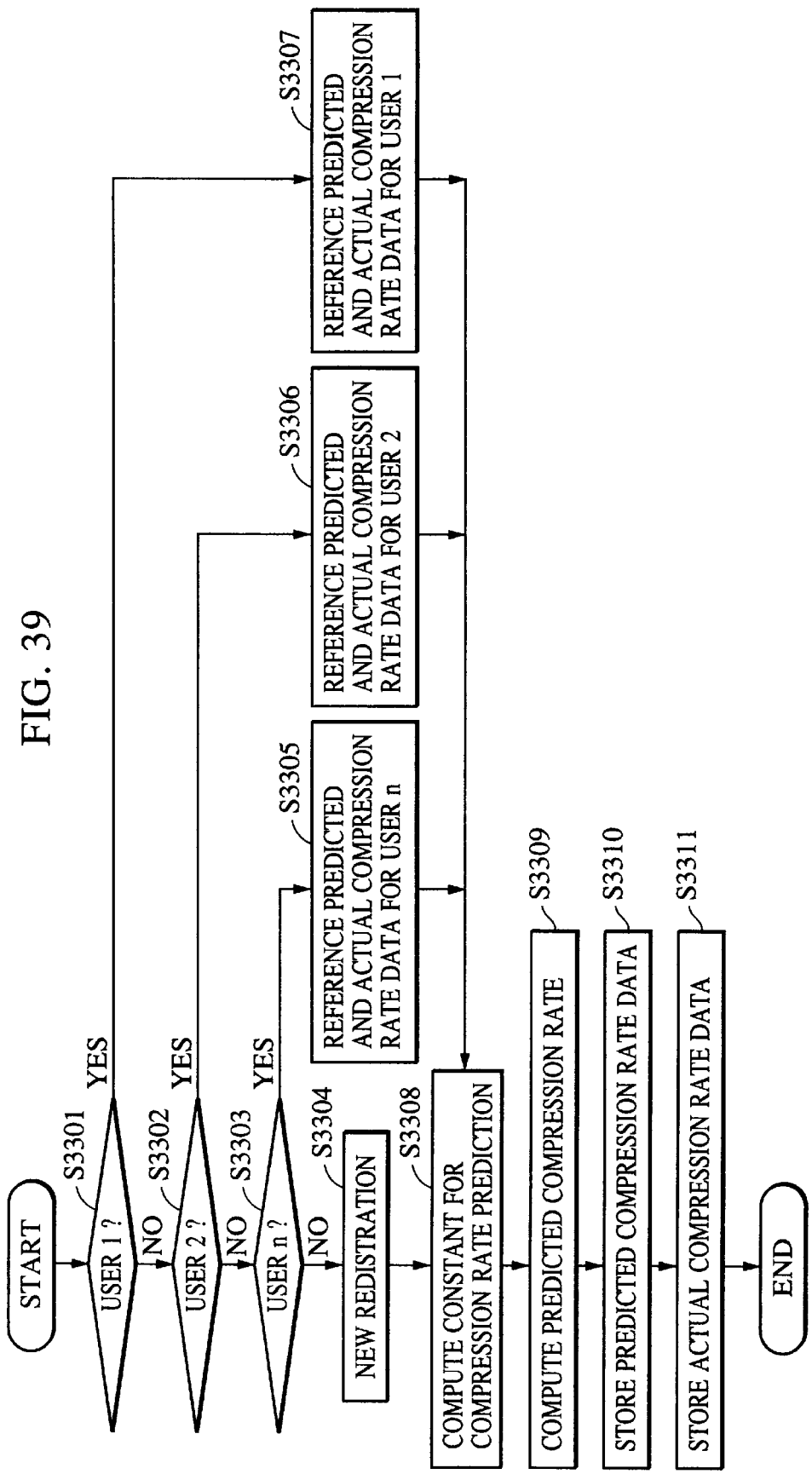
FIG. 39 is a flow chart showing the modification procedure of the coefficients and formula for the compression rate prediction value in the image processing apparatus shown in FIG. 1.

FIG. 39 is a flow chart in which the compression rate prediction is improved by modifying the compression rate prediction coefficients and formula based on the correlation in the types of original documents depending on the users.

In a step S3501, the controller 123 that controls the apparatus checks the ID of a user who uses the apparatus. The user enters his ID in the mode setting on the OCU 53. When the ID of the user who is going to use the apparatus is verified as 1 in the ID checking, the controller 123 references the history of the compression rate prediction value data and actual compression rate to the last copying session, in a step S3307, and then determines the formula and coefficients for compression rate prediction in a step S3308. When the user ID is verified as 2 in the step S3302, the controller 123 performs the same process to the user 2 in a step S3306 in the same way as in the step S3307. When the user ID is verified as n in a step S3303, the controller 123 performs the same process to the user n in a step S3305 in the same way as in the step S3307.

When the user ID is not the registered one, a new user ID is registered in a step S3304, and predetermined standard coefficients and formula are then used.

Figure 37:
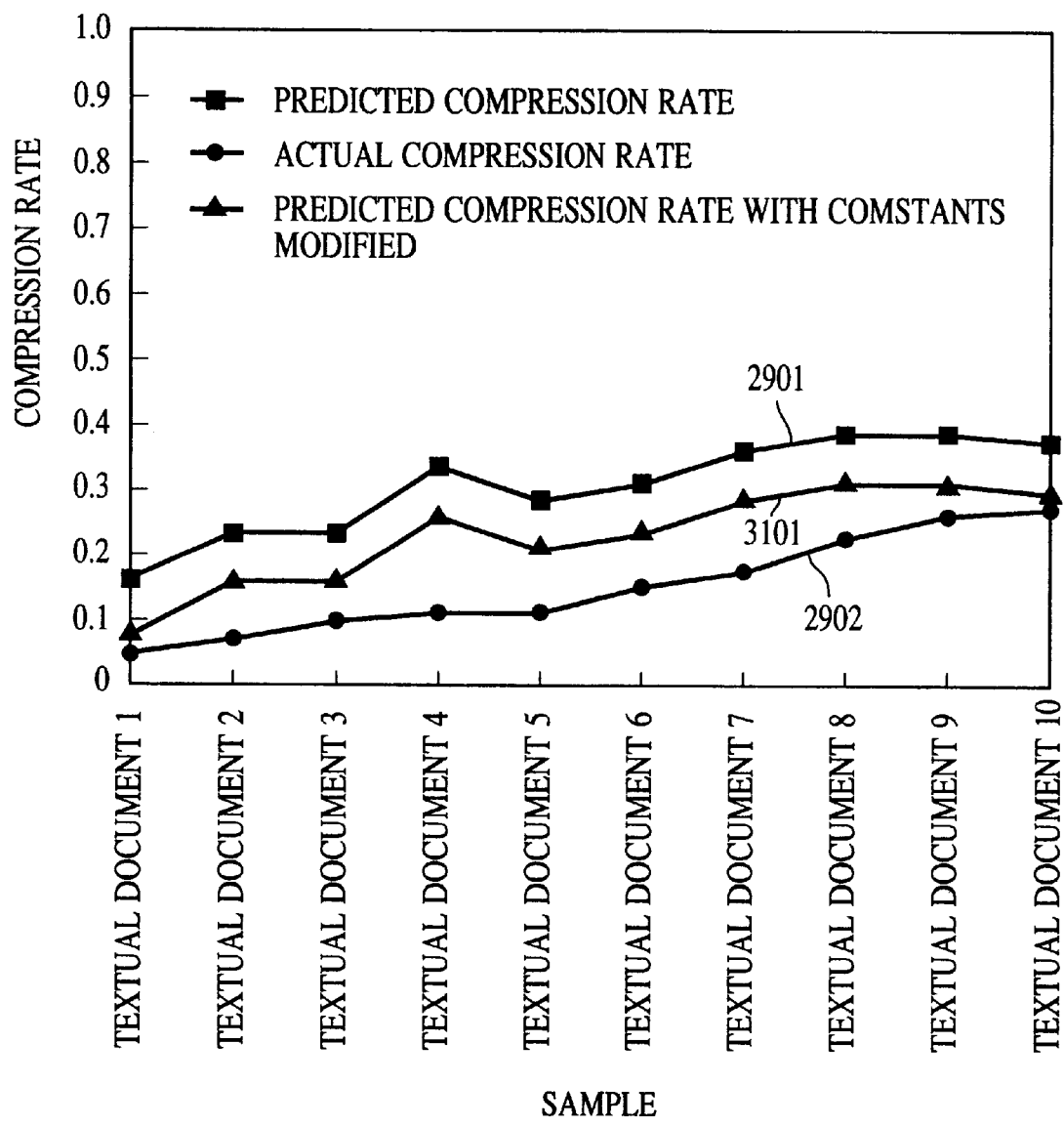
FIG. 37 shows the relationship between the content of original documents and compression rate prediction values in the image processing apparatus shown in FIG. 1.

In the determination of coefficients in the step S3308, the coefficient b is modified as already described with reference to FIG. 37. In the selection of data, a certain number of samples to the last session or the history to the last session may be referenced. This selection may be set in the mode setting. Furthermore, not only b but also a and the formula may be modified. In a step S3309, the coefficients and formula thus determined are used in the computation of the compression rate. In a step S3310, data is correlated with the user ID and then stored in a predetermined memory area. When data actually compressed by the compression circuits 150 and 153 is stored in DRAMs 151 and 154, memory remaining capacity detection signals 198 and 199 indicative of memory remaining capacity are returned to the controller 23. In a step S3311, an actual compression rate is derived from the memory remaining capacity through inverse operation, and is correlated with the user ID and then stored in a predetermined memory area. Stored data about compression rates are later used in the computation of compression rate prediction next time. This series of control is performed by the controller 123.

The accuracy level of compression rate prediction value is heightened in this way, and the compression rate prediction value is then used in the sequence of the operation of the apparatus of the present invention.

As described above, the accuracy level of the compression rate prediction value is heightened by modifying the coefficients and formula for the compression rate prediction. The accuracy level of the compression rate prediction value is heightened by modifying the coefficients and formula for the compression rate prediction referring to the correlation between the user and the type of the original document of the user. Furthermore, heightening the compression rate prediction value permits an efficient use of the PBM in the apparatus.

As described above, since the coefficients and formula used in the prediction of a compression rate are modified in accordance with the copying conditions set, the image compression rate prediction appropriately matches the copying conditions. Document feed control using the compression rate prediction is thus efficiently and accurately performed.

Figure 40:
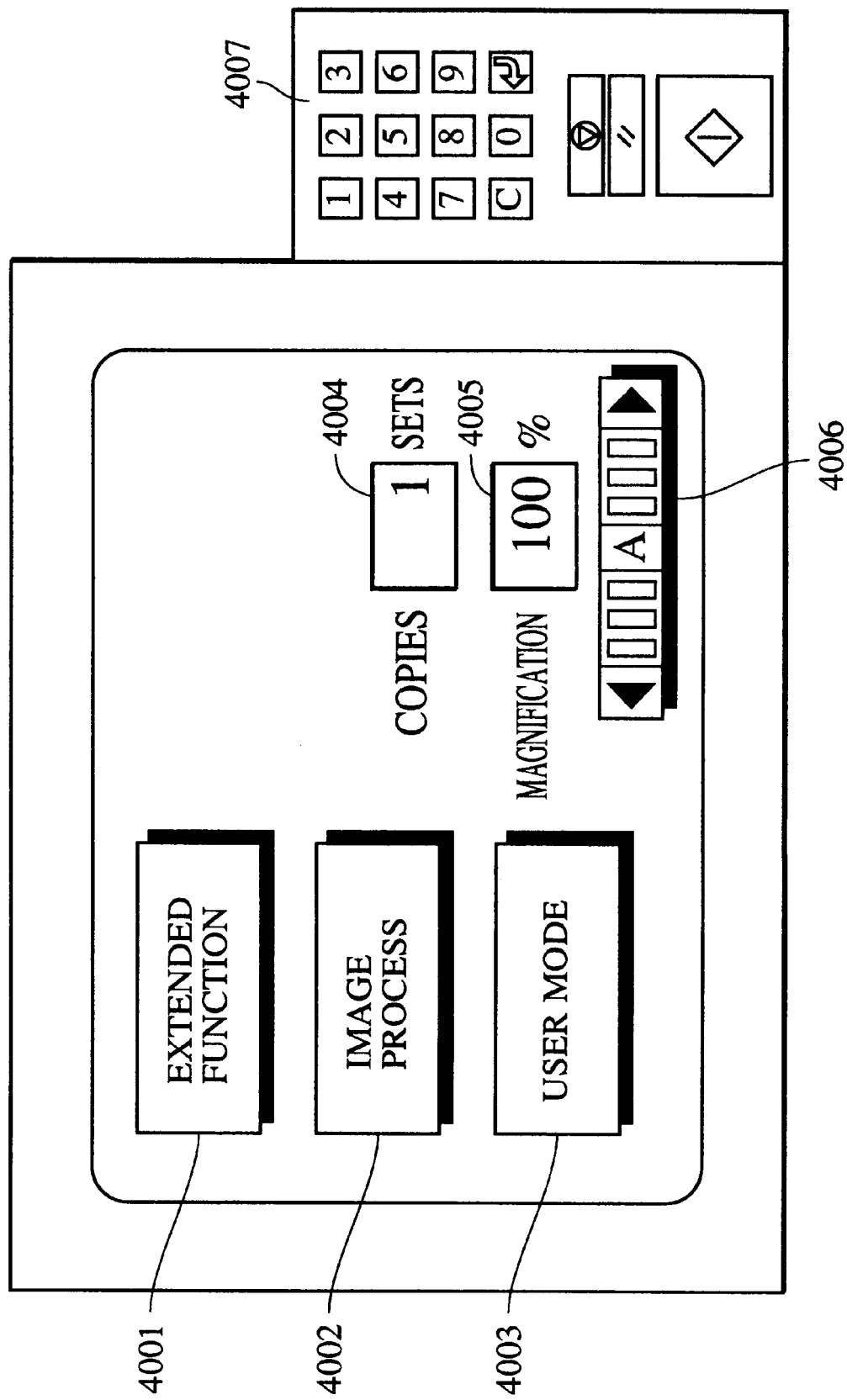
FIG. 40 shows an example of a display when an "detail copy mode" selection area is pressed on the console unit in the image processing apparatus shown in FIG. 1.

FIG. 40 shows an example of display presented by the OCU 53 when a selection area for detail copy mode 2408 shown in FIG. 24 is pressed. Presented on the display are an extended function button 4001, an image process button 4002, a user mode setting button 4003, an indicator for number of copies 4004, a magnification indicator 4005, and density bars 4006, each of which can be adjusted by the operator. The operator can input desired numbers for the number of copies and magnification of copy through a keyboard 4007. The operator can also adjust the density setting by pointing the density bars 4006 with an associated but unshown pointing device.

Figure 41:
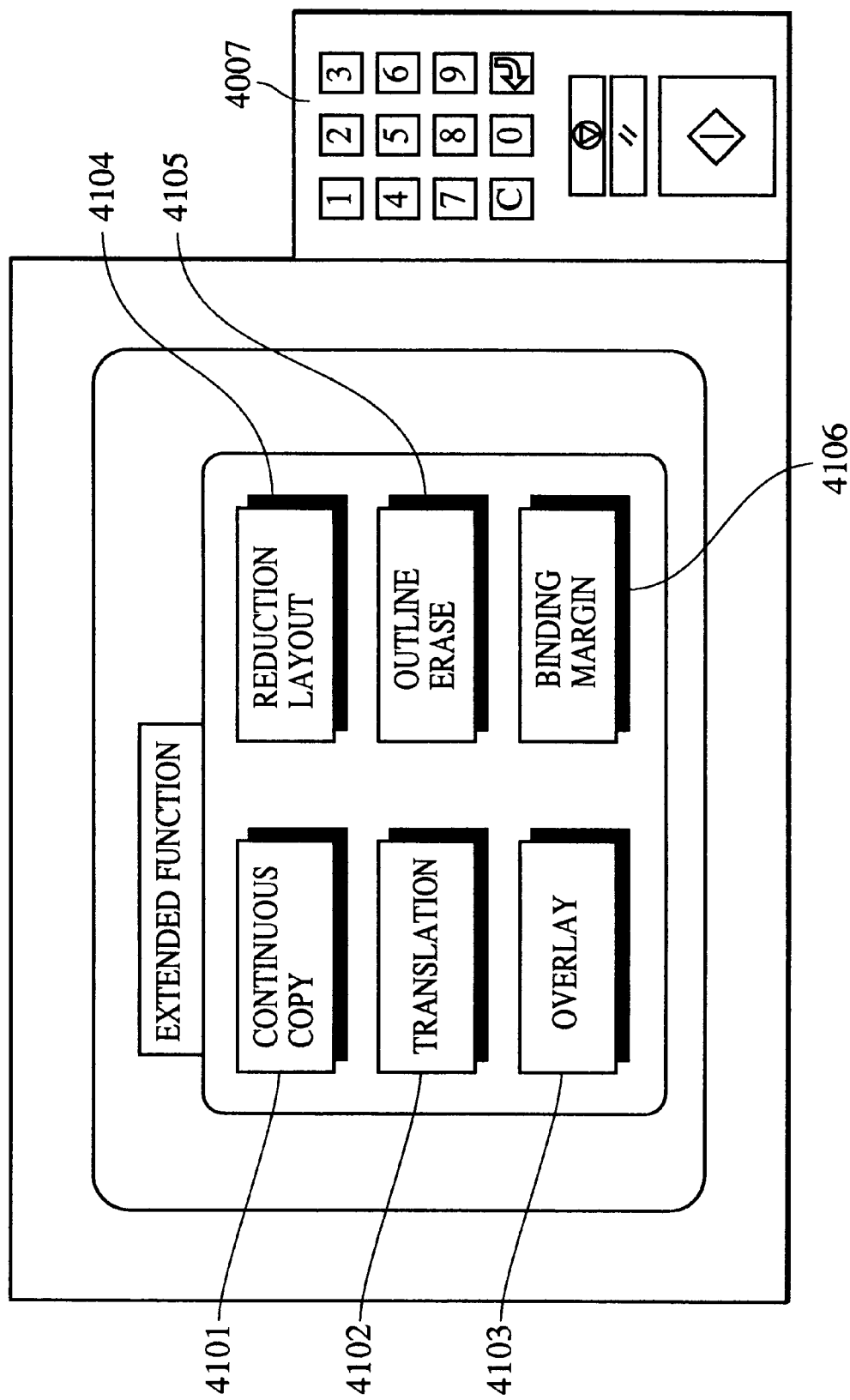
FIG. 41 shows an example of a display when a "extended function" button is pressed on the console unit in the image processing apparatus shown in FIG. 1.

FIG. 41 shows an example of display presented by the OCU 53 when the extended function button 4001 shown in FIG. 40 is pressed. Presented on the display are a continuous copy button 4101, a movement button 4102, an overlay button 4103, a reduction layout button 4104, an outline erase button 4105, and a binding margin button 4106.

In a continuous copying mode, an A3-size document sheet is split into two A4-size document sheets and copied. When the continuous copying button 4101 is pressed, detailed setting in connection with the continuous copying mode is conducted. In a movement mode, part of the document is shifted as shown in FIG. 5, and when the movement button 4102 is pressed, detailed setting in connection with the movement mode is conducted. In an overlay mode, one document sheet is overlaid upon another, and when the overlay button 4103 is pressed, detailed setting in connection with the overlay mode is conducted. In a reduction layout mode, four pages of A4-size document sheets are reduced to one page of document sheet as shown in FIG. 6, and when the reduction layout button 4104 is pressed, detailed setting in connection with the reduction layout mode is conducted. An outline erase mode erases a dark outline surrounding each page or a dark band between facing pages which appear when a book is copied. When the outline erase button 4105 is pressed, detailed setting in connection with the outline erase mode is conducted. In a binding margin mode, a binding margin is set, and when the binding margin button 4106 is pressed, detailed setting in connection with the binding margin mode is conducted.

Figure 42:
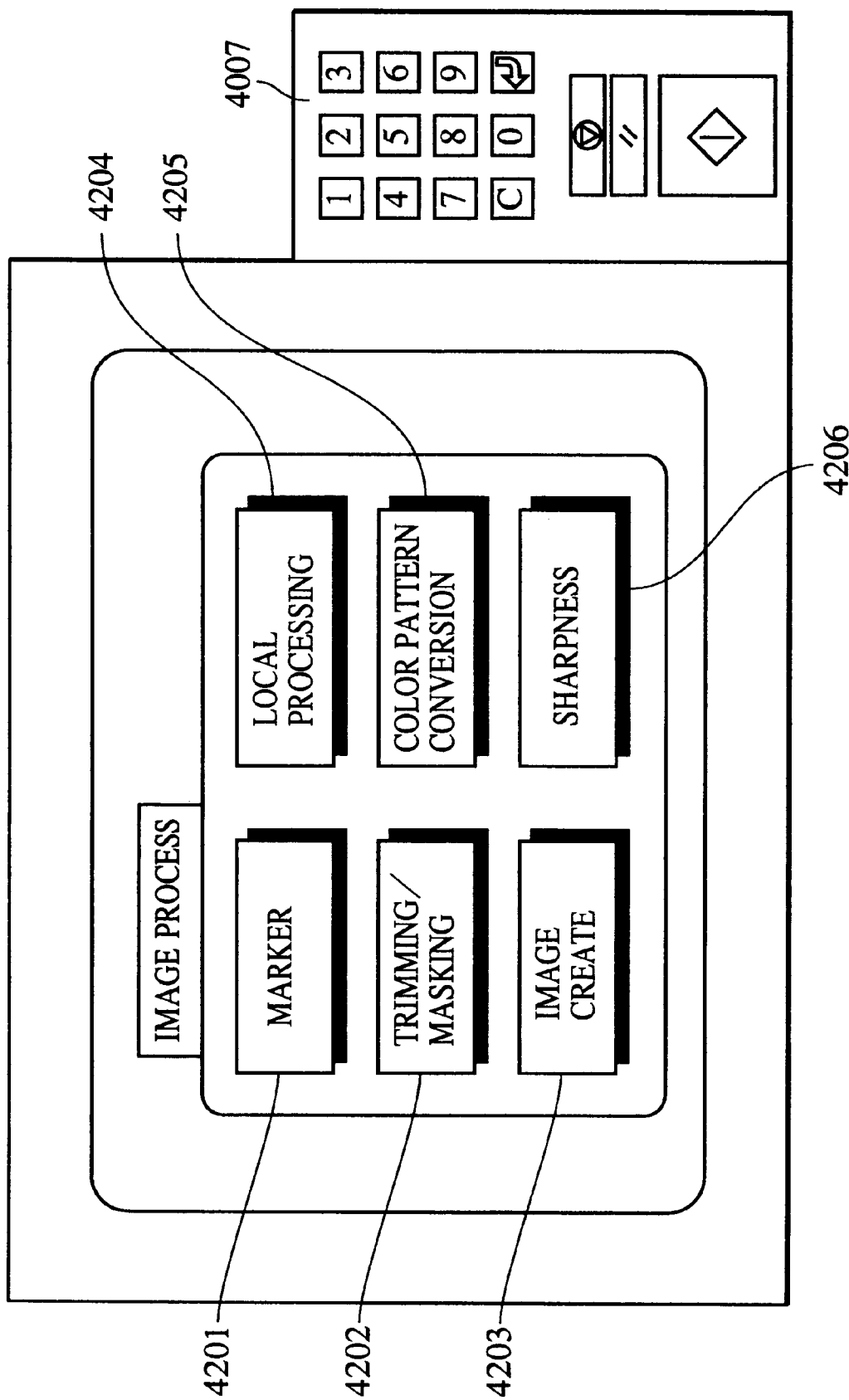
FIG. 42 shows an example of a display when an "image process" button is pressed on the console unit in the image processing apparatus shown in FIG. 1.

FIG. 42 shows an example of display presented by the OCU 53 when the image process button 4002 shown in FIG. 40 is pressed. Presented on the display are a marker button 4201, a trimming/masking button 4202, an image create button 4203, a local processing button 4204, a color pattern conversion button 4205, and a sharpness button 4206.

Figure 43:
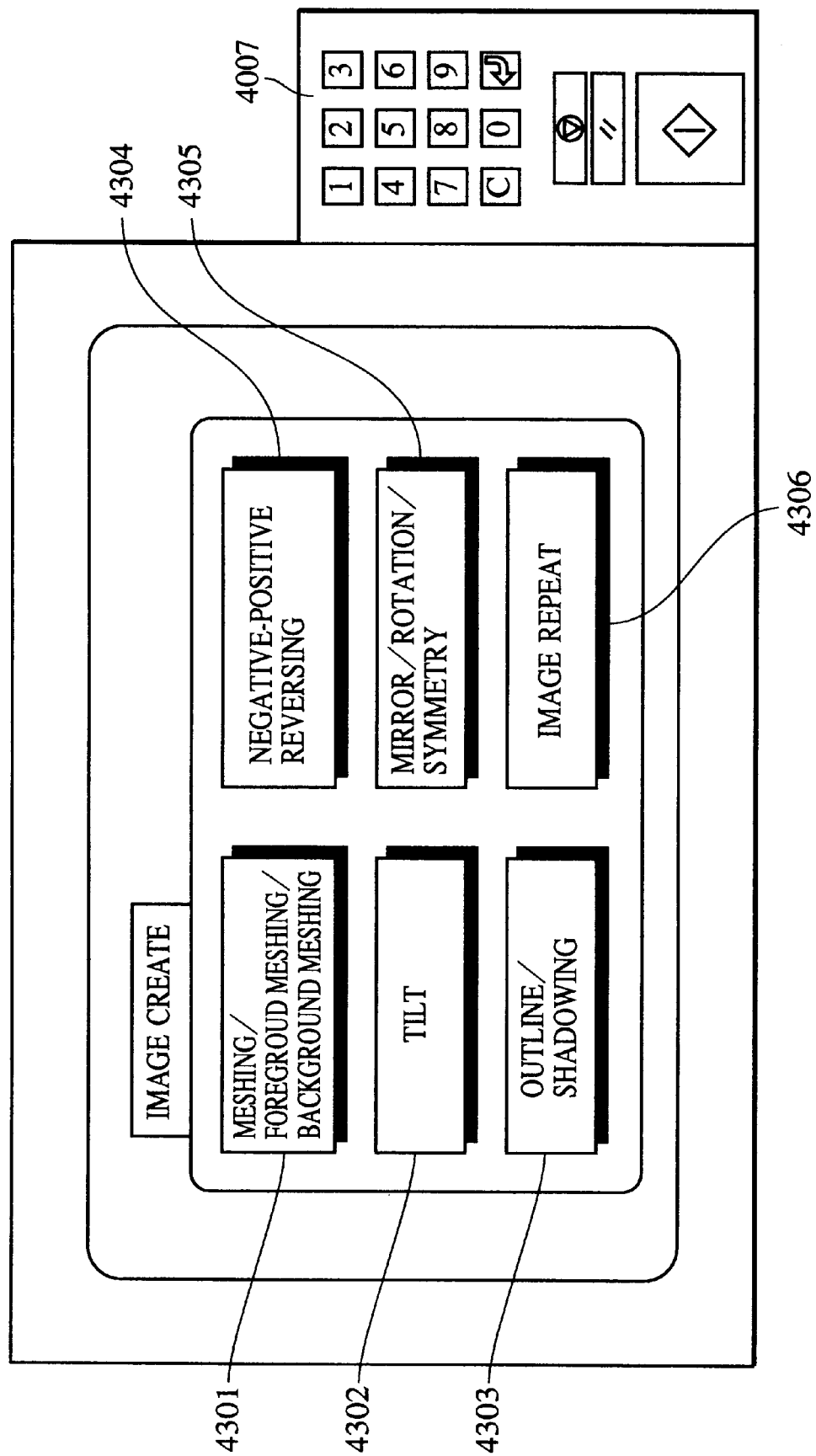
FIG. 43 shows an example of a display when an "image create" button is pressed on the console unit in the image processing apparatus shown in FIG. 1.

In a marker mode, an area is specified on an original document sheet to image process the area with a marker pen. When the marker button 4201 is pressed, detailed setting in connection with the marker mode is conducted. A trimming/masking mode is used in combination with the image processing area that is specified by the marker. The inside of the area specified by the marker is copied (trimmed) or the outside of the area designated by the marker is copied (masked) (specifying a plurality of areas is permitted). When the trimming/masking button 4202 is pressed, detailed setting in connection with the trimming/masking mode is conducted. An image create mode is a mode related to the edition of an image. When the image create button 4203 is pressed, detailed setting as shown in FIG. 43 is conducted. A local processing mode is used in combination with the image processing area that is designated by the marker. The inside and the outside of the area specified by the marker may be subjected to different image processing modes (specifying a plurality of areas is permitted). When the local processing button 4204 shown in FIG. 42 is pressed, detailed setting in connection with the local processing mode is conducted. In a color pattern conversion mode, the color of an original document is recognized, and converted into a pattern matching the original document color. When the color pattern conversion button 4205 is pressed, detailed setting in connection with the color pattern conversion mode is conducted. In a sharpness mode, the black-white display of the image is sharpened, and when the sharpness button 4206 is pressed, detailed setting in connection with the sharpness mode is conducted.

FIG. 43 shows an example of display when the image create button 4203 shown in FIG. 42 is pressed. Presented on the display are a meshing/foreground meshing/background meshing button 4301, a tilt button 4302, an outline/ shadowing button 4303, a negative-positive button 4304, a mirror/rotation/symmetry button 3405, and an image repeat button 4306.

A meshing/foreground meshing/background meshing mode is used in combination with an area that is specified by the marker. The inside of the area specified by the marker is subjected to meshing/foreground meshing/background meshing process. The meshing process has the effect on the image 622 as shown in FIG. 7B, and the foreground meshing has the effect on the image 623 shown in FIG. 7B. When the meshing/foreground meshing/background meshing button 4301 is pressed, detailed setting in connection with the meshing/foreground meshing/background meshing mode is conducted. In a tilt mode, an image is deformed with respect to a specified angle, and when the tilt button 4302 is pressed, detailed setting in connection with the tilt mode is conducted. In an outline/shadowing mode, the outline of a letter or the like is copied (outlined) or an image is shadowed. When the outline/shadowing button 4303 is pressed, detailed setting in connection with the outline/shadowing is conducted. A negative-positive reversing mode is used in combination with an area that is specified by the marker. The inside of the area specified by the marker is negative-positive reversed. This mode has the effect on the image 621 shown in FIG. 7B. When the negative-positive reversing button 4304 is pressed, detailed setting in connection with the negative-positive reversing mode is conducted. In a mirror/rotation/symmetry mode, an image is turned about an axis in the plane of the display by 180° (mirrored), or turned in the plane of the display by any angle (rotated), or folded at its side (symmetrical). When the mirror/rotation/ symmetry button 4305 is pressed, detailed setting in connection with the mirror/rotation/symmetry is conducted. In an image repeat mode, an image within an area specified is repeatedly copied by the plural number of times until the sheet is full of the copied images. When the image repeat button 4306 is pressed, detailed setting in connection with the image repeat mode is conducted.

Figure 45:
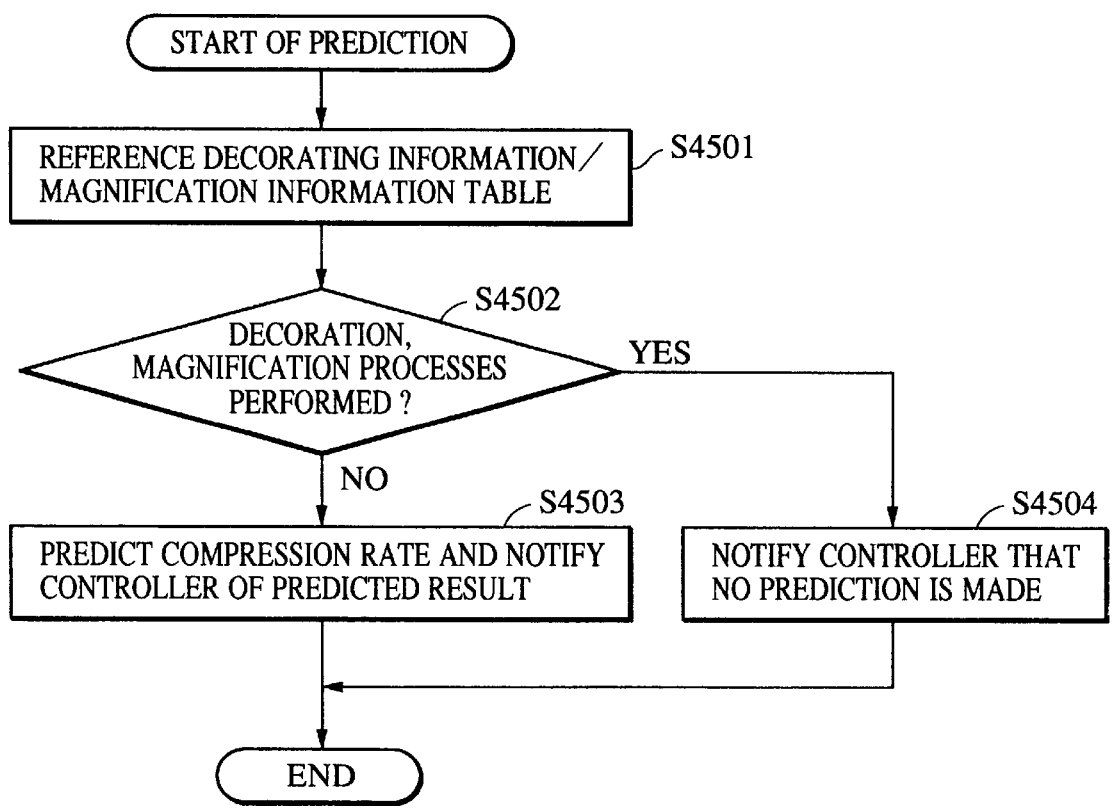
FIG. 45 is a flow chart showing the control sequence of compression rate prediction in the image processing apparatus shown in FIG. 1.

Referring to FIGS. 44 and 45, the subject matter of the present invention is further discussed, including the image editing, the compression rate prediction during magnification and the control related to the prediction.

As already discussed, the compression rate prediction is computed based the statistics of the image information such as the density means value and the entropy of an image. In this case, an original document image input and a decompressed image output from the PBM 65 do not necessarily agree with each other, because prediction is based on the image information prior to its entering the page memories 119 and 120 while magnification and image decoration are performed to the image after the page memories 119 and 120.

The following case is considered, for example. The density mean value of an input image is used in the compression rate prediction, and a meshing process as one of the image processings is performed before the image is printed out. If the entire image of an ordinary textual document is meshed, the compression rate is lowered. However, since the compression rate is predicted before the image is input to the page memories 119, 120, the compression rate is predicted from the image that is not yet meshed. For this reason, the prediction results in a prediction value higher than the actual compression rate that is derived from the meshed image. The PBM 65 handles the actual compression rate that is lower than the prediction value. The amount of image data based on the prediction is smaller than the amount of the actually compressed data and in a serious case, an overflow will be triggered.

In another case where a magnification process related to a reduction layout or expansion continuous copying is performed, a single sheet of image is derived from a plurality of sheets of image or a plurality of sheets of image are derived from a single sheet of image. In this case, prediction is subject to a large shift if a compression rate prediction value based on an input image is used as it is. Some of processings in the editing of images do not affect the compression rate prediction. For example, the rotation of an image by 180° does not make difference in each of the compression rate prediction value and the actual compression rate.

In the detail copy mode, processing items are divided into two groups, one with compression rate prediction and the other without compression rate prediction as shown in FIG. 44, and control is switched so that a compression rate prediction value may not become lower than its actual compression rate. The table shown in FIG. 44 is one example only, and the processing items may be categorized by further detail. For example, in the magnification of images, prediction may be performed within a range of magnification factor of 95% to 105%, and prediction is not performed in magnification factors outside this range. Whether prediction is performed or not is at the user's option. Regardless of the table shown in FIG. 44, an overriding setting for performing the compression rate prediction or not performing the compression rate prediction is possible.

FIG. 45 is a flow chart showing the control sequence of compression rate prediction that is performed in the compression rate predicting circuit 160 in the image processing apparatus according to one embodiment of the present invention. As shown, the decorating information/magnification information table is referenced in a step S4501, and referencing the table shown in FIG. 44, a determination in a step S4502 is made of whether there is a decoration and magnification process without using the compression rate prediction. When there is no decoration and magnification process without using the compression rate prediction, the sequence goes to a step S4503 for a prediction process. When there is a decoration and magnification process without using the compression rate prediction, the sequence goes to a step S4504.

In the step S4503, the compression rate prediction as described above is performed, and the controller 123 is notified of the prediction result via a bus 122, and the control sequence ends. In the step S4504, no compression rate prediction is performed and the controller 123 is notified via the bus 122 that no prediction is performed. When no prediction is performed, a predetermined fixed value (for example, the amount of data without compression rate prediction=1) instead of a compression rate prediction value is used to control devices so that the amount of image data based on the compression rate prediction does not go lower than the amount of the actual image data subsequent to compression. In this way, a memory overflow and loss of image data are prevented.

Figure 46:
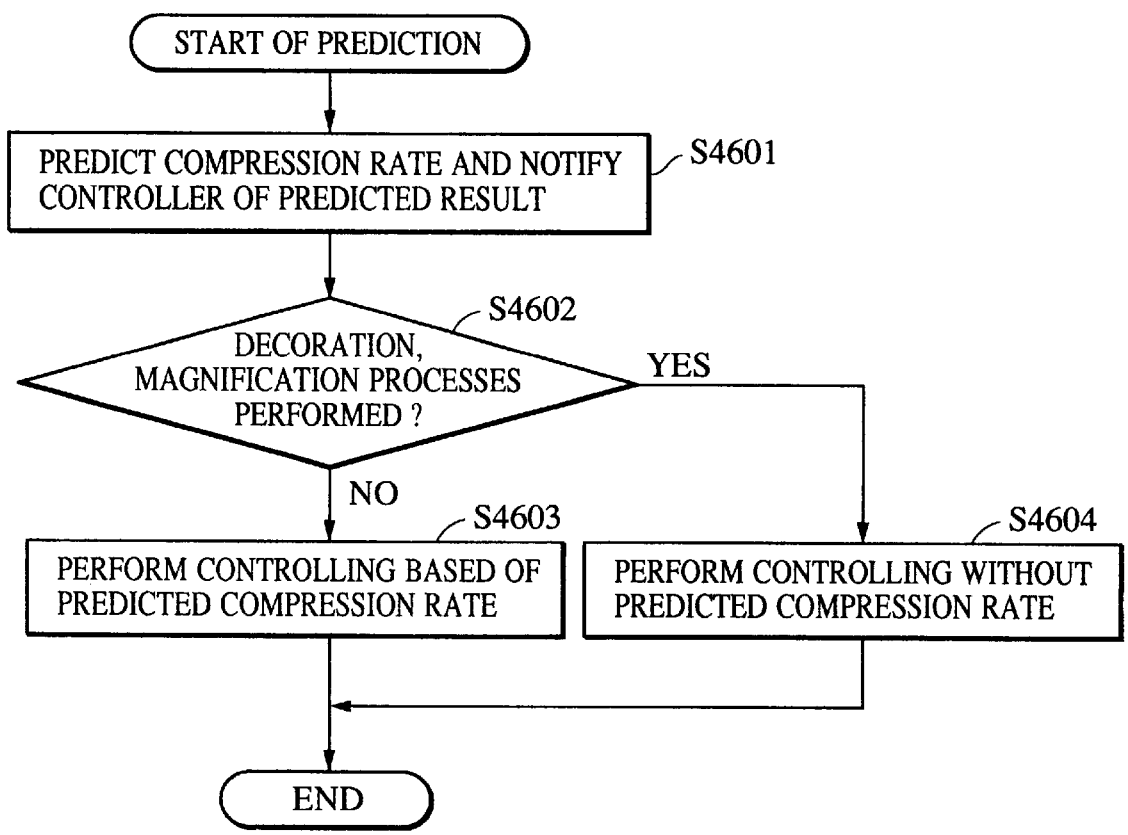
FIG. 46 is a flow chart showing the control sequence of compression rate prediction in the image processing apparatus of another embodiment.

Referring to FIG. 46, another embodiment of the present invention is now discussed. Since the basic arrangement of this embodiment of the image processing apparatus remains unchanged from the above embodiment, FIGS. 1 through 4 and FIG. 8 are again referred to.

FIG. 46 is a flow chart showing the control sequence of compression rate prediction that is performed in the compression rate predicting circuit 160 in the image processing apparatus according to this embodiment of the present invention. In a step S4601, the compression rate predicting circuit 160 performs compression rate prediction without fail regardless of image decoration and magnification. The controller 123 is notified via the bus 122 of the prediction result. In a step S4602, referencing the table shown in FIG. 44, the controller 123 determines whether there is a decoration and magnification process without using the compression rate prediction. When there is no decoration and magnification process without the compression rate prediction, the sequence goes to a step S4603 for a prediction process. When there is a decoration and magnification process without using the compression rate prediction, the sequence goes to a step S4604.

In the step S4603, the compression rate prediction result is used to control devices and the control sequence ends. In the step S4604, the compression rate prediction result is not used, and instead, a predetermined fixed value (for example, the amount of data without compression rate prediction) is used to control devices so that the amount of image data based on the compression rate prediction does not go lower than the amount of the actual image data subsequent to compression.

As described above, a compression rate prediction is not used in some of a diversity of image processings including decoration, magnification, and editing if prediction of a compression rate in these processings is difficult. A memory overflow and data loss arising from an erratic compression rate prediction are thus prevented. Specifically, a compression rate prediction value has to be slightly smaller than a corresponding actual compression rate. If an unreliable compression prediction value is used in decoration, magnification and editing processes, the above requirement is not satisfied. If a compression rate prediction value exceeds a corresponding actual compression rate, an overflow may take place. In such a case, the compression rate prediction value is not used, and a predetermined value (worst value) is used to avoid serious problems such as an overflow and data loss.

While the present invention has been described in connection with the preferred embodiments thereof, it should be understood that the present invention is not limited to the above embodiments but various modifications and changes may be made without departing from the scope of the present invention.

What is claimed is:

1. An image processing apparatus comprising:

input means for inputting image data representing an image of an original document;

processing means for processing the image data input by the input means so as to modify the image of the original document;

compression means for compressing the image data processed by the processing means;

memory means for storing the image data compressed by the compression means;

setting means for setting a plurality of image processing modes to be performed by the processing means; and predicting means for predicting an image compression rate of the image data after the compression used by the compression means, wherein the predicting means predicts the image compression rate of the image data after being processed by the processing means, based on a set of plural ones of the plurality of image processing modes set by the setting means.

2. An image processing apparatus comprising:

input means for inputting image data representing an image of an original document;

processing means for processing the image data input by the input means;

compression means for compressing the image data processed by the processing means;

memory means for storing the image data compressed by the compression means;

setting means for setting a plurality of image processing modes to be performed by the processing means, the image processing modes including a magnification factor of the image; and predicting means for predicting an image compression rate of the image data after the compression used by the compression means, wherein the predicting means predicts the image compression rate of the image data after being processed according to an image processing mode set by the setting means, based on the magnification factor of the image at the image processing mode set by the setting means.

3. An image processing apparatus according to claim 1 or 2, further comprising control means for controlling modification, according to a type of the image processing mode set by the setting means, of a coefficient or a computation method which is used by the predicting means in the prediction of the image compression rate.

4. An image processing apparatus comprising:

input means for inputting image data representing an image of an original document;

processing means for processing the image data input by the input means, so as to modify the image of the original document;

compression means for compressing the image data processed by the processing means;

memory means for storing the image data compressed by the compression means;

setting means for setting a plurality of image processing modes to be performed by the processing means; and predicting means for predicting an image compression rate of the image data after the compression used by the compression means, wherein the predicting means predicts the image compression rate of the image data after being processed by the processing means, based on a history of at least one formerly predicted image compression rate and an image processing mode set by the setting means.

5. An image processing apparatus according to claim 1, 2 or 4, wherein, using the image compression rate predicted by the predicting means, the image processing apparatus determined whether the compressed image data can be stored in the memory means.

6. An image processing apparatus according to claim 5, wherein the inputting of the image data to the processing means is restricted when the compressed image data cannot be stored in the memory means.

7. An image processing apparatus according to claim 1, 2 or 4, wherein the predicting means predicts an amount of the compressed image data to be output from the compression means.

8. An image processing apparatus according to claim 1, 2 or 4, further comprising feed means for sequentially feeding a plurality of original documents, and read means for reading an image of each fed original document to generate image data representing an image of the respective original document.

9. An image processing apparatus according to claim 8, wherein the feeding of each original document by the feed means is controlled based on the image compression rate predicted by the prediction means.

10. An image processing apparatus according to claim 4, further comprising control means for controlling modification, in accordance with the history and the set image processing mode, of a coefficient or a computation method which is used by the predicting means in the prediction of the image compression rate.

11. An image processing apparatus according to claim 4, wherein the coefficient or the computation method used by the predicting means in the prediction of the image compression rate is modified according to a user code set by the setting means.

12. An image processing apparatus comprising:

processing means for processing an image signal into which an original document, after being exposed to light, has been photoelectrically converted;

compression means for compressing image information processed by the processing means;

memory means for storing image data compressed by the compression means;

setting means for setting a plurality of image processing settings;

predicting means for predicting an image compression rate used by the compression means; and switching means for switching the predicting means between an enabled status and a disabled status, wherein the switching means switches the predicting means to the disabled status based on a setting set by the setting means.

13. An image processing apparatus according to claim 12, wherein a setting set by the setting means is a copying magnification factor setting.

14. An image processing apparatus according to claim 12, wherein one image processing setting set by the setting means is an image decoration setting, wherein image decoration settings include a meshing, a negative-positive reversing, an image repeat, a tilting, an outline extraction, a symmetrization, a rotation, a mirroring, and a color pattern conversion.

15. An image processing apparatus according to claim 12, wherein one image processing setting set by the setting means is an image editing setting, wherein image editing settings include a movement, a masking, a trimming and layout of a specified area.

16. An image processing apparatus according to claim 12, wherein a setting set by the setting means is a density setting.

17. An image processing apparatus according to claim 12, wherein the switching means switches the predicting means to the enabled status only when a setting set by the setting means specifies the number of copies.

18. An image processing apparatus according to claim 9, wherein a setting set by the setting means is selected by a user.

19. An image processing apparatus according to claim 12, wherein the storing of the compressed data into the memory means is controlled based on the compression rate predicted by the predicting means.

20. An image processing apparatus comprising:

processing means for processing an image signal into which an original document, after being exposed to light, has been photoelectrically converted;

compression means for compressing image information processed by the processing means;

memory means for storing image data compressed by the compression means;

setting means for setting a plurality of image processing modes;

predicting means for predicting an image compression rate used by the compression means; and determining means for determining whether the operation of the predicting means is valid or invalid, wherein the determining means invalidates the operation of the predicting means according to the setting of the setting means.

21. An image processing method for processing image data representing an image of an original document so as to modify the image of the original document, compressing the processed image data, and storing the compressed image data, the method comprising the steps of:

setting a plurality of image processing modes to be performed on the image data; and predicting an image compression rate of the image data, wherein the predicting step predicts the image compression rate of the image data after one page has been processed, based on a set of plural ones of the plurality of image processing modes set in the setting step.

22. An image processing method for processing image data representing an image of an original document so as to modify the image of the original document, compressing the processed image data, and storing the compressed image data, the method comprising the steps of:

setting a plurality of image processing modes to be performed on the image data, the image processing modes including a magnification factor of the image; and predicting an image compression rate of the image data, wherein the predicting step predicts the image compression rate of the image data after one page has been processed according to an image processing mode set in the setting step, based on the magnification factor of the image in the image processing mode set in the setting step.

23. An image processing method according to claim 21 or 22, further comprising a control step of modifying, according to the type of the image processing mode set in the setting step, a coefficient or a computation method which is used in the prediction of the image compression rate in the predicting step.

24. An image processing method for processing image data representing an image of an original document so as to modify the image of the original document, compressing the processed image data, and storing the compressed image data, the method comprising the steps of:

setting a plurality of image processing modes to be performed on the image data; and predicting an image compression rate of the image data, wherein the predicting step Predicts the image compression rate of the image data after one page has been processed, based on a history of at least one formerly predicted image compression rate and the image processing mode set in the setting step.

25. An image processing method according to claim 21, 22 or 24, further comprising a determining step of determining whether the compressed image data can be stored, used the image compression rate predicted at the predicting step.

26. An image processing method according to claim 25, wherein the inputting of the image data to be processed is restricted when the compressed image data cannot be stored.

27. An image processing method according to claim 21, 22 or 24, wherein an amount of the compressed image data to be output in the compression step is predicted in the predicting step.

28. An image processing method according to claim 21, 22 or 24, further comprising a feed step of sequentially feeding a plurality of original documents, and a read step of reading an image of each fed original document to generate image data representing an image of the respective original document.

29. An image processing method according to claim 28, wherein the feeding of each original document is controlled based on the image compression rate predicted in the predicting step.

30. An image processing method according to claim 24, further comprising a control step of controlling modification, in accordance with the history and the set image processing mode, a coefficient or a computation method which is used in the prediction of the image compression rate in the predicting step.

31. An image processing method according to claim 24, wherein the coefficients and the computation method which are used in the prediction of the image compression rate in the predicting step are modified according to a user code set in the setting step.

32. An image processing method for processing an image signal into which an original document, after being exposed to light, has been photoelectrically converted, compressing processed image information, and storing compressed image data, the method comprising the steps of:

setting a plurality of image processing settingsl;

predicting an image compression rate of the image signal; and selectively inhibiting the prediction of the image compression rate in the predicting step based on a setting set in the setting step.

33. An image processing method according to claim 32, wherein a setting set in the setting step is a copying magnification factor setting.

34. An image processing method according to claim 32, wherein a setting set in the setting step is an image decoration setting, wherein image decoration settings include a meshing, a negative-positive reversing, an image repeat, a tilting, an outline extraction, a symmetrization, a rotation, a mirroring, and a color pattern conversion.

35. An image processing method according to claim 32, wherein a setting set in the setting step is an image editing setting, wherein image editing settings include a movement, a masking, a trimming and layout of a specified area.

36. An image processing method according to claim 32, wherein a setting set in the setting step is a density setting.

37. An image processing method according to claim 32, wherein the prediction in the predicting step is inhibited only when a setting set in the setting step specifies a number of copies.

38. An image processing method according to claim 32, wherein a setting set in the setting step is selected by a user.

39. An image processing method according to claim 32, wherein the storing of the compressed data is controlled based on the compression rate predicted in the predicting step.

40. An image processing method for processing an image signal into which an original document, after being exposed to light, has been photoelectrically converted, compressing processed image information, and storing compressed image data, the method comprising the steps of:

setting a plurality of image processing modes;

predicting an image compression rate of the image signal; and determining whether a predicting operation in the predicting step is valid or invalid, wherein the prediction operation in the predicting step is invalidated in the determining step according to an image processing mode set in the setting step.

* * * * *

UNITED STATES PATENT AND TRADEMARK OFFICE
CERTIFICATE OF CORRECTION

PATENT NO.    : 6,094,510
DATED         : July 25, 2000
INVENTOR(S)   : HIROYUKI YAGUCHI ET AL.

It is certified that error appears in the above-identified patent and that said Letters Patent is hereby corrected as shown below:

IN THE DRAWINGS:

Sheet 10 of 42, FIG. 10, "Allmost" should read --Almost--;
Sheet 10 of 42, FIG. 11, "Allmost" should read --Almost--; and
Sheet 11 of 42, FIG. 13, "Allmost" should read --Almost--.

COLUMN 3:

Line 61, "FIG. FIG. 1," should read --FIG. 1,--.

COLUMN 4:

Line 27, "33b" should read --33B--;
Line 50, "an "detail" should read --a "detail--; and
Line 53, "a "extended" should read --an "extended--.

COLUMN 7:

Line 5, "sheet," should read --sheet,....--; and
Line 6, "The dual-side" should read --¶ The dual-side--.

COLUMN 10:

Line 24, "elk" should be deleted;
Line 33, "a" should be deleted;
Line 42, "a" should be deleted;
Line 48, "a" should be deleted; and
Line 50, "a" should be deleted;

UNITED STATES PATENT AND TRADEMARK OFFICE
CERTIFICATE OF CORRECTION

PATENT NO.    : 6,094,510
DATED         : July 25, 2000
INVENTOR(S)   : HIROYUKI YAGUCHI ET AL.

It is certified that error appears in the above-identified patent and that said Letters Patent is hereby corrected as shown below:

COLUMN 11:

Line 63, "a" should be deleted.

COLUMN 12:

Line 6, "a" should be deleted; and
   Line 67, "denotes" should read --denote--.

COLUMN 13:

Line 28, "withhold" should read --withheld--; and
   Line 30, "withhold" should read --withheld--.

COLUMN 14:

Line 37, "the" should be deleted; and
   Line 43, "by" should read --for--.

COLUMN 15:

Line 33, "denotes" should read --denote--.

COLUMN 27:

Line 50, "Predicts" should read --predicts--.

UNITED STATES PATENT AND TRADEMARK OFFICE
CERTIFICATE OF CORRECTION

PATENT NO. : 6,094,510

DATED : July 25, 2000

INVENTOR(S) : HIROYUKI YAGUCHI ET AL.

It is certified that error appears in the above-identified patent and that said Letters Patent is hereby corrected as shown below:

<u>COLUMN 28</u>:

Line 23, "settings1;" should read --settings;--.

Signed and Sealed this

Eighth Day of May, 2001

Attest:

NICHOLAS P. GODICI

*Attesting Officer*       *Acting Director of the United States Patent and Trademark Office*